(12) United States Patent
Fujimaki et al.

(10) Patent No.: US 8,362,140 B2
(45) Date of Patent: Jan. 29, 2013

(54) PIGMENT-DISPERSED COMPOSITION, COLORED PHOTOSENSITIVE COMPOSITION, PHOTOCURABLE COMPOSITION, COLOR FILTER, LIQUID CRYSTAL DISPLAY DEVICE, AND SOLID-STATE IMAGE PICKUP DEVICE

(75) Inventors: Kazuhiro Fujimaki, Shizuoka (JP); Hiromi Kanda, Shizuoka (JP); Koichi Sugihara, Shizuoka (JP); Shigekazu Suzuki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/922,849

(22) PCT Filed: Mar. 12, 2009

(86) PCT No.: PCT/JP2009/054710
§ 371 (c)(1),
(2), (4) Date: Sep. 15, 2010

(87) PCT Pub. No.: WO2009/116442
PCT Pub. Date: Sep. 24, 2009

(65) Prior Publication Data
US 2011/0014401 A1 Jan. 20, 2011

(30) Foreign Application Priority Data

Mar. 17, 2008 (JP) ................ 2008-068337
Mar. 24, 2008 (JP) ................ 2008-075656
Aug. 28, 2008 (JP) ................ 2008-219785

(51) Int. Cl.
*G02B 1/04* (2006.01)
*C08L 33/14* (2006.01)
*C09K 19/04* (2006.01)
*C08F 2/46* (2006.01)

(52) U.S. Cl. .......... 524/559; 524/558; 522/74; 252/586; 438/70

(58) Field of Classification Search ................ 523/160; 524/556, 558, 559; 522/74; 252/586; 438/70
See application file for complete search history.

(56) References Cited

U.S. PATENT DOCUMENTS

| 5,171,784 A | 12/1992 | Colon et al. | |
|---|---|---|---|
| 5,554,682 A * | 9/1996 | Harris et al. | 524/523 |
| 2007/0182795 A1 | 8/2007 | Kim et al. | |
| 2009/0082487 A1 * | 3/2009 | Kanda | 522/174 |

FOREIGN PATENT DOCUMENTS

| EP | 0375660 A2 | 6/1990 |
|---|---|---|
| JP | 04-352884 A | 12/1992 |
| JP | 3094403 B2 | 10/2000 |
| JP | 2001-164142 A | 6/2001 |
| JP | 2003-238837 A | 8/2003 |
| JP | 2003-294935 A | 10/2003 |
| JP | 2004/287298 A * | 10/2004 |
| JP | 2004-287409 A | 10/2004 |
| JP | 2007-277514 A | 10/2007 |
| JP | 2008-009426 A | 1/2008 |
| WO | 2007/119836 A1 | 10/2007 |
| WO | 2008/006723 A1 | 1/2008 |

OTHER PUBLICATIONS

Machine translation of JP 2004-287298 A to Hasegawa et al. (Oct. 14, 2004).*
English-language abstract of JP 2004-287298 A to Hasegawa et al. (Oct. 14, 2004).*
Japanese Office Action dated Aug. 21, 2012 issued in the corresponding Japanese Application with the partial English translation.

* cited by examiner

*Primary Examiner* — Vu A Nguyen
(74) *Attorney, Agent, or Firm* — SOLARIS Intellectual Property Group, PLLC

(57) ABSTRACT

A pigment-dispersed composition includes (a) a high-molecular compound containing at least one kind of repeating unit selected from repeating units each represented by the following Formula (I) or (II), (b) a pigment, and (c) an organic solvent, wherein, in Formulae (I) and (II), $R^1$ to $R^6$ each represent a hydrogen atom or another group; $X^1$ and $X^2$ each represent —CO—, —C(=O)O—, —CONH—, —OC(=O)—, or a phenylene group; $L^1$ and $L^2$ each represent a single bond or a divalent organic linking group; $A^1$ and $A^2$ each represent a monovalent organic group; m and n each represent an integer of from 2 to 8; and p and q each represent an integer of from 1 to 100. Also disclosed is a pigment-dispersed composition containing (A) a graft high-molecular polymer in which acrylic acid is copolymerized at a proportion of from 5% by mass to 30% by mass in the main chain thereof, (B) a pigment, and (C) an organic solvent.

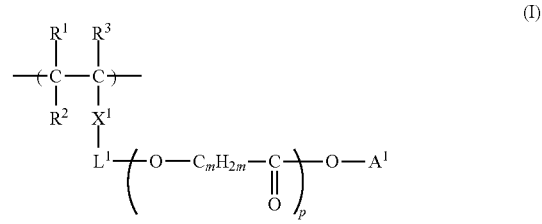

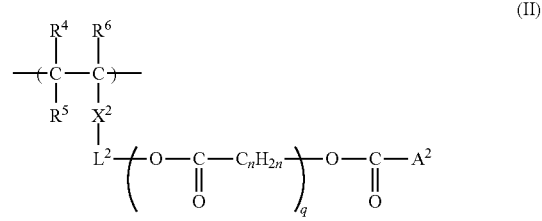

9 Claims, No Drawings

PIGMENT-DISPERSED COMPOSITION, COLORED PHOTOSENSITIVE COMPOSITION, PHOTOCURABLE COMPOSITION, COLOR FILTER, LIQUID CRYSTAL DISPLAY DEVICE, AND SOLID-STATE IMAGE PICKUP DEVICE

TECHNICAL FIELD

The present invention relates to a pigment-dispersed composition, a colored photosensitive composition including the pigment-dispersed composition, a color filter having a colored region formed from the colored photosensitive composition, and furthermore, a liquid crystal display device using the color filter and a solid-state image pickup device using the color filter. The invention also relates to a pigment-dispersed composition which has excellent pigment dispersibility, and which offers excellent flowability, coloring power and the like of the pigment-dispersed composition and a photocurable composition, and which can be used suitably in a broad range such as a paint, a print ink and a color display panel, a photocurable composition including the same and a color filter produced using the photocurable composition.

BACKGROUND ART

A color filter is produced by preparing a colored photosensitive composition containing a pigment-dispersed composition in which an organic pigment or an inorganic pigment is dispersed, a polyfunctional monomer, a polymerization initiator, an alkali-soluble resin, and other components, and forming a colored pattern by using the composition according to a photolithography method or an ink jet method.

In recent years, there is a trend for applications of color filters used in liquid crystal display devices (LCDs) to expand beyond monitors towards television (TVs). With this trend towards expanded applications, the color filters are desired to have high color quality with respect to chromaticity, and contrast. Similarly, color filters used in image sensors (solid-state image pickup devices) have begun to be desired to have high color quality such as reduced color unevenness and improved color resolution.

In order to satisfy the desires, the pigment contained in the colored photosensitive composition or the photocurable composition is desired to be dispersed in a finer state (improved dispersibility), and in stable state (improved dispersion stability). When dispersibility of the pigment is insufficient, problems arise in that colored pixels formed by a photolithographic method has a fringe (serration at an edge) or surface irregularities, the amount of residual matter (residue) remaining after development on the substrate is large, the chromaticity or dimensional precision of a manufactured color filter is thus reduced, and contrast thereof is remarkably deteriorated. In a case in which the dispersion stability of the pigment is insufficient, problems tend to arise in a production process of the color filter particularly in that uniformity of film thickness in a coating process of the colored photosensitive composition or the photocurable composition decreases, sensitivity at an light exposure process decreases, or alkali solubility in a development process decreases. Furthermore, in a case in which the dispersion stability of the pigment is poor, there is a problem in that components of the colored photosensitive composition aggregate and raise the viscosity with time, which leads to an extremely short pot-life. In order to solve such problems, a polymer-type pigment dispersant in which an organic dye structure and a polymer are bonded to each other, for example, is presented (refer to Japanese Patent Application Laid-Open (JP-A) No. 2008-009426). Although fine-sized pigment particles are effective in improving color properties, such as contrast, of a color filter, the fine diameter of the pigment particles leads to an increase in the surface area of the pigment particles, increases aggregation force between pigment particles, and often makes it difficult to achieve both of dispersibility and dispersion stability at high levels.

The following techniques for fining pigment particles are known.

In general, a method whereby a pigment, a water-soluble inorganic salt, and a water-soluble organic solvent which does not substantially dissolve the inorganic salt are mechanically kneaded by using a kneader or the like (salt milling method) is commonly known as a method for fining primary particles of a pigment. The resultant mixture containing fine pigment primary particles is added to water, and agitated using a mixer or the like to form a slurry. Next, the slurry is filtered, washed with water, and dried, as a result of which a fine pigment in the form of a secondary aggregate, which is an aggregate of the pigment primary particles, is obtained. A dispersing process using an ordinary dispersing machine such as a sand mill or a ball mill is a process whereby the secondary aggregate, which is an aggregate of the pigment primary particles, are crumbled to obtain a dispersion in a state close to a primary particle state.

Although fine pigment primary particles are obtained by, for example, the above method, various pigment dispersants have been developed in order to enhance the dispersibility and dispersion stability of the primary particles.

Among pigment dispersants, for example, a ω-carboxy-polycaprolactone monomethacrylate copolymer is proposed in JP-A No. 2004-287409 for obtaining high-resolution pixels, the copolymer having favorable alkali-developability.

In addition, JP-A No. 2003-238837, for example, proposes a high-molecular compound which has a polymer structure of a vinyl compound such as styrene or an alkyl(meth)acrylate as a graft chain, and which further has a heterocyclic structure at a side chain, for the purpose of improving dispersibility and alkali-developability.

However, these methods are still insufficient for addressing market's demands for further improved contrast, and fine pigments are desired to have still higher dispersibility and dispersion stability.

In the production of a color filter using a photocurable composition containing a pigment-dispersed composition, the photocurable composition is applied to and dried on a substrate or a substrate on which a light-shielding layer of a desired pattern has been formed in advance, and the resultant dry coating film is thereafter irradiated with a radiation (hereinafter referred to as "light exposure") in a desired pattern and developed to obtain pixels of each color.

However, a color filter thus produced has a problem in that residue and background staining tend to be generated on the substrate or light-shielding layer at regions that have not exposed to light during the development process, and pixels that have been post-baked after development have inferior film coating properties, such as inferior surface smoothness. Moreover, the degree of the residue, background staining, and surface smoothness deterioration on the substrate or the light-shielding layer tend to be more remarkable as the concentration of the pigment contained in the photocurable composition increases. Therefore, it has been difficult to achieve sufficient color density with conventional photocurable compositions for color filters.

Moreover, a pigment-dispersed composition is known (refer to Japanese Patent No. 3094403 and JP-A No. 2004-287409) in which a block-type, random-type, or linear high-molecular compound to which acrylic acid is introduced is used as an alkali-soluble resin for the purpose of imparting an alkali-developability. However, this is still insufficient to achieve both of dispersibility of the pigment and developability when applied to a curable composition for forming a pattern of a color filter or the like.

Furthermore, with an increase in the size of the substrate in recent years, a slit coating method is studied as a coating method. In comparison with conventional spin coating, slit coating has advantages in that slit coating provides excellent thickness uniformity of the coating film and reduces wasted coating liquid.

However, with slit coating, a coating liquid is exposed to the outside air at the slit aperture of the head tip, and thus drying or solidification of the coating liquid (photocurable composition) occurs easily at the head tip. The solidified coating liquid causes clogging of the slit nozzle and longitudinal streak unevenness of a coating film coated on a transparent substrate (coating streak along the coating direction).

In addition, the solidified coating liquid detaches from the head tip portion, and causes decrease of coating quality such as incorporation as unwanted matter into an applied coating film. In order to avoid this, it is requested that dried or precipitated photocurable composition properties such that it dissolves rapidly when contacting with a coating liquid (hereinafter referred to as "dry film redissolvability").

In order to ameliorate these problems, a method in which a surfactant or a dispersant such as a resinous dispersant is used is known (for example, refer to JP-A No. 2003-294935 and JP-A No. 2001-164142). However, use of these dispersants causes problems such as reduction in the strength of a coating film, reduction in developability, reduction in the adhesiveness to a substrate such as glass, and reduction in durability. Furthermore, it has been difficult to achieve both of excellence in dispersion stability of a photocurable composition and dry film redissolvability of a coating liquid, and provision of strong adhesiveness between a coating film and a substrate such as glass.

In addition, a color filter is required to have high color density as the film is made thinner in recent years. In order to form a color filter having high color density, the concentration of colorant used in a colored resin composition to be used needs to be increased. However, a problem arises in that components contributing to image formation properties such as solubility in an alkali developer liquid relatively decrease, and the originally possessed image formation properties are lost. In order to solve such problems, use of a dispersant having both a dispersing function and a binder function has been tried aiming at maintaining image formation properties while maintaining a high colorant concentration. Furthermore, a pigment-dispersed composition in which a linear high-molecular compound of block-type, random-type, or the like having acrylic acid introduced thereto is used as an alkali-soluble resin is known (refer to JP-A No. 2004-287409). However, sufficient dispersibility has not yet been achieved, particularly in the case of extremely fine pigments.

DISCLOSURE OF THE INVENTION

Problems to be Solved by the Invention

The invention has been made in view of the above circumstances, and aims at achieving the following objects.

Specifically, a first object of the invention is to provide a pigment-dispersed composition in which a fined pigment is dispersed in the form of primary particles and the dispersed pigment primary particles are maintained stably, and with which a colored coating film having excellent contrast can be formed.

A second object of the invention is to provide a colored photosensitive composition which includes the pigment-dispersed composition, and which has excellent coating properties, and with which a colored cured film having excellent contrast can be formed.

A third object of the invention is to provide a color filter that is formed using the colored photosensitive composition, and that has a colored region which has high contrast and excellent color properties, and in which color density unevenness is small, and a liquid crystal display device and a solid-state image pickup device, each of which has the color filter.

A fourth object of the invention is to provide a pigment dispersion liquid that has excellent dispersion stability, and a photocurable composition in which the pigment dispersion liquid is used, and which has excellent self-solubility when aggregated or solidified at a tip portion of a coating liquid discharge aperture of a slit coating device (dry film redissolvability), and which has favorable solubility in a developer liquid and excellent developability, and with which generation of development residue is suppressed.

A fifth object of the invention is to provide a high-quality color filter having a colored pattern formed using the photocurable composition, and a liquid crystal display device which has the color filter, and which has excellent color reproducibility and high contrast, and a solid-state image pickup device which has the color filter, and which has high resolution, and in which color unevenness is small.

Means for Solving the Problem

The first to third objects of the invention may be achieved by the following means.

Specifically, a pigment-dispersed composition according to a first aspect of the invention includes (a) a high-molecular compound containing at least one kind of repeating unit selected from repeating units each represented by the following Formula (I) or (II) described below, (b) a pigment, and (c) an organic solvent.

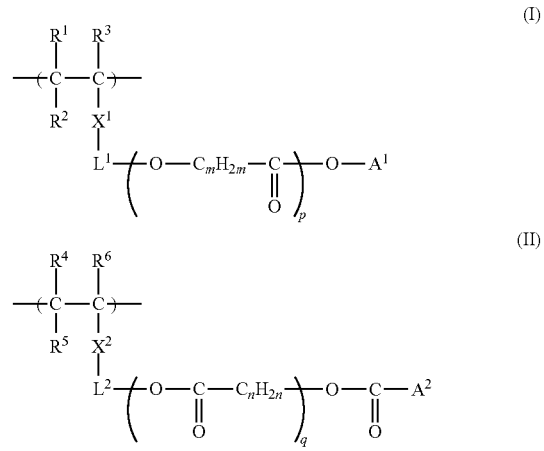

In Formulae (I) and (II), $R^1$ to $R^6$ each independently represent a hydrogen atom or a monovalent organic group; $X^1$ and $X^2$ each independently represent —CO—, —C(=O)O—, —CONH—, —OC(=O)— or a phenylene group; $L^1$ and $L^2$ each independently represent a single bond or a divalent organic linking group; $A^1$ and $A^2$ each independently represent a monovalent organic group; m and n each independently represent an integer of from 2 to 8; and p and q each independently represent an integer of from 1 to 100.

In the first aspect, the (a) high-molecular compound preferably has at least one acidic group at a side chain in the range of from 50 mgKOH/g to 200 mgKOH/g.

It is preferable that the (a) high-molecular compound has a heterocyclic group at a side chain.

Furthermore, the pigment-dispersed composition according to the first aspect is preferably used to form a colored region of a color filter.

The colored photosensitive composition according to the first aspect includes the pigment-dispersed composition according to the first aspect, a photopolymerizable compound and a photopolymerization initiator.

The color filter according to the first aspect has a colored region formed from the colored photosensitive composition according to the first aspect, on a substrate.

The liquid crystal display device and the solid-state image pickup device according to the first aspect each have the color filter according to the first aspect.

The actions in the first aspect are not clear, but are presumed to be as follows.

Specifically, it is understood that the (a) high-molecular compound that functions as a pigment dispersant contains a repeating unit represented by Formula (I) or (II), thus having a specific graft chain structure. Although the graft chain structure has low affinity for pigment, the graft chain structure has high affinity for the (c) organic solvent that is also present in the pigment-dispersed composition. Therefore, the graft chain portion is able to take a structure in which the graft chain portion stretches toward the organic solvent side instead of being adsorbed on the surface of the (b) pigment. Namely, it is thought that, due to the high affinity of the graft chain structure for the solvent, the (a) high-molecular compound according to the first aspect takes a stretched structure when coexisting with the (b) pigment and the (c) organic solvent, and is efficiently adsorbed on the pigment surface, as a result of which the stable dispersion of the pigment in the organic solvent is maintained.

In contrast, in the case of a graft chain structure having high affinity to pigment but low affinity for solvent, the graft chain portion is adsorbed on the pigment surface, and thus cannot take a structure in which the graft chain portion stretches toward the organic solvent side. Therefore, it is thought that a high-molecular compound having a graft chain of this kind takes a contracted structure when coexisting with a pigment and an organic solvent, the high-molecular compound is not efficiently adsorbed on the pigment surface, and thus aggregation of the pigment occurs.

In the case of a ω-carboxypolycaprolactone monomethacrylate copolymer described in JP-A No. 2004-287409, terminal groups of graft chains are carboxyl groups that exhibit strong interaction, as a result of which the graft chains are adsorbed on the pigment surface, and the structure of the high-molecular compound is in a contracted state. Therefore, the effect in dispersing pigment cannot be exerted sufficiently.

In a preferable embodiment, the (a) high-molecular compound according to the first aspect has a heterocyclic group at a side chain, in which case the heterocyclic structure exhibits strong electrostatic interaction with the (b) pigment; as a result, the high-molecular compound is strongly adsorbed on the pigment surface, thereby effectively crumbling secondary aggregates, and maintaining a stable dispersion state.

Use of a color filter formed from a pigment-dispersed composition in which the (b) pigment is dispersed by the (a) high-molecular compound solves problems of clouding of colored regions (pixel portions) under high temperature and high humidity, and clouding of a colored regions (pixel portions) during production of a color filter. These problems are considered to be phenomena caused by aggregation and crystal growth of fine pigment particles in the filter to grow a crystal, and smaller pigment primary particles are more likely to cause the phenomena. In the first aspect, a pigment-dispersed composition in which the dispersibility of the (b) pigment is improved by using the (a) high-molecular compound as described above is used. Since the (a) high-molecular compound is strongly adsorbed on the fine pigment, aggregation of pigment particles is effectively suppressed even in colored regions (pixel portions). As a result, the problem of the clouding of the colored regions (pixel portions) is suppressed, and colored regions (pixel portions) having excellent contrast can be formed.

Furthermore, a colored photosensitive composition in which a pigment-dispersed composition containing the (b) pigment-dispersed by the (a) high-molecular compound is used exhibits excellent coating properties (coating unevenness does not occur). The reason thereof is thought to be as follows: since the graft chain structure of the (a) high-molecular compound has high affinity for the (c) organic solvent as described above, the high-molecular compound takes a stretched structure, thereby improving coating film formation properties.

It is thought that, because the ω-carboxypolycaprolactone monomethacrylate copolymer of JP-A No. 2004-287409 has graft chains of which terminal groups are carboxyl groups exhibiting strong interaction, and because the polymer of a vinyl compound of JP-A No. 2003-238837 has a structure in which the graft chain has low affinity for organic solvent, the structures of both polymer compounds are in contracted states, and thus coating film formation properties are low, as a result of which it is difficult to improve coating properties.

With regard to the fourth and fifth objects, the inventors have conducted earnest study, and, as a result, found that the objects can be solved by using a pigment-dispersed composition containing (A) a graft high-molecular polymer compound having acrylic acid in the main chain thereof, (B) a pigment, and (C) an organic solvent, thereby arriving at the invention.

Specifically, the fourth and fifth objects of the invention are achieved by the means described below.

A pigment-dispersed composition according to the second aspect of the invention contains (A) a graft high-molecular polymer in which acrylic acid is copolymerized at a proportion of from 5% by mass to 30% by mass in the main chain thereof, (B) a pigment, and (C) an organic solvent.

The photocurable composition according to the second aspect includes the pigment-dispersed composition according to the second aspect, (F) a polymerizable compound, and (G) a photopolymerization initiator.

The color filter according to the second aspect is a color filter produced using the photocurable composition according to the second aspect.

The liquid crystal display device according to the second aspect is a liquid crystal display device in which the color filter according to the second aspect is used.

The solid-state image pickup device according to the second aspect is a solid-state image pickup device in which the color filter according to the second aspect is used.

The actions in the second aspect are not clear, but presumed to be as follows.

The (A) graft high-molecular compound having acrylic acid in the main chain thereof contained in the pigment-dispersed composition according to the second aspect has acrylic acid in the main chain thereof, and is of a graft-type. The acrylic acid in the main chain has higher polarity than that of methacrylic acid, and the main chain is flexible. Therefore, it is though that, in a case in which the graft high-molecular compound is used as a dispersant, the graft high-molecular compound effectively covers a high-polarity pigment when the acrylic acid acts on the pigment, and reaggregation of the pigment is suppressed due to the graft chain functioning as a steric repulsion chain. It is thought that a secondary aggregate, which is an aggregate of pigment primary particles, is thus effectively crumbled, and reaggregation of primary particles that leads to formation of a secondary aggregate is effectively suppressed. It is considered that a dispersion in a state close to that of a dispersion of primary particles can thus be obtained in the dispersing process.

It is thought that inclusion of a colored pattern including a photocurable composition containing the pigment-dispersed composition thus enables provision of a color filter having high contrast, and a color filter having small color density unevenness.

At the same time, redissolvability of a dry film thereof is favorable. The reason thereof is presumed to be as follows. The pigment-dispersed in the form of primary particles is in a state of being covered with the graft high-molecular compound, and the graft high-molecular compound serving as an outer wall has high affinity for solvent, and as a result of which even a dry film easily dissolves in a solvent.

The pigment-dispersed composition dispersed with the high-molecular compound according to the second aspect is also effective in dealing with a problem in that a part of the dispersant precipitates during storage of the pigment-dispersed composition at low temperatures. This problem associates, particularly, a graft high-molecular polymer compound having polycaprolactone as a graft chain. Since polycaprolactone is a polymer having high crystallinity, it has poor dispersion stability at low temperatures. However, stable storage at low temperatures is made possible presumably for the following reasons. The high-molecular compound (A) according to the second aspect has acrylic acid copolymerized in the main chain thereof, and thus the flexibility of the main chain of the high-molecular compound is improved. Therefore, carboxylic acid, which is hard to solvate, easily aggregates away from the organic solvent used in the pigment-dispersed composition, while polycaprolactone chains, which are easy to solvate, are solvated with the organic acid rather than being regularly arranged, as a result of which the polymer compound is easily soluble in the solvent.

Effects of the Invention

According to the first aspect, it is possible to provide a pigment-dispersed composition in which a fined pigment is dispersed in the state of primary particles and primary particles of the dispersed pigment are stably maintained, and with which a colored coating film having excellent contrast can be formed.

According to the first aspect, it is possible to provide a colored photosensitive composition which contains the pigment-dispersed composition, and which exhibits excellent coating properties, and with which a colored cured film having excellent contrast can be formed.

Furthermore, according to the first aspect, it is possible to provide a color filter that is formed using the colored photosensitive composition, and that has a colored region which has high contrast and excellent color properties, and in which color density unevenness is small, and a liquid crystal display device and a solid-state image pickup device, each of which has the color filter.

According to the second aspect, it is possible to provide a pigment dispersion liquid that has excellent dispersion stability, and a photocurable composition in which the pigment dispersion liquid is used, and which has excellent self-solubility when aggregated or solidified at a tip portion of a coating liquid discharge aperture of a slit coating device (dry film redissolvability), and which has favorable solubility in a developer liquid and excellent developability, and with which generation of development residue is suppressed.

Furthermore, it is possible to provide a high-quality color filter having a colored pattern formed using the photocurable composition, and a liquid crystal display device which has the color filter, and which has excellent color reproducibility and high contrast, and a solid-state image pickup device which has the color filter, and which has high resolution, and in which color unevenness is small.

BEST EMBODIMENT FOR CARRYING OUT THE INVENTION

Hereinafter, the pigment-dispersed composition, the colored photosensitive composition, the photocurable composition, the color filter, the liquid crystal display device, and the solid-state image pickup device of the invention are described in detail below.

Pigment-Dispersed Composition of First Embodiment

The pigment-dispersed composition of the first embodiment of the invention includes a (a) high-molecular compound containing at least one kind of repeating unit selected from repeating units represented by the following Formula (I) or (II), (b) a pigment, and (c) an organic solvent.

Hereinafter, the (a) high-molecular compound, the (b) pigment, and the (c) organic solvent in the pigment-dispersed composition of the first embodiment are described.

[(a) High-Molecular Compound Containing at Least One Kind of Repeating Unit Selected from Repeating Units Represented by Formula (I) or (II)]

The pigment-dispersed composition of the first embodiment includes a high-molecular compound containing at least one kind of repeating unit selected from repeating units represented by Formula (I) or (II) described below (hereinafter sometimes referred to as "specific polymer.").

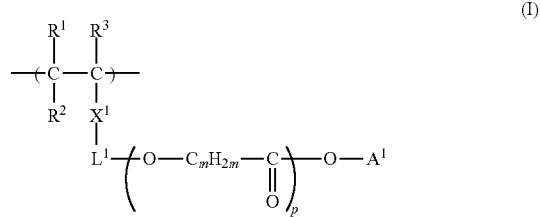

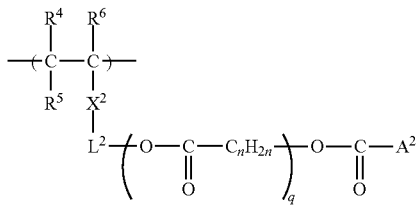

In Formulae (I) and (II), $R^1$ to $R^6$ each independently represent a hydrogen atom or a monovalent organic group; $X^1$ and $X^2$ each independently represent —CO—, —C(=O)O—, —CONH—, —OC(=O)— or a phenylene group; $L^1$ and $L^2$ each independently represent a single bond or a divalent organic linking group; $A^1$ and $A^2$ each independently represent a monovalent organic group; m and n each independently represent an integer of from 2 to 8; and p and q each independently represent an integer of from 1 to 100.

$R^1$ to $R^6$ each independently represent a hydrogen atom or a monovalent organic group. The monovalent organic group is preferably a substituted or unsubstituted alkyl group. The alkyl group is preferably a C1-C12 alkyl group, more preferably a C1-C8 alkyl group, and particularly preferably a C1-C4 alkyl group.

When the alkyl group has a substituent, examples of the substituent include a hydroxy group, an alkoxy group (having preferably from 1 to 5 carbon atoms, more preferably from 1 to 3 carbon atoms), a methoxy group, an ethoxy group, and a cyclohexyloxy group.

Specific examples of preferable alkyl groups include a methyl group, an ethyl group, a propyl group, an n-butyl group, an i-butyl group, a t-butyl group, an n-hexyl group, a cyclohexyl group, a 2-hydroxyethyl group, a 3-hydroxypropyl group, a 2-hydroxypropyl group, and a 2-methoxyethyl group.

$R^1$, $R^2$, $R^4$ and $R^5$ are each preferably a hydrogen atom, and $R^3$ and $R^6$ are each most preferably a hydrogen atom or a methyl group from the viewpoint of efficiency of adsorption onto pigment surface.

$X^1$ and $X^2$ each independently represent —CO—, —C(=O)O—, —CONH—, —OC(=O)— or a phenylene group. Among them, —C(=O)O—, —CONH—, and a phenylene group are preferable from the viewpoint of adsorptivity onto the pigment, and —C(=O)O— is most preferable.

$L^1$ and $L^2$ each independently represent a single bond or a divalent organic linking group. The divalent organic linking group is preferably a substituted or unsubstituted alkylene group, or a divalent organic linking group composed of the alkylene group and a heteroatom, or a divalent organic linking group composed of the alkylene group and a heteroatom-containing partial structure. Here, the alkylene group is preferably a C1-C12 alkylene group, more preferably a C1-C8 alkylene group, and particularly preferably a C1-C4 alkylene group. Examples of a heteroatom in the heteroatom-containing partial structure include an oxygen atom, a nitrogen atom, and a sulfur atom. Among them, the heteroatom is preferably an oxygen atom or a nitrogen atom.

Specific examples of preferable alkylene groups include a methylene group, an ethylene group, a propylene group, a trimethylene group, and a tetramethylene group.

When the alkylene group has a substituent, examples of the substituent include a hydroxy group.

It is preferable, from the viewpoint of adsorptivity onto the pigment, that the divalent organic linking group has a heteroatom or heteroatom-containing partial structure selected from —C(=O)—, —OC(=O)—, or —NHC(=O)— at a terminal of the alkylene group, and is linked to an adjacent oxygen atom via the heteroatom or heteroatom-containing partial structure. Here, the adjacent oxygen atom means the oxygen atom that binds to the side chain terminal side of $L^1$ (in the case of Formula (I)) or $L^2$ (in the case of Formula (II)).

$A^1$ and $A^2$ each independently represent a monovalent organic group. The monovalent organic group is preferably a substituted or unsubstituted alkyl group, or a substituted or unsubstituted aryl group.

Preferable examples of the alkyl group include C1-C20 linear, branched, or cyclic alkyl groups. Specific examples thereof include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a s-butyl group, a t-butyl group, an isopentyl group, a neopentyl group, a 1-methylbutyl group, an isohexyl group, a 2-ethylhexyl group, a 2-methylhexyl group, a cyclohexyl group, a cyclopentyl group and a 2-norbornyl group.

The substituent of the substituted alkyl group is a monovalent group, except for hydrogen, that is composed of a nonmetallic atomic group. Preferable examples thereof include a halogen atom (—F, —Br, —Cl, —I), a hydroxyl group, an alkoxy group, an aryloxy group, a mercapto group, an alkylthio group, an arylthio group, an alkyldithio group, an aryldithio group, an amino group, an N-alkylamino group, an N,N-dialkylamino group, an N-arylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acyloxy group, an acylthio group, an acylamino group, an N-alkylacylamino group, an N-arylacylamino group, a ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsulfinyl group, an arylsulfinyl group, an alkylsulfonyl group, an arylsulfonyl group, a sulfo group (—$SO_3H$) and a conjugate base group thereof (hereinafter referred to as a sulfonato group), an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, a phosphono group (—$PO_3H_2$) and a conjugate base group thereof (hereinafter referred to as a phosphonato group), a dialkylphosphono group (—PO$_3$(alkyl)$_2$), a diarylphosphono group (—PO$_3$(aryl)$_2$), an alkylarylphosphono group (—PO$_3$(alkyl)(aryl)), a monoalkylphosphono group (—PO$_3$H(alkyl)) and a conjugate base group thereof (hereinafter referred to as an alkylphosphonato group), a monoarylphosphono group (—PO$_3$H(aryl)) and a conjugate base group thereof (hereinafter referred to as an arylphosphonato group), a phosphonooxy group (—OPO$_3$H$_2$) and a conjugate base group thereof (hereinafter referred to as phosphonatooxy group), a dialkylphosphonooxy group (—OPO$_3$(alkyl)$_2$), a diarylphosphonooxy group (—OPO$_3$(aryl)$_2$), an alkylarylphosphonooxy group (—OPO$_3$(alkyl)(aryl)), a monoalkylphosphonooxy group (—OPO$_3$H(alkyl)) and a conjugate base group thereof (hereinafter referred to as an alkylphosphonatooxy group), a monoarylphosphonooxy group (—OPO$_3$H(aryl)) and a conjugate base group thereof (hereinafter referred to as an arylphosphonatooxy group), a cyano group, a nitro group, an aryl group, a heteroaryl group, an alkenyl group, an alkynyl group, and a silyl group.

Specific examples of alkyl groups in these substituents include the alkyl groups described above, which may further have a substituent.

The substituent is preferably an alkoxy group, an aryloxy group, an alkylthio group, an arylthio group, an N,N-dialkylamino group, an N,N-diarylamino group, an N-alkyl-N-arylamino group, an acyloxy group, an aryl group, a heteroaryl group, an alkenyl group, an alkynyl group or a silyl group, from the viewpoint of dispersion stability.

Specific examples of the aryl group include a phenyl group, a biphenyl group, a naphthyl group, a tolyl group, a xylyl group, a mesityl group, a cumenyl group, a chlorophenyl group, a bromophenyl group, a chloromethylphenyl group, a hydroxyphenyl group, a methoxyphenyl group, an ethoxyphenyl group, a phenoxyphenyl group, an acetoxyphenyl group, a benzoyloxyphenyl group, a methylthiophenyl group, a phenylthiophenyl group, a methylaminophenyl group, a dimethylaminophenyl group, an acetylaminophenyl group, a carboxyphenyl group, a methoxycarbonylphenyl group, an ethoxyphenylcarbonyl group, a phenoxycarbonylphenyl group, an N-phenylcarbamoylphenyl group, a phenyl group, a cyanophenyl group, a sulfophenyl group, a sulfonatophenyl group, a phosphonophenyl group, and a phosphonatophenyl group.

$A^1$ and $A^2$ are each preferably a C1-C20 linear, C3-C20 branched, or C5-C20 cyclic alkyl group, more preferably a C4-C15 linear, C4-C15 branched, or C6-C10 cyclic alkyl group, and further preferably a C6-C10 linear or C6-C12 branched alkyl group, from the viewpoints of dispersion stability and developability.

m and n each independently represent an integer of from 2 to 8. m and n are each preferably from 4 to 6, and most preferably 5, from the viewpoints of dispersion stability and developability.

p and q each independently represent an integer of from 1 to 100. Two or more kinds of structural units that differ from each other with respect top and/or q may be mixed. Each of p and q is preferably from 5 to 60, more preferably from 5 to 40, and still more preferably from 5 to 20, from the viewpoints of dispersion stability and developability.

The specific polymer according to the first embodiment preferably includes a repeating unit represented by the formula (I) from the viewpoint of dispersion stability.

The repeating unit represented by Formula (I) is more preferably a repeating unit represented by Formula (I)-2 described below.

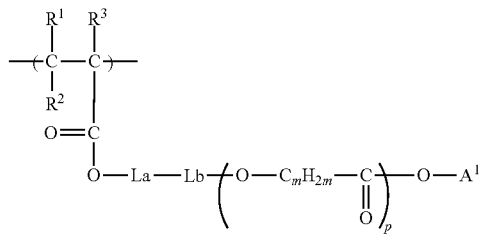

(I)-2

In Formula (I)-2, $R^1$ to $R^3$ each independently represent a hydrogen atom or a monovalent organic group; La represents a C2-C10 alkylene group; Lb represents —C(=O)— or —NHC(=O)—; $A^1$ represents a monovalent organic group; m represents an integer of from 2 to 8; and p represents an integer of from 1 to 100.

The repeating unit represented by Formula (I), (II), or (I)-2 is introduced, as a repeating unit of the high-molecular compound, by polymerization or copolymerization of a monomer represented by the following Formula (i), (ii), or (i)-2.

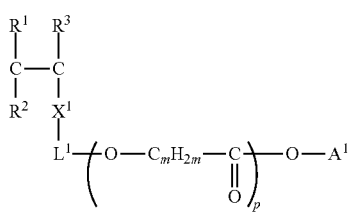

(i)

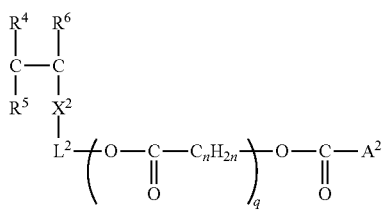

(ii)

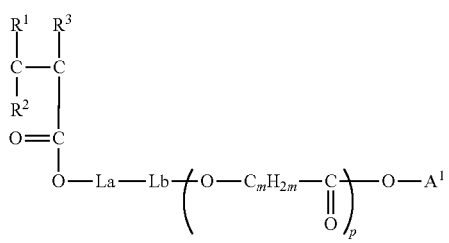

(i)-2

In Formulae (i), (ii), and (i)-2, $R^1$ to $R^6$ each independently represent a hydrogen atom or a monovalent organic group; $X^1$ and $X^2$ each independently represent —CO—, —C(=O)O—, —CONH—, —OC(=O)— or a phenylene group; $L^1$ and $L^2$ each independently represent a single bond or a divalent organic linking group; La represents a C2-C10 alkylene group; Lb represents —C(=O)— or —NHC(=O)—; $A^1$ and $A^2$ each independently represent a monovalent organic group; m and n each independently represent an integer of from 2 to 8; and p and q each independently represent an integer of from 1 to 100.

Specific preferable examples of monomers represented by Formula (i), (ii), or (i)-2 are shown below (monomers (A-1) to (A-23)). However, the first embodiment is not limited thereto.

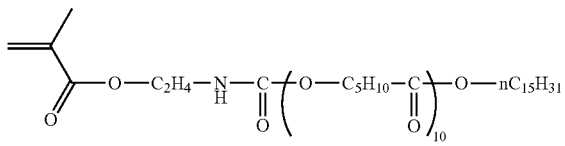
(A-1)
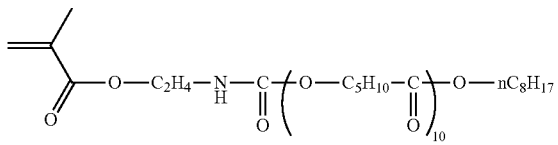
(A-2)
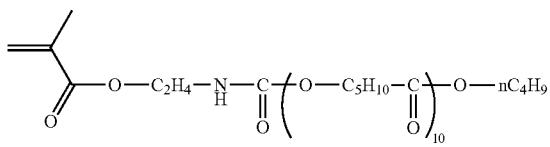
(A-3)
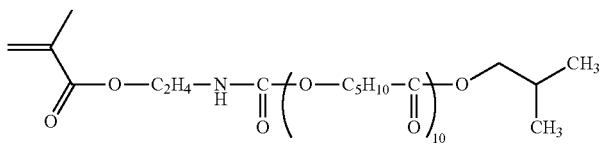
(A-4)
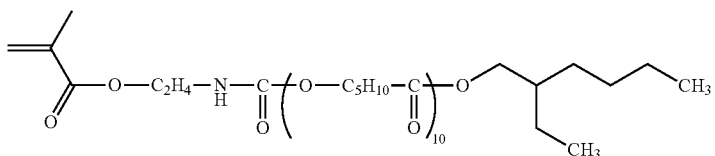
(A-5)
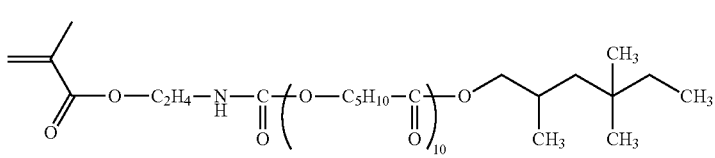
(A-6)
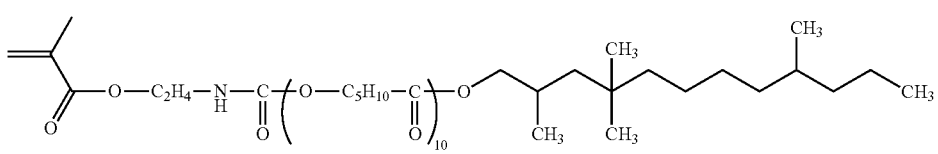
(A-7)
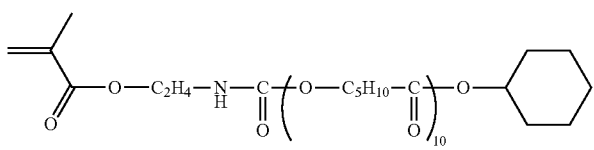
(A-8)
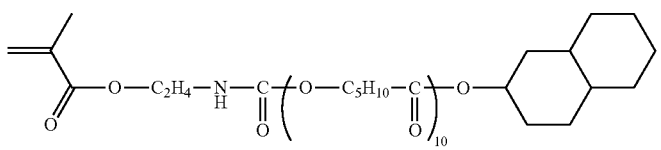
(A-9)
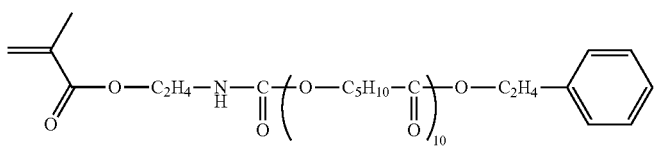
(A-10)

-continued
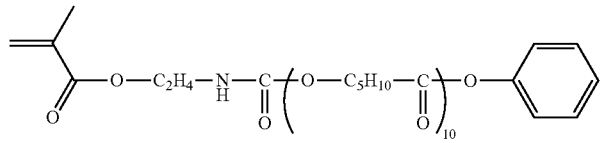
(A-11)
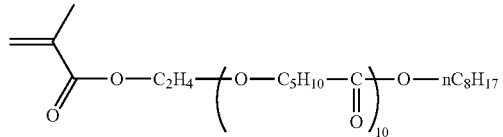
(A-12)
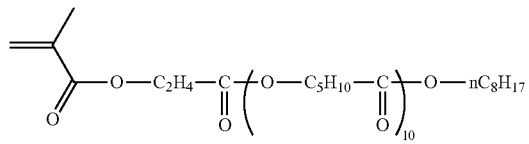
(A-13)
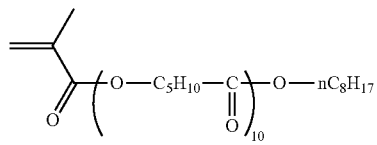
(A-14)
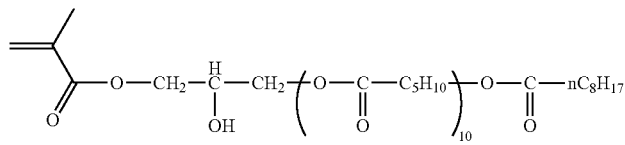
(A-15)
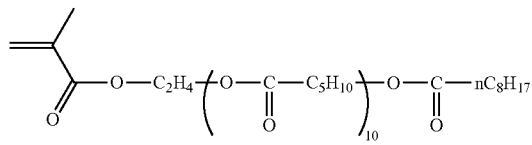
(A-16)
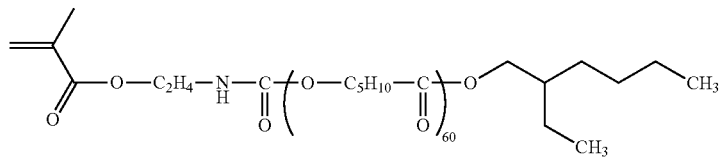
(A-17)
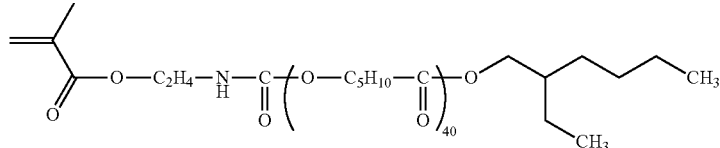
(A-18)
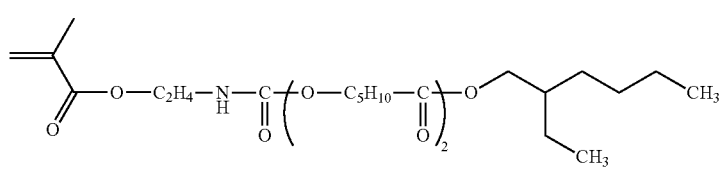
(A-19)
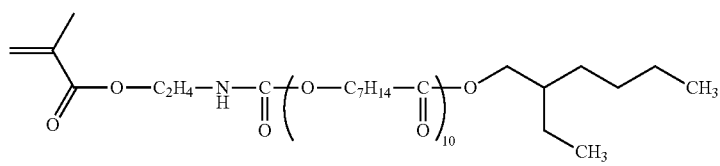
(A-20)

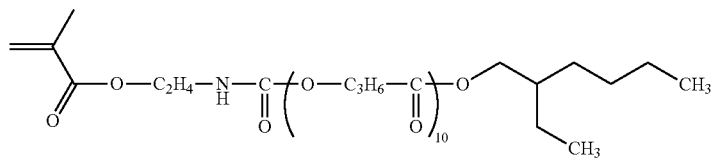

(A-21)

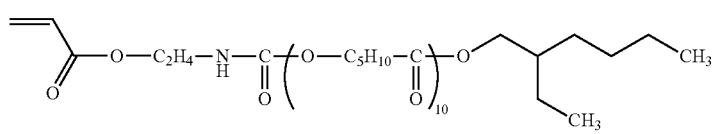

(A-22)

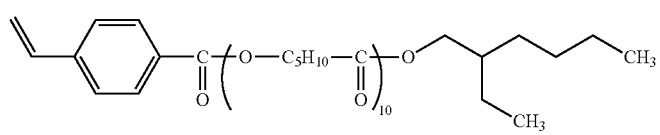

(A-23)

The specific polymer according to the first embodiment contains at least one kind of repeating unit selected from the repeating units each represented by Formula (I) or (II), and the specific polymer may contain only one kind of repeating unit represented by Formula (I) or (II), or may contain two or more kinds of repeating unit represented by Formula (I) or (II).

The content of repeating units each represented by Formula (I) or (II) in the specific polymer is not particularly limited. However, the content of repeating units each represented by Formula (I) or (II) is preferably 5% by mass or higher, more preferably 50% by mass, and further preferably from 50% by mass to 80% by mass, assuming that the total amount of repeating units contained in the polymer is 100% by mass.

The specific polymer according to the first embodiment is preferably a high-molecular compound formed by copolymerization of at least one monomer having a functional group capable of being adsorbed on the pigment and at least one monomer represented by Formula (i), (ii), or (i)-2 described above, for the purpose of enhancing adsorption onto the pigment.

Specific examples of the monomer having a functional group capable of being adsorbed onto the pigment include a monomer having an organic dye structure or a heterocyclic structure, a monomer having an acidic group, a monomer having a basic nitrogen atom, and a monomer having an ionic group. Among them, a monomer having an organic dye structure or a heterocyclic structure is preferable in terms of adsorption force onto the pigment.

The monomer having an organic dye structure or a heterocyclic structure is preferably one kind selected from the group consisting of a monomer represented by Formula (1) shown below, maleimide, and a maleimide derivative. Among them, the monomer having an organic dye structure or a heterocyclic structure is particularly preferably a monomer represented by Formula (1) shown below.

Formula (1)

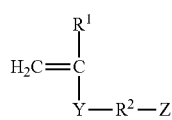

In Formula (1), $R^1$ represents a hydrogen atom or an alkyl group. $R^2$ represents a single bond or a divalent linking group. Y represents —CO—, —C(=O)O—, —CONH—, —OC(=O)— or a phenylene group. Z represents a group that has a nitrogen-containing heterocyclic group.

The alkyl group represented by $R^1$ in Formula (1) is preferably a C1-C12 alkyl group, more preferably a C1-C8 alkyl group, and particularly preferably a C1-C4 alkyl group.

When the alkyl group represented by $R^1$ has a substituent, the substituent is preferably, for example, a hydroxy group, or an alkoxy group such as a methoxy group, an ethoxy group, or a cyclohexyloxy group. The alkoxy group is preferably a C1-C5 alkoxy group, and more preferably a C1-C3 alkoxy group.

Preferable examples of the alkyl group represented by $R^1$ in Formula (1) include a methyl group, an ethyl group, a propyl group, an n-butyl group, an i-butyl group, a t-butyl group, an n-hexyl group, a cyclohexyl group, a 2-hydroxyethyl group, a 3-hydroxypropyl group, a 2-hydroxypropyl group and a 2-methoxyethyl group.

Among them, $R^1$ is most preferably a hydrogen atom or a methyl group.

The divalent linking group represented by $R^2$ in Formula (1) is preferably an alkylene group, or a divalent group containing an alkylene group. The alkylene group may be a substituted alkylene group or an unsubstituted alkylene group. The alkylene group is preferably a C1-C12 alkylene group, more preferably a C1-C8 alkylene group, and still more preferably a C1-C4 alkylene group.

When the alkylene group has a substituent, examples of the substituent include a hydroxy group.

Specific preferable examples of the alkylene group represented by $R^2$ include a methylene group, an ethylene group, a propylene group, a trimethylene group, and a tetramethylene group.

The divalent group containing an alkylene group and represented by $R^2$ in Formula (1) may be a divalent group composed of two or more of the alkylene group that are linked to each other via at least one heteroatom (for example, an oxygen atom, a nitrogen atom or a sulfur atom).

Further, the divalent group containing an alkylene group represented by $R^2$ may be a divalent group composed of the alkylene group and a heteroatom or heteroatom-containing partial structure that is selected from —O—, —S—, —C(=O)O—, —CONH—, —C(=O)S—, —NHCONH—, —NHC(=O)O—, —NHC(=O)S—, —OC(=O)—, —OCONH— and —NHCO— and that binds to a terminal of the alkylene group at a side bonded to Z.

Specific examples of the nitrogen-containing heterocyclic structure of the nitrogen-containing heterocyclic group represented by Z in Formula (1) those having, for example, a pyridine ring, a pyrazine ring, a pyrimidine ring, a pyrrole ring, an imidazole ring, a triazole ring, a tetrazole ring, an indole ring, an quinoline ring, an acridine ring, a phenothiazine ring, a phenoxazine ring, an acridone ring, an anthraquinone ring, a benzimidazole structure, a benzotriazole structure, a benzothiazole structure, a cyclic amide structure, a cyclic urea structure, or a cyclic imide structure. Examples of the nitrogen-containing heterocyclic structure include: phthalocyanine-based, insoluble azo-based, azolake-based, anthraquinone-based, quinacridone-based, dioxazine-based, diketopyrrolopyrrole-based, anthrapyridine-based, anthanthrone-based, indanthrone-based, flavanthrone-based, perinone-based, perylene-based and thioindigo-based dye structures; and a heterocyclic structure selected from, for example, thiophene, furan, xanthene, pyrrole, pyrroline, pyrrolidine, dioxolane, pyrazole, pyrazoline, pyrazolidine, imidazole, oxazole, thiazole, oxadiazole, triazole, thiadiazole, pyran, pyridine, piperidine, dioxane, morpholine, pyridazine, pyrimidine, piperazine, triazine, trithiane, isoindoline, isoindolinone, benzimidazolone, benzothiazole, succinimide, phthalimide, naphthalimide, hydantoin, indole, quinoline, carbazole, acridine, acridone, anthraquinone, pyrazine, tetrazole, phenothiazine, phenoxazine, benzimidazole, benzotriazole, cyclic amide, cyclic urea, or cyclic imide.

These nitrogen-containing heterocyclic structures may have a substituent, and examples of the substituent include an alkyl group, an alkoxy group, a halogen atom, an aliphatic ester group, an aromatic ester group, and an alkoxycarbonyl group.

Among them, the nitrogen-containing heterocyclic group represented by Z is more preferably a group having a nitrogen-containing heterocyclic structure having 6 or more carbon atoms, and particularly preferably a group having the nitrogen-containing heterocyclic structure having from 6 to 12 carbon atoms.

The nitrogen-containing heterocyclic structure having 6 or more carbon atoms is specifically preferably a phenothiazine ring, a phenoxazine ring, an acridone ring, an anthraquinone ring, a benzimidazole structure, a benzotriazole structure, a benzothiazole structure, a cyclic amide structure, a cyclic urea structure, and a cyclic imide structure, and particularly preferably the structure represented by Formula (2), (3), or (4) described below.

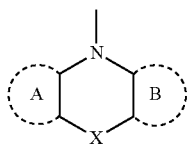

Formula (2)

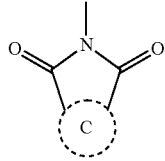

Formula (3)

Formula (4)

In Formula (2), X is selected from the group consisting of a single bond, an alkylene group (such as a methylene group, an ethylene group, a propylene group, a trimethylene group, or a tetramethylene group), —O—, —S—, —NR$^A$—, and —C(=O)—. Here, R$^A$ represents a hydrogen atom or an alkyl group. When R$^A$ represents an alkyl group, the alkyl group is preferably a C1-C18 alkyl group, and more preferably a C1-C6 alkyl group; examples thereof include a methyl group, an ethyl group, an n-propyl group, an i-propyl group, an n-butyl group, a t-butyl group, an n-hexyl group, an n-octyl group, a 2-ethylhexyl group, and an n-octadecyl group.

Among those described above, X in Formula (2) is preferably a single bond, a methylene group, —O—, or —C(=O)—, and particularly preferably —C(=O)—.

In Formula (4), Y and Z each independently represent —N=, —NH—, —N(R$^B$)—, —S—, or —O—. R$^B$ represents an alkyl group. The alkyl group is preferably a C1-C18 alkyl group, and more preferably a C1-C6 alkyl group, and examples of the alkyl group include a methyl group, an ethyl group, an n-propyl group, an i-propyl group, an n-butyl group, a t-butyl group, an n-hexyl group, an n-octyl group, a 2-ethylhexyl group, and an n-octadecyl group.

Among those described above, Y and Z in Formula (4) are each particularly preferably —N=, —NH— or —N(R$^B$)—. A combination of Y and Z is preferably a combination (an imidazolyl group) in which one of Y and Z is —N= and the other is —NH—.

In Formula (2), (3), or (4), ring A, ring B, ring C and ring D each independently represent an aromatic ring. Examples of the aromatic ring include a benzene ring, a naphthalene ring, an indene ring, an azulene ring, a fluorene ring, an anthracene ring, a pyridine ring, a pyrazine ring, a pyrimidine ring, a pyrrole ring, an imidazole ring, an indole ring, an quinoline ring, an acridine ring, a phenothiazine ring, a phenoxazine ring, an acridone ring, and an anthraquinone ring. Among them, the aromatic ring is preferably a benzene ring, a naphthalene ring, an anthracene ring, a pyridine ring, a phenoxazine ring, an acridine ring, a phenothiazine ring, a phenoxazine ring, an acridone ring or an anthraquinone ring, and particularly preferably a benzene ring, a naphthalene ring or a pyridine ring.

Specifically, examples of ring A and ring B in Formula (2) include a benzene ring, a naphthalene ring, a pyridine ring, and a pyrazine ring.

Examples of ring C in Formula (3) include a benzene ring, a naphthalene ring, a pyridine ring, and a pyrazine ring.

Examples of ring D in Formula (4) include a benzene ring, a naphthalene ring, a pyridine ring, and a pyrazine ring.

In the structure represented by Formula (2), (3) or (4), the aromatic ring is more preferably a benzene ring or a naphthalene ring from the viewpoint of dispersibility and the stability of the dispersion liquid over time; the aromatic ring in Formula (2) or (4) is more preferably a benzene ring; and the aromatic ring in Formula (3) is more preferably a naphthalene ring.

The maleimide derivative as used in the first embodiment means a maleimide in which the N position is substituted by a substituent such as an alkyl group or an aryl group.

Specific preferable examples of the monomer represented by Formula (1), the maleimide and the maleimide derivative are shown below (the monomers M-1 to M-33). However, the first embodiment is not limited thereto.

M-1
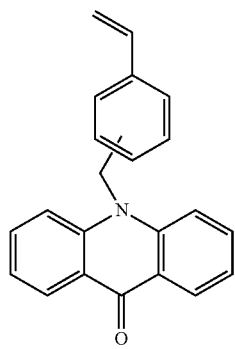

M-2
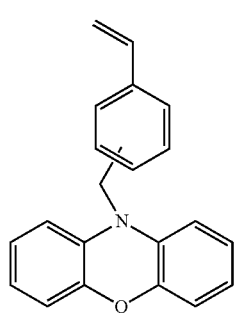

M-3
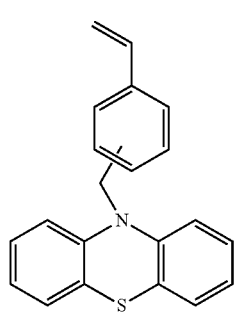

M-4
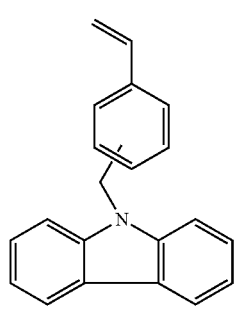

M-5
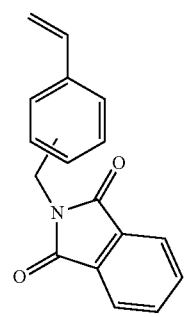

M-6
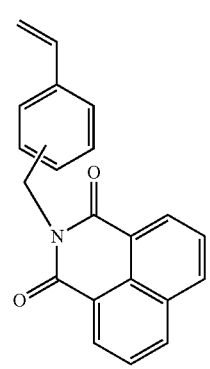

M-7
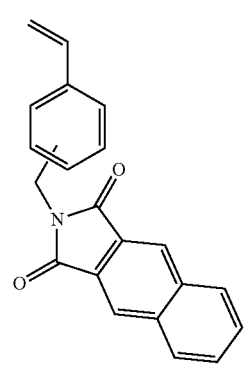

M-8
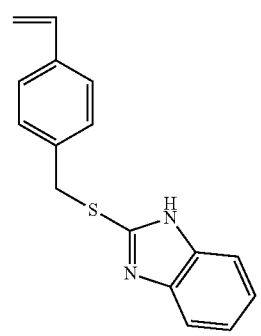

M-9
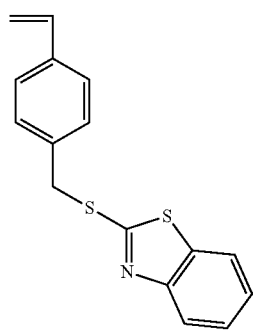
M-10
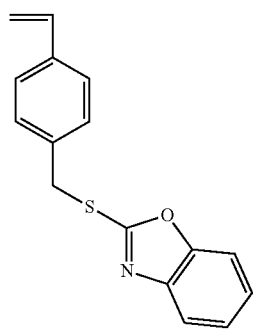
M-11
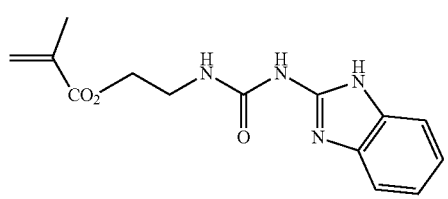
M-12
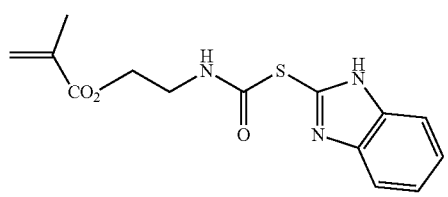
M-13
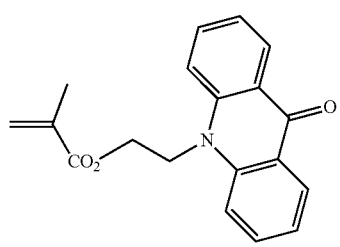
M-14
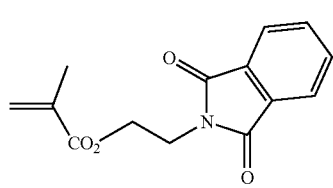
M-15
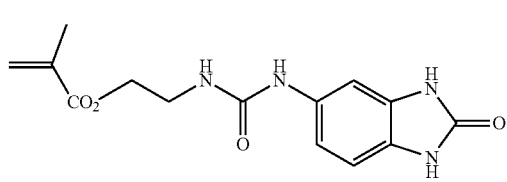
M-16
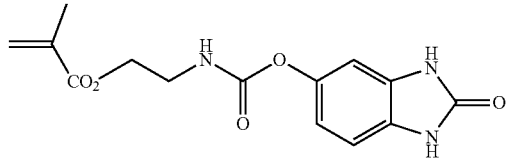
M-17
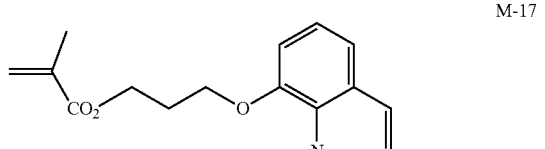
M-18
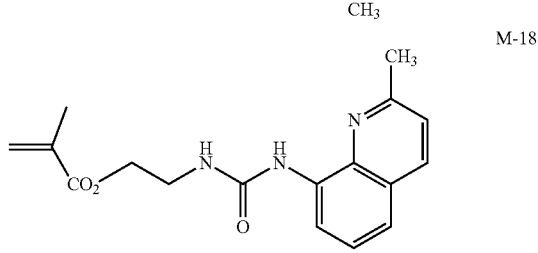
M-19
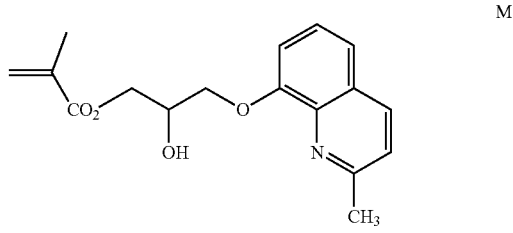
M-20
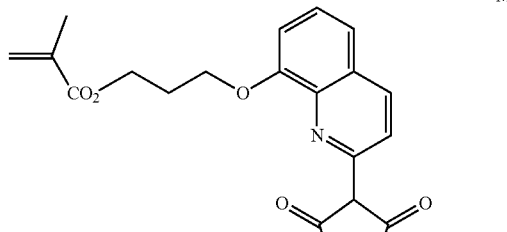
M-21
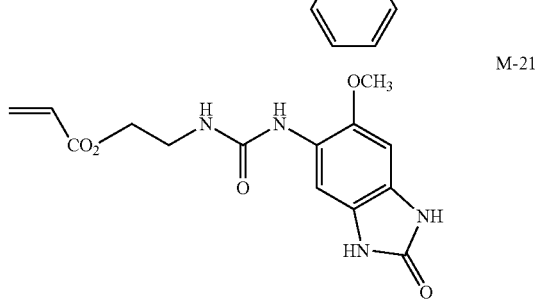

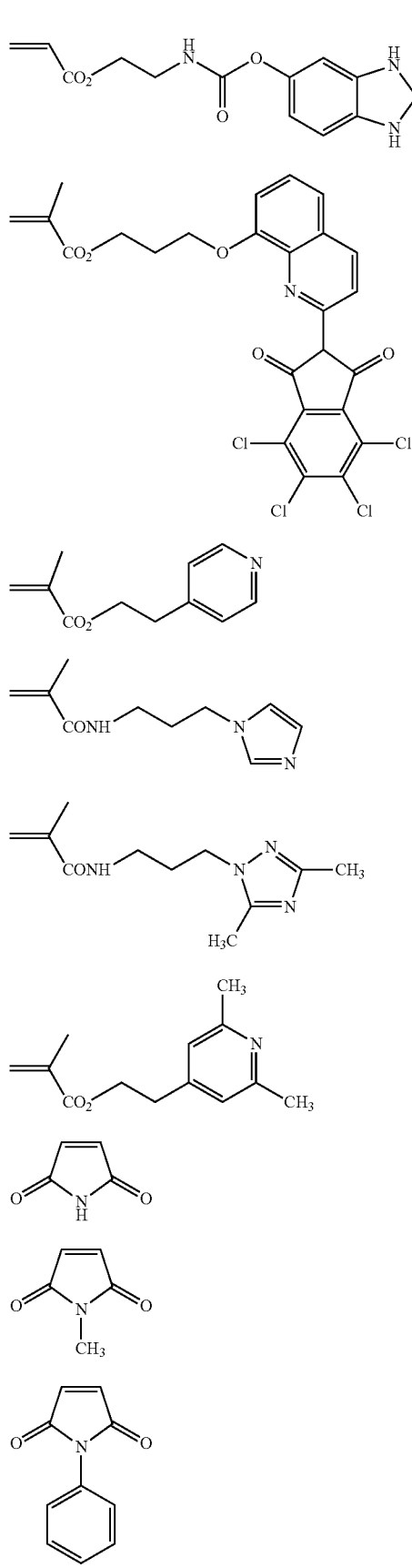

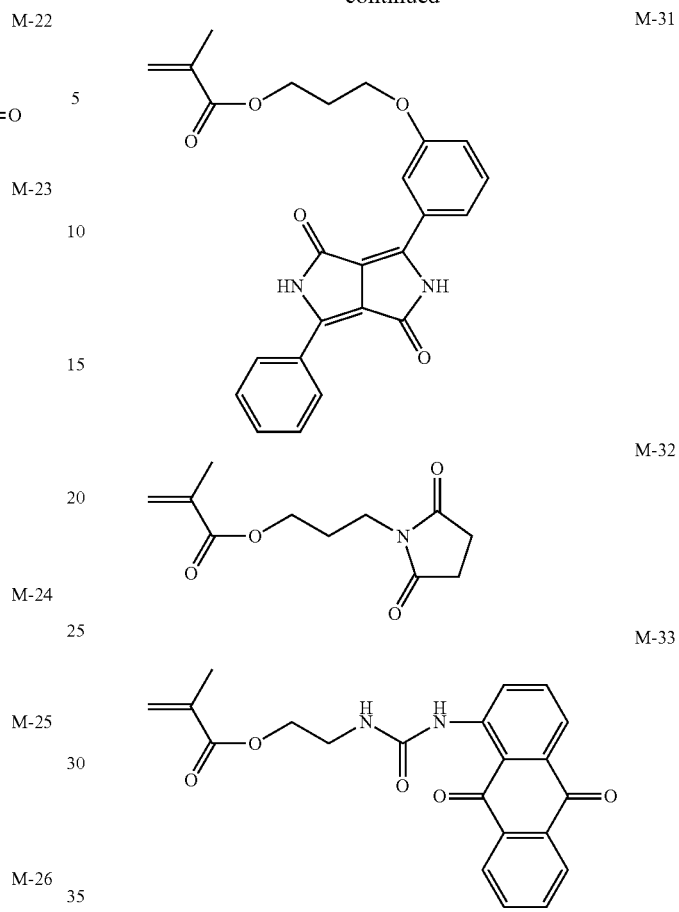

The specific polymer according to the first embodiment may contain one kind of repeating unit derived from a monomer selected from the group consisting of a monomer represented by Formula (1), maleimide, or may contain two or more kinds thereof.

The content of repeating units each derived from a monomer selected from the group consisting of a monomer represented by Formula (1), maleimide, and a maleimide derivative in the specific polymer according to the first embodiment is preferably 5% by mass or higher, and more preferably from 10% by mass to 50% by mass, assuming that the total amount of repeating units contained in the polymer is 100% by mass.

Specifically, the content of polymerization units each derived from a monomer selected from the group consisting of a monomer represented by Formula (1), maleimide, and a maleimide derivative is preferably 5% by mass or higher, from the viewpoint of effectively suppressing generation of secondary aggregates, which are aggregates of pigment primary particles, or effectively reducing the aggregation force in the secondary aggregates. The content of polymerization units each derived from a monomer selected from the group consisting of a monomer represented by Formula (1), maleimide, and a maleimide derivative is preferably 50% by mass or lower from the viewpoint of developability in production of a color filter using the colored photosensitive composition containing the pigment-dispersed composition.

Examples of the monomer having an acidic group include a vinyl monomer having a carboxyl group and a vinyl monomer having a sulfonic acid group.

Examples of the vinyl monomer having a carboxyl group include (meth)acrylic acid, vinylbenzoic acid, maleic acid, a monoalkyl maleate, fumaric acid, itaconic acid, crotonic acid, cinnamic acid, and acrylic acid dimer. Examples of the vinyl monomer having a carboxyl group further include: an addition reaction product of a monomer having a hydroxyl group such as 2-hydroxyethyl(meth)acrylate, with a cyclic anhydride such as maleic anhydride, phthalic anhydride, or cyclohexane dicarboxylic acid anhydride; and ω-carboxy-polycaprolactone mono(meth)acrylate. It is also permissible to use, as a precursor of a carboxyl group, an anhydride-containing monomer such as maleic anhydride, itaconic anhydride, or citraconic anhydride. Among those described above, (meth) acrylic acid is particularly preferable from the viewpoint of copolymerizability, cost, and solubility.

Examples of vinyl monomers having a sulfonic acid group include 2-acrylamide-2-methylpropanesulfonic acid, and examples of vinyl monomers having a phosphoric acid group include mono(2-acryloyloxyethyl)phosphate and mono(1-methyl-2-acryloyloxyethyl)phosphate.

The specific polymer according to the first embodiment preferably contains a repeating unit derived from a monomer having an acidic group such as those described above. Inclusion of such a repeating unit provides excellent removability of unexposed portions by development, in a case in which the pigment-dispersed composition of the first embodiment is applied to a colored photosensitive composition.

The specific polymer according to the first embodiment may contain one kind of repeating unit derived from a monomer having an acidic group, or may contain two or more kinds thereof.

The content of repeating units derived from monomers having an acidic group in the specific polymer is preferably 50 mgKOH/g or higher, and particularly preferably from 50 mgKOH/g to 200 mgKOH/g. Specifically, the content of repeating units derived from monomers having an acidic group is preferably 50 mgKOH/g or higher from the viewpoint of suppressing generation of a precipitate in the developer liquid. The content of repeating units derived from monomers having an acidic group is preferably from 50 mgKOH/g to 200 mgKOH/g from the viewpoint of effectively suppressing generation of secondary aggregates, which are aggregates of pigment primary particles, or effectively reducing the aggregation force in the secondary aggregates.

Examples of the monomer having a basic nitrogen atom include, as (meth)acrylic esters, N,N-dimethylaminoethyl (meth)acrylate, N,N-dimethylaminopropyl(meth)acrylate, 1-(N,N-dimethylamino)-1,1-dimethylmethyl(meth)acrylate, N,N-dimethylaminohexyl(meth)acrylate, N,N-diethylaminoethyl(meth)acrylate, N,N-diisopropylaminoethyl(meth) acrylate, N,N-di-n-butylaminoethyl(meth)acrylate, N,N-di-i-butylaminoethyl(meth)acrylate, morpholinoethyl(meth) acrylate, piperidinoethyl(meth)acrylate, 1-pyrrolidinoethyl (meth)acrylate, N,N-methyl-2-pyrrolidylaminoethyl(meth) acrylate, and N,N-methylphenylaminoethyl(meth)acrylate; as (meth)acrylamides, N—(N',N'-dimethylaminoethyl)acrylamide, N—(N',N'-dimethylaminoethyl)methacrylamide, N—(N',N'-diethylaminoethyl)acrylamide, N—(N',N'-diethylaminoethyl)methacrylamide, N—(N',N'-dimethylaminopropyl)acrylamide, N—(N',N'-dimethylaminopropyl) methacrylamide, N—(N',N'-diethylaminopropyl) acrylamide, N—(N',N'-diethylaminopropyl) methacrylamide, 2-(N,N-dimethylamino)ethyl(meth) acrylamide, 2-(N,N-diethylamino)ethyl(meth)acrylamide, 3-(N,N-diethylamino)propyl(meth)acrylamide, 3-(N,N-dimethylamino)propyl(meth)acrylamide, 1-(N,N-dimethylamino)-1,1-dimethylmethyl(meth)acrylamide, 6-(N,N-diethylamino)hexyl(meth)acrylamide, morpholino(meth) acrylamide, piperidino(meth)acrylamide, and N-methyl-2-pyrrolidyl(meth)acrylamide; as styrenic compounds, N,N-dimethylamino styrene and N,N-dimethylaminomethyl styrene.

Examples of monomers that can be used further include a monomer having a urea group, a urethane group, a hydrocarbon group having 4 or more carbon atoms and having a coordinating oxygen atom, an alkoxysilyl group, an epoxy group, an isocyanate group or a hydroxyl group. Specific examples of the monomer include monomers having the following structures.

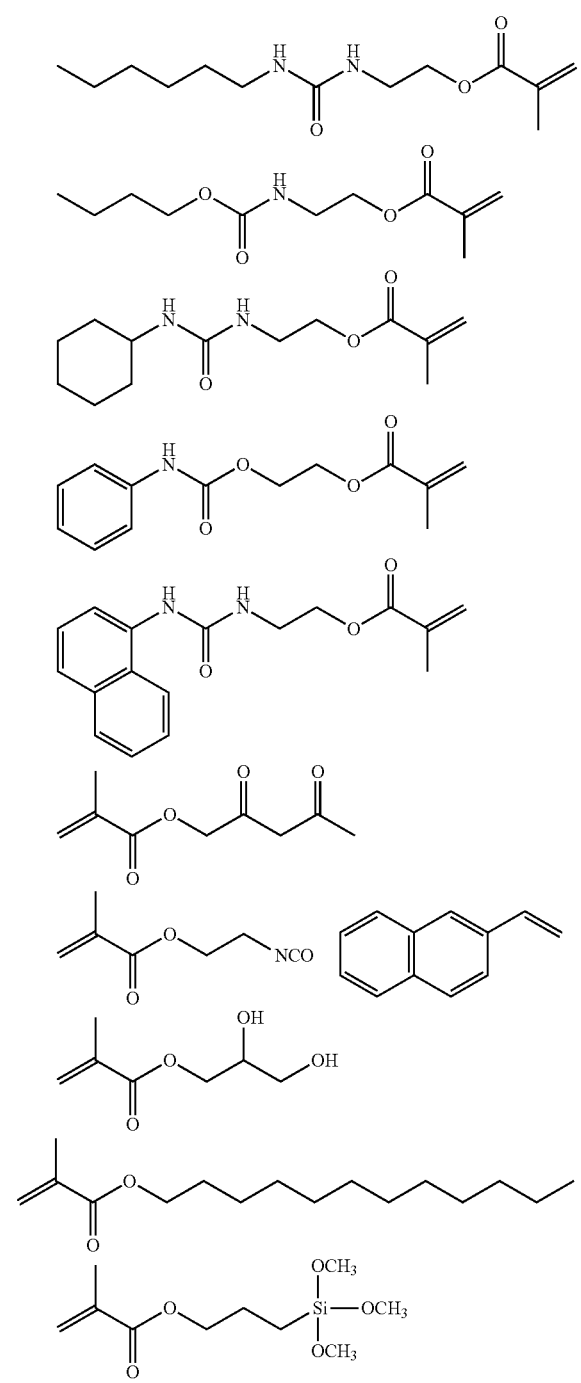

-continued

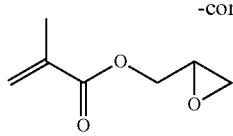

Examples of the monomer having an ionic group include a vinyl monomer having an ionic group (anionic vinyl monomer or cationic vinyl monomer). Examples of the anionic vinyl monomer include an alkali metal salt of the vinyl monomer having an acidic group, and a salt of the vinyl monomer having an acidic group with an organic amine (for example, a tertiary amine such as triethylamine or dimethylamino ethanol). Examples of the cationic vinyl monomer include: a monomer obtained by quaternarizing the nitrogen-containing vinyl monomer with an alkyl halide (alkyl group: C1-C18, halogen atom: a chlorine atom, a bromine atom or an iodine atom), a benzyl halide such as benzyl chloride or benzyl bromide, an alkylsulfonic acid ester (alkyl group: C1-C18) such as methanesulfonate, an alkyl ester (alkyl group: C1-C18) of an arylsulfonic acid such as benzene sulfonic acid or toluene sulfonic acid, a dialkyl sulfate (alkyl group: C1-C4), or the like; and a dialkyl diaryl ammonium salt.

The monomer having a functional group capable of being adsorbed onto the pigment may be suitably selected in accordance with the kind of the pigment to be dispersed, and the monomer may be used singly, or in combination of two or more thereof.

The specific polymer according to the first embodiment may further contain a repeating unit derived from a copolymerizable vinyl monomer, within a range in which the effect of the specific polymer is not impaired.

Here, the vinyl monomer that may be used is not particularly limited, and preferable examples thereof include (meth) acrylic esters, crotonic esters, vinyl esters, maleic diesters, fumaric diesters, itaconic diesters, (meth)acrylamides, vinyl ethers, vinyl alcohol esters, styrenes, and (meth)acrylonitrile. Specific examples of the vinyl monomer include the compounds described below. In the specification, the term "(meth)acrylic" is used to mean either of acrylic or methacrylic or both.

Examples of the (meth)acrylic esters include methyl(meth) acrylate, ethyl(meth)acrylate, n-propyl(meth)acrylate, isopropyl(meth)acrylate, n-butyl(meth)acrylate, isobutyl(meth) acrylate, t-butyl(meth)acrylate, n-hexyl(meth)acrylate, cyclohexyl(meth)acrylate, t-butylcyclohexyl(meth)acrylate, 2-ethylhexyl(meth)acrylate, t-octyl(meth)acrylate, dodecyl (meth)acrylate, octadecyl(meth)acrylate, acetoxyethyl (meth)acrylate, phenyl(meth)acrylate, 2-hydroxyethyl(meth) acrylate, 2-methoxyethyl(meth)acrylate, 2-ethoxyethyl (meth)acrylate, 2-(2-methoxyethoxy)ethyl(meth)acrylate, 3-phenoxy-2-hydroxypropyl(meth)acrylate, benzyl(meth) acrylate, diethyleneglycol monomethyl ether(meth)acrylate, diethyleneglycol monoethyl ether(meth)acrylate, triethyleneglycol monomethyl ether(meth)acrylate, triethyleneglycol monoethyl ether(meth)acrylate, polyethyleneglycol monomethyl ether(meth)acrylate, polyethyleneglycol monoethyl ether(meth)acrylate, β-phenoxyethoxyethyl(meth) acrylate, nonylphenoxypolyethyleneglycol(meth)acrylate, dicyclopentenyl(meth)acrylate, dicyclopentenyloxyethyl (meth)acrylate, trifluoroethyl(meth)acrylate, octafluoropentyl(meth)acrylate, perfluorooctylethyl(meth)acrylate, dicyclopentanyl(meth)acrylate, tribromophenyl(meth)acrylate, and tribromophenyloxyethyl(meth)acrylate.

Examples of the crotonic esters include butyl crotonate and hexyl crotonate.

Examples of the vinyl esters include vinyl acetate, vinyl propionate, vinyl butyrate, vinyl methoxyacetate, and vinyl benzoate.

Examples of the maleic diesters include dimethyl maleate, diethyl maleate, and dibutyl maleate.

Examples of the fumaric diesters include dimethyl fumarate, diethyl fumarate, and dibutyl fumarate.

Examples of the itaconic diesters include dimethyl itaconate, diethyl itaconate, and dibutyl itaconate.

Examples of the (meth)acrylamides include (meth)acrylamide, N-methyl(meth)acrylamide, N-ethyl(meth)acrylamide, N-propyl(meth)acrylamide, N-isopropyl(meth)acrylamide, N-n-butyl(meth)acrylamide, N-t-butyl(meth) acrylamide, N-cyclohexyl(meth)acrylamide, N-(2-methoxyethyl)(meth)acrylamide, N,N-dimethyl(meth) acrylamide, N,N-diethyl(meth)acrylamide, N-phenyl(meth) acrylamide, N-benzyl(meth)acrylamide, (meth)acryloyl morpholine, and diacetone acrylamide.

Examples of the vinyl ethers include methyl vinyl ether, butyl vinyl ether, hexyl vinyl ether, and methoxyethyl vinyl ether.

Examples of the styrenic compounds include styrene, methylstyrene, dimethylstyrene, trimethylstyrene, ethylstyrene, isopropylstyrene, butylstyrene, hydroxystyrene, methoxystyrene, butoxystyrene, acetoxystyrene, chlorostyrene, dichlorostyrene, bromostyrene, chloromethylstyrene, hydroxystyrene protected with a group that is capable of deprotecttion by an acidic substance (for example, t-Boc), methyl vinylbenzoate, and α-methylstyrene.

The specific polymer according to the first embodiment is preferably a copolymer of at least a monomer represented by Formula (i), (ii), or (i)-2 and a monomer having an organic dye structure or a heterocyclic structure, and more preferably a copolymer of at least a monomer represented by Formula (i)-2 described above, a monomer represented by Formula (1) described above, and a monomer having an acidic group.

This copolymer exhibits excellent adsorption onto a pigment, and allows provision of a pigment-dispersed composition having excellent developability.

The molecular weight of the specific polymer according to the first embodiment is preferably such that the weight average molecular weight (Mw) is in the range of from 5000 to 100000, and such that the number average molecular weight (Mn) is preferably in the range of from 2500 to 50,000. The molecular weight is more preferably such that the weight average molecular weight (Mw) is in the range of from 10000 to 50000, and such that the number average molecular weight (Mn) is in the range of from 5000 to 30,000.

The molecular weight is most preferably such that the weight average molecular weight (Mw) is in the range of from 10000 to 30000, and such that the number average molecular weight (Mn) is most preferably in the range of from 5000 to 15,000.

Specifically, the weight average molecular weight (Mw) of the specific polymer is preferably 1000 or more from the viewpoint of effectively crumbling secondary aggregates, which are aggregates of pigment primary particles, or effectively inhibiting reaggregation. The weight average molecular weight (Mw) of the specific polymer is preferably 30000 or less in consideration of developability during production of a color filter from the colored photosensitive composition containing the pigment-dispersed composition.

The specific polymer according to the first embodiment may be produced by an ordinary radical polymerization method using, for example, a monomer represented by Formula (i), (ii), or (i)-2 and another radical-polymerizable compound as a copolymerization component (various monomers such as those described above).

A suspension polymerization method, a solution polymerization method, or the like is generally employed. Examples of the solvent used in synthesis of the specific polymer include ethylene dichloride, cyclohexanone, methyl ethyl ketone, acetone, methanol, ethanol, propanol, butanol, ethyleneglycol monomethyl ether, ethyleneglycol monoethyl ether, 2-methoxyethyl acetate, 1-methoxy-2-propanol, 1-methoxy-2-propyl acetate, N,N-dimethyl formamide, N,N-dimethyl acetamide, dimethyl sulfoxide, toluene, ethyl acetate, methyl lactate, and ethyl lactate. The solvent may be used singly, or in mixture of two or more thereof.

In the radical polymerization, a radical polymerization initiator may be used, and furthermore, a chain transfer agent (examples of which include 2-mercaptoethanol and dodecylmercaptan) may be used.

In the pigment-dispersed composition of the first embodiment, the content of the specific polymer in terms of mass ratio is preferably such that pigment:specific polymer=from 1:0.1 to 1:2, more preferably from 1:0.2 to 1:1, and further preferably from 1:0.4 to 1:0.7.

The specific polymer described above may be used together with one or more other high-molecular compounds, if necessary, within a range in which the effect of the first embodiment is not impaired.

Examples of such other high-molecular compounds for use include a natural resin, a modified natural resin, a synthetic resin, a synthetic resin modified with a natural resin, and the like.

A typical example of the natural resin is rosin, and examples of the modified natural resin include a rosin derivative, a cellulose derivative, a rubber derivative, a protein derivative, and oligomers thereof. Examples of the synthetic resin include an epoxy resin, an acrylic resin, a maleic acid resin, a butyral resin, a polyester resin, a melamine resin, a phenol resin, and a polyurethane resin. Examples of the synthetic resin modified with a natural resin include a rosin-modified maleic acid resin and a rosin-modified phenol resin.

Examples of the synthetic resin include polyamidoamines and salts thereof, polycarboxylic acids and salts thereof, esters of high-molecular unsaturated acids, polyurethanes, polyesters, poly(meth)acrylates, (meth)acrylic copolymers, and naphthalenesulfonic acid formalin condensates.

In the following, the second embodiment is specifically described.

The pigment-dispersed composition of the second embodiment is a pigment-dispersed composition including (A) a graft high-molecular polymer compound in which acrylic acid is copolymerized at a proportion of from 5% by mass to 30% by mass in the main chain thereof (hereinafter referred to as the specific graft polymer), (B) a pigment, and (C) an organic solvent. The (A) graft high-molecular polymer compound in which acrylic acid is copolymerized in the main chain thereof may further contain a heterocycle at a side chain, if necessary.

(A) The Graft High-Molecular Polymer Compound in which Acrylic Acid is Copolymerized in the Main Chain Thereof The specific graft polymer used in the second embodiment is not particularly limited as long as it is a graft high-molecular polymer compound that has acrylic acid in the main chain thereof, the content of acrylic acid is 5 to 30% by mass, and the weight average molecular weight thereof is in the range of from 1,000 to 100,000.

The specific graft polymer has a main chain that contains an acrylic acid group in the second embodiment. The specific graft polymer may further contain an acrylic acid group at a branch portion thereof.

Examples of synthesis methods of the specific graft polymer that can be employed include general methods such as (1) a method of polymerizing a branch monomer from a main chain polymer, (2) a method of bonding a branch polymer to a main chain polymer, and (3) a method of copolymerizing a main chain monomer with a branch polymer, as described in Shin Koubunshi Jikkengaku Vol. 2 (KYORITSU SHUPPAN CO., LTD., 1995).

Specifically, a specific graft polymer obtained by copolymerization of acrylic acid, at least one polymerizable oligomer (hereinafter referred to as "macromonomer"), and at least one other copolymerizable monomer may be used in the second embodiment.

The amount of acrylic acid introduced is preferably from 5 to 30% by mass from the viewpoint of dispersibility. In a case in which the amount is more than 30% by mass, the relative amount of the macromonomer to be copolymerized decreases, as a result of which the effect produced by steric repulsion chains decreases, and sufficient dispersion stability is not obtained. In a case in which the amount is less than 5% by mass, the high-molecular compound as a whole does not have sufficient flexibility, and effects in improvement of dispersion stability and developability are less likely to be obtained. The amount of acrylic acid introduced is preferably from 10 to 30% by mass, and most preferably from 10 to 25% by mass, although it depends on the kind, molecular weight and the like of the macromonomer.

A preferable structure of the macromonomer has at least one of a repeating unit represented by Formula (I), a repeating unit represented by Formula (II), or a repeating unit represented by the following Formula (3). Among them, a structure having a repeating unit represented by Formula (I) is most preferable.

(3)

The definitions and preferable ranges of Formulae (I) and (II), including the definition and preferable ranges of each symbol in the Formulae, are the same as in the first embodiment.

A repeating unit represented by Formula (I) is more preferable from the viewpoint of dispersion stability, and a repeating unit represented by Formula (I)-2 is further preferable. The definition and preferable ranges of Formula (I)-2, including the definition and preferable ranges of each symbol in the Formula, are the same as in the first embodiment.

A repeating unit represented by Formula (1), (2), or (1-2) is introduced as a repeating unit of the high-molecular compound by polymerization or copolymerization of a monomer represented by Formula (i), (ii), or (i)-2, respectively. The definition and preferable ranges of Formulae (i), (ii), and (i)-2, including the definition and preferable ranges of each symbol in the Formulae, are the same as in the first embodiment.

The synthesis method thereof may involve, for example, initiation of a ring-opening polymerization by addition of a monocarboxylic acid or monoalcohol to ε-caprolactone.

Preferable specific examples of monomers represented by Formulae (i), (ii), and (i-2) are respectively the same as in the first embodiment. However, the second embodiment is not limited to the preferable specific embodiments.

In Formula (3), $R^7$ represents a hydrogen atom or a C1-C8 alkyl group; W represents a single bond, a single linking group selected from atomic groups respectively represented by an alkylene, an alkenylene, a cycloalkylene, phenylene, ether, thioether, ester, carbonyl, amino, amido, sulfonylamido, and urethane, or a linking group that is an arbitrary combination of two or more of the above linking groups; $A^3$ represents repeating units formed from a radical-polymerizable monomer such as a (meth)acrylic ester, (meth)acrylonitrile, a styrene derivative, or a (meth)acrylamide.

Specific examples of the macromonomer represented by Formula (3) include those shown below.

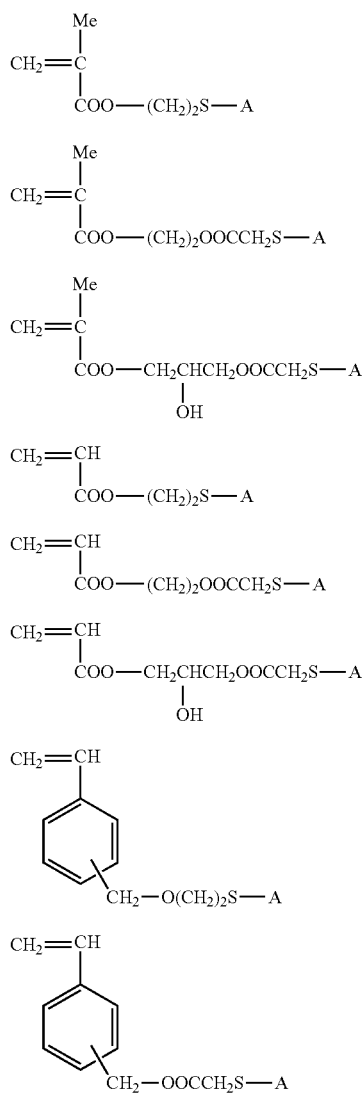

In the above formulae, A has the same definition as that of $A^3$ in Formula (3). Preferable compounds for forming A include polymethyl methacrylate, polybutyl methacrylate, polystyrene, a methyl methacrylate-butyl methacrylate copolymer, and a methyl methacrylate-styrene copolymer.

The weight average molecular weight of the specific graft polymer according to the second embodiment is not particularly limited as long as it is from 1,000 to 100,000, and is preferably in the range of from 3,000 to 100,000, more preferably in the range of from 5,000 to 50,000, and further preferably in the range of from 10,000 to 30,000. When the weight average molecular weight is 1,000 or more, the stabilization effect is more effectively exerted. When the weight average molecular weight is 100,000 or less, more effective adsorption is achieved, as a result of which more favorable dispersibility is achieved.

In particular, the weight average molecular weight of the branch portion is preferably from 300 to 10,000, more preferably from 500 to 5,000, and further more preferably from 1,000 to 3,000. A molecular weight of the branch portion within the range provides particularly favorable developability, and a broad development latitude.

The specific graft polymer according to the second embodiment may contain only one kind of repeating unit having a macromonomer, or in two or more kinds thereof. The content of repeating units having a macromonomer in the specific graft compound is not particularly limited, and is preferably 5% by mass or more, more preferably from 40 to 90% by mass, and further preferably from 50 to 80% by mass, assuming that the total amount of structure units contained in the specific graft compound is 100% by mass.

As other monomers copolymerizable with the specific graft polymer according to the second embodiment, one or more of the following monomers may be freely selected: (1) a monomer having an organic dye structure or a heterocyclic structure; (2) a monomer having an acidic group; (3) a monomer having a basic nitrogen atom; (4) a monomer having a urea group, a urethane group, a hydrocarbon group having 4 or more carbon atoms and having a coordinating oxygen atom, an alkoxysilyl group, an epoxy group, an isocyanate group, or a hydroxyl group; (5) a monomer having an ionic functional group; (6) a (meth)acrylic ester, a crotonic ester, a vinyl ester, a maleic diester, a fumaric diester, an itaconic diester, a (meth)acrylamide, a styrenic compound, a vinyl ether, a vinyl ketone, an olefin, a maleimide, and (meth)acrylonitrile; and the like. Among them, a (1) monomer having an organic dye structure or a heterocyclic structure is particularly preferable from the viewpoint of adsorption force with respect to the pigment.

The monomer having an organic dye structure or a heterocyclic structure is preferably a monomer represented by Formula (1), maleimide, or a maleimide derivative, and particularly preferably a monomer represented by Formula (1). The definition and preferable ranges of Formula (1), including the definition and preferable ranges of each symbol in the Formula, are the same as in the first embodiment.

Preferable specific examples of the monomer represented by Formula (1), the maleimide, and the maleimide derivative in the specific graft polymer according to the second embodiment are respectively the same as in the first embodiment. However, the second embodiment is not limited thereto.

The specific graft polymer according to the second embodiment may contain only one kind of copolymerization unit derived from a monomer represented by Formula (1), maleimide, or a maleimide derivative, or may contain two or more kinds thereof.

The content of copolymerization units each derived from a monomer represented by Formula (1), maleimide, or a maleimide derivative in the specific graft polymer according to the second embodiment is not particularly limited. However, the content of copolymerization units derived from a monomer represented by Formula (1), maleimide, or a maleimide derivative is preferably 5% by mass or more, and more preferably from 10 to 50% by mass, assuming that the total amount of structure units contained in the polymer is 100% by mass.

In the second embodiment, a monomer represented by Formula (1) is preferable among a monomer represented by Formula (1), maleimide, and a maleimide derivative, since a monomer represented by Formula (1) exhibits high adsorptivity with respect to the pigment.

Specifically, the content of copolymerization units each derived from a monomer represented by Formula (1), maleimide, or a maleimide derivative is preferably 5% by mass or more from the viewpoint of effectively suppressing generation of secondary aggregates, which are aggregates of pigment primary particles, or effectively reducing the aggregation force in the secondary aggregate. The content of copolymerization units derived from a monomer represented by Formula (1) is preferably 30% by mass or less from the viewpoint of developability at the time of producing a color filter using the photocurable composition containing the pigment-dispersed composition.

The specific graft polymer may be produced according to an ordinary radical polymerization method using, for example, at least one monomer represented by Formula (i), at least one polymerizable oligomer (macromonomer), and at least one other radical-polymerizable compound as a copolymerizable component. In general, a suspension polymerization method, a solution polymerization method, or the like may be employed. Examples of the solvent used in the synthesis of the specific polymer include the above-described solvents that can be used in the synthesis of the specific polymer in the first embodiment. The solvent may be used singly, or in mixture of two or more thereof.

In the radical polymerization, a radical polymerization initiator may be used, and, furthermore, a chain transfer agent (examples of which include 2-mercaptoethanol and dodecylmercaptan) may be used.

The content of the specific graft polymer in the pigment-dispersed composition of the second embodiment is preferably such that the mass ratio of pigment:specific graft polymer is from 1:0.1 to 1:2, more preferably from 1:0.2 to 1:1, and further preferably from 1:0.4 to 1:0.7. When the ratio of pigment:specific graft polymer is from 1:0.4 to 1:0.55, the effect of acrylic acid in the second embodiment is remarkable.

The content of (A) the specific graft polymer according to the second embodiment is preferably from 10 to 40% by mass relative to the total solids content.

The concentration of pigment is required to be high in order to improve high color reproducibility of a liquid crystal display device and in order to improve color separation of a solid-state image pickup device. The effect of the second embodiment is conspicuous particularly in the case of a pigment-dispersed composition having high pigment concentration. More specifically, the value obtained by dividing the total mass of high-molecular compounds contained in the pigment-dispersed composition by the total mass of the (B) pigment and the (E) pigment derivative described below is preferably in the range of from 0.2 to 0.55, and more preferably in the range of from 0.3 to 0.4. It is possible to provide a pigment-dispersed composition which has favorable pigment dispersibility and favorable dispersion stability, and with which a photocurable composition exhibiting favorable redissolvability of a dry film in a solvent and generating less development residues can be formed, even in a case in which the amount of the high-molecular compound is small.

The pigment-dispersed composition of the second embodiment preferably further includes (D) a basic graft high-molecular compound. Here, the (D) basic graft high-molecular compound is a high-molecular compound having a structure other than the structures encompassed by the (A) polymer.

The (D) basic graft high-molecular compound is a polymer having a structure in which at least one branch polymer is graft-bonded to a backbone polymer portion having plural basic groups. Since the polymer is adsorbed on the surface of an organic pigment and an acidic derivative thereof at many sites with basic groups of the backbone polymer portion serving as an anchor, the steric repulsion effect caused by the branch polymer portion is exerted effectively, thereby performing a function of promoting finer dispersion. The basic groups of the backbone polymer portion is each preferably an amino group due to its excellent adsorption properties. The branch polymer portion is preferably soluble in an organic solvent from the viewpoint of providing an excellent steric repulsion chain. The polymer preferably has a molecular structure in which two or more branch polymer molecules are graft-bonded to one backbone polymer molecule. Polymers of this kind can be expressed by, for example, the following Formula.

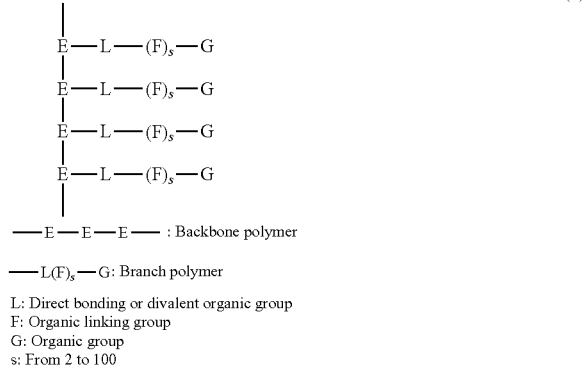

L: Direct bonding or divalent organic group
F: Organic linking group
G: Organic group
s: From 2 to 100

The backbone polymer represented by EE . . . EE in Formula (8) preferably has an amino group. Specific examples thereof include polyethylene imine, polyethylene polyamine, polyxylylene poly(hydroxypropylene)polyamine, poly(aminomethylated)epoxy resin, and a copolymer of amine-added glycidyl(meth)acrylate and (meth)acrylic-esterified glycidyl (meth)acrylate. Synthesis methods thereof are, for example, as follows.

Polyethylene imine is obtained by ring-opening polymerization of ethylene imine in the presence of an acid catalyst. Polyethylene polyamine is obtained by polycondensation of ethylene dichloride and ammonia in the presence of an alkaline catalyst. Poly(aminomethylated) epoxy resin is obtained by chloromethylation and subsequent amination of an aromatic ring such as bisphenol A epoxy resin, bisphenol F epoxy resin, phenol novolac epoxy resin, cresol novolac epoxy resin, or naphthol novolac epoxy resin, and is called "Mannich base". Specific examples of an amine used for the amination include monomethylamine, monoethylamine, monomethanolamine, monoethanolamine, dimethylamine, diethylamine, dimethanolamine, and diethanolamine. The copolymer of amine-added glycidyl(meth)acrylate and (meth)acrylic-esterified glycidyl(meth)acrylate is obtained by forming a polymer through radical polymerization of glycidyl(meth)acrylate, and then adding an amine such as those described above to some of the epoxy groups in the resultant polymer so as to obtain poly[amine-added glycidyl(meth)acrylate], and then allowing remaining epoxy groups to react with carboxylic acid of (meth)acrylic acid so as to be esterified.

The branch polymer represented by FF . . . FF in Formula (8) is preferably soluble in an organic solvent. Specific examples thereof include: poly(12-hydroxystearic acid), which is a polymer having carboxylic acid at a polymer terminal and capable of forming a graft bonding by undergoing an amidation reaction with an amino group of the backbone polymer portion such as those described above; polyricinoleic acid; and a ring-opening polymer such as ε-caprolactone. When the backbone polymer has a vinyl group such as in the case of the copolymer of amine-added glycidyl(meth)acrylate and (meth)acrylic-esterified glycidyl (meth)acrylate, the branch polymer portion may be a polymer capable of graft-polymerized with the vinyl group such as poly[methyl(meth)acrylate] or poly[ethyl(meth)acrylate]. Synthesis methods thereof are, for example, as follows.

Poly(12-hydroxystearic acid) is obtained by polyesterification through dehydrating polycondensation of 12-hydroxystearic acid. Polyricinoleic acid is similarly obtained by polyesterification through dehydrating polycondensation of ricinoleic acid. The ring-opening polymer of ε-caprolactone is obtained by addition of n-caproic acid, which is an aliphatic monocarboxylic acid, to ε-caprolactone, thereby causing ring-opening polymerization.

In a case in which the (D) basic graft high-molecular compound is added, the mixing ratio of the (A) specific graft polymer to the (D) basic graft high-molecular compound for use is preferably from 2/1 to 1/2, and particularly preferably from 1.5/1 to 1/1.5.

[(b) Pigment]

The (b) pigment in the first embodiment may be suitably selected from various conventional known inorganic pigments or organic pigments.

The pigment is preferably an organic pigment, considering, for example, that a higher transmittance is preferred when the pigment-dispersed composition of the invention is used in a colored region of a color filter. The particle size thereof is preferably as small is possible.

In consideration of handling properties of the pigment-dispersed composition and the colored photosensitive composition containing the pigment-dispersed composition, the average primary particle diameter of the pigment is preferably 100 nm or less, more preferably 30 nm or less, and most preferably from 5 nm to 25 nm. A particle diameter within the above range provides high transmittance and favorable color properties, and is effective in the formation of high-contrast color filters.

The average primary particle diameter is obtained by measuring the particle sizes of 100 particles at a region at which particles do not aggregate, under observation with an SEM or TEM, and calculating the average value thereof.

<(B) Pigment>

The pigment-dispersed composition of the second embodiment contains a pigment. A smaller diameter of the pigment leads to more favorable contrast as a color filter. Particularly, in a case in which a pigment having a particle diameter of from 10 to 25 nm is dispersed using the specific graft polymer according to the second embodiment, favorable dispersion is achieved, and the contrast improves. There has been a problem associated with a pigment having such a size in that, due to the small size, the pigment aggregates and thus increases viscosity when a pigment dispersion liquid is stored for a long time at high temperature and high humidity. However, this problem can be solved by using the graft dispersant of the invention having acrylic acid introduced thereto.

A particle diameter of the pigment within the above range provides high transmittance and favorable color properties, and is effective in formation of high-contrast color filters.

The average primary particle diameter is obtained by measuring the particle sizes of 100 particles at a region at which particles do not aggregate, under observation with an SEM or TEM, and calculating the average value thereof.

The pigment concentrations of photocurable compositions were ordinarily 30% by weight or lower. However, recently, higher pigment concentrations have been desired. An increased pigment concentration has caused a problem in that image formation capability possessed by original photocurable compositions is lost due to a relative decrease of components that contribute to image formation properties such as an added resin that imparts solubility in an alkali developer liquid.

In a case in which the specific graft polymer according to the second embodiment is used as a dispersant, sufficient desolution in a developer liquid is achieved even without addition of other resins for allowing dissolution in an alkali developer; therefore, pigment can be used even at a high pigment concentration range. The specific graft polymer according to the second embodiment also has dispersion stabilization properties, thereby allowing a fine pigment to be used at high pigment concentrations.

The pigment concentration may be in the range of from 10 to 55% by mass. The effects are remarkable particularly at high pigment concentration regions of from 35 to 55% by mass, or from 40 to 55% by mass.

The pigment-dispersed composition of the second embodiment contains at least one kind of the (B) pigment in an organic solvent.

Examples of pigments that can be used in the pigment-dispersed composition of the second embodiment include conventional known various inorganic pigments or organic pigments. The pigment to be used is preferably a pigment having a fine particle size of which the particle size is as small as possible, regardless of whether the pigment is an inorganic pigment or an organic pigment, considering that high transmittance is preferred. The pigment has an average primary particle diameter in the range of preferably from 10 to 25 nm, in consideration of handling properties.

The below descriptions of pigment are common to all aspects of the invention including the pigment (b) and the pigment (B) of the first and the second embodiments, unless otherwise indicated. Examples of inorganic pigments include a metal compound such as a metal oxide or a metal complex salt. Specific examples thereof include: an oxide of a metal such as iron, cobalt, aluminum, cadmium, lead, copper, titanium, magnesium, chromium, zinc, or antimony; and a complex oxide of any of the above metals.

Examples of organic pigments include:

C.I. Pigment Red 1, 2, 3, 4, 5, 6, 7, 9, 10, 14, 17, 22, 23, 31, 38, 41, 48:1, 48:2, 48:3, 48:4, 49, 49:1, 49:2, 52:1, 52:2, 53:1, 57:1, 60:1, 63:1, 66, 67, 81:1, 81:2, 81:3, 83, 88, 90, 105, 112, 119, 122, 123, 144, 146, 149, 150, 155, 166, 168, 169, 170, 171, 172, 175, 176, 177, 178, 179, 184, 185, 187, 188, 190, 200, 202, 206, 207, 208, 209, 210, 216, 220, 224, 226, 242, 246, 254, 255, 264, 270, 272, 279;

C.I. Pigment Yellow 1, 2, 3, 4, 5, 6, 10, 11, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214;

C.I. Pigment Orange 2, 5, 13, 16, 17:1, 31, 34, 36, 38, 43, 46, 48, 49, 51, 52, 55, 59, 60, 61, 62, 64, 71, 73;

C.I. Pigment Green 7, 10, 36, 37;

C.I. Pigment Blue 1, 2, 15, 15:1, 15:2, 15:3, 15:4, 15:6, 16, 22, 60, 64, 66, 79, a pigment obtained by substituting a Cl substituent of C.I. Pigment Blue 79 with a hydroxyl group, C.I. Pigment Blue 80;

C.I. Pigment Violet 1, 19, 23, 27, 32, 37, 42;

C.I. Pigment Brown 25, 28; and

C.I. Pigment Black 1, 7.

However, in the invention, examples of organic pigments are not limited to the above.

Among them, preferred pigments include the following:

C.I. Pigment Yellow 11, 24, 108, 109, 110, 138, 139, 150, 151, 154, 167, 180, 185;

C.I. Pigment Orange 36, 71;

C.I. Pigment Red 122, 150, 171, 175, 177, 209, 224, 242, 254, 255, 264;

C.I. Pigment Violet 19, 23, 32;

C.I. Pigment Blue 15:1, 15:3, 15:6, 16, 22, 60, 66;

C.I. Pigment Green 7, 36, 37; and

C.I. Pigment Black 1, 7.

These organic pigments may be used singly, or in various combinations in order to increase color purity. Specific examples of combinations of organic pigments are described below.

For example, an anthraquinone pigment, a perylene pigment, or a diketopyrrolopyrrole pigment may be used singly, or a mixture of at least one of these with a disazo yellow pigment, an isoindoline yellow pigment, or a quinophthalone yellow pigment, or with a perylene red pigment, an anthraquinone red pigment, or a diketopyrrolopyrrole red pigment may be used as a pigment in red.

Examples of the anthraquinone pigment include C.I. Pigment Red 177, examples of the perylene pigment include C.I. Pigment Red 155 and C.I. Pigment Red 224, and examples of the diketopyrrolopyrrole pigment include C.I. Pigment Red 254. From the viewpoint of color reproduction properties, a mixture with C.I. Pigment Yellow 83, C.I. Pigment Yellow 139, or C.I. Pigment Red 177 is preferable. The mass ratio of red pigment to other pigments is preferably from 100:5 to 100:80 from the viewpoints of light transmittance at from 400 nm to 500 nm and color purity. The mass ratio is most suitably in the range of from 100:10 to 100:65. When red pigments are combined with each other, the mass ratio therebetween may be controlled in accordance with chromaticity.

As a green pigment, a halogenated phthalocyanine pigment may be used singly, or may be used in mixture with a disazo yellow pigment, a quinophthalone yellow pigment, an azomethine yellow pigment or an isoindoline yellow pigment.

For example, a mixture of C.I. Pigment Green 7, 36, or 37 with C.I. Pigment Yellow 83, C.I. Pigment Yellow 138, C.I. Pigment Yellow 139, C.I. Pigment Yellow 150, C.I. Pigment Yellow 180, or C.I. Pigment Yellow 185 is a preferable example thereof. The mass ratio of green pigment to yellow pigment is preferably from 100:5 to 100:200 from the viewpoints of light transmittance at from 400 to 450 nm and color purity. The mass ratio is particularly preferably in the range of from 100:20 to 100:150.

As a blue pigment, a phthalocyanine pigment may be used singly, or may be used in mixture with a dioxazine purple pigment.

Particularly preferable examples include a mixture of C.I. Pigment Blue 15:6 and C.I. Pigment Violet 23.

The mass ratio of blue pigment to purple pigment is preferably from 100:0 to 100:100, and more preferably from 100:(70 or less).

As a pigment suitable for use in black matrix applications, carbon black, graphite, titanium black, iron oxide, or titanium oxide may be used singly, or a mixture of two or more thereof may used. A combination of carbon black and titanium black is preferable.

The mass ratio of carbon black to titanium black is in the range of preferably from 100:0 to 100:60. When the titanium black amount is greater than 100:60, dispersion stability decreases in some cases.

(Fining of Pigment)

In the first embodiment, the aforementioned pigment may be used in the form of a fine pigment of which particle diameter is uniformized, as necessary.

In the fining of the pigment, it is preferable to employ a method including a process of preparing highly viscous liquid composition from the pigment, a water-soluble organic solvent, and a water-soluble inorganic salt, and grinding the liquid composition.

In the first embodiment, it is preferable to employ the following method for fining the pigment.

Specifically, in the method, first, a mixture (liquid composition) of an organic pigment, a water-soluble organic solvent, and a water-soluble inorganic salt is applied with a strong shear force using a kneader such as a two-roll mill, a three-roll mill, a ball mill, a trommel, a disper, a kneader, a cokneader, a homogenizer, a blender, or a monoaxial or biaxial extruder so as to grind the pigment in the mixture, and thereafter the mixture is added into water and turned into a slurry state using an agitator or the like. Next, the resultant slurry is subjected to filteration and washing with water so as to remove the water-soluble organic solvent and the water-soluble inorganic salt, and then dried, thereby providing a fined pigment.

Examples of the water-soluble organic solvent used in the fining include methanol, ethanol, isopropanol, n-propanol, isobutanol, n-butanol, ethyleneglycol, diethyleneglycol, diethyleneglycol monomethyl ether, diethyleneglycol monoethyl ether, diethyleneglycol monobutyl ether, propyleneglycol, and propyleneglycol monomethyl ether acetate.

Benzene, toluene, xylene, ethylbenzene, chlorobenzene, nitrobenzene, aniline, pyridine, quinoline, tetrahydrofuran, dioxane, ethyl acetate, isopropyl acetate, butyl acetate, hexane, heptane, octane, nonane, decane, undecane, dodecane, cyclohexane, methylcyclohexane, halogenated hydrocarbon, acetone, methyl ethyl ketone, methyl isobutyl ketone, cyclohexanone, dimethylformamide, dimethylsulfoxide, N-methylpyrrolidone, or the like may be uses as long as the amount thereof is so small that the solvent is adsorbed on the pigment and do not flow into waste water. A mixture of two or more solvents may be used, if necessary.

The amount of water-soluble organic solvent to be used is preferably in the range of from 50 to 300% by mass, more preferably the range of from 100 to 200% by mass, relative to the pigment.

Eaxmples of The water-soluble inorganic salt in the first embodiment include sodium chloride, potassium chloride, calcium chloride, barium chloride, and sodium sulfate.

The amount, in terms of mass ratio, of water-soluble inorganic salt to be used is preferably from 1 to 50 times that of the organic pigment, more preferably from 1 to 10 times that of the organic pigment, from the viewpoint of productivity, although a greater amount provides a higher grinding effect.

The moisture content of the liquid composition to be ground is preferably 1% by mass or less in order to prevent dissolution of the water-soluble inorganic salt.

In the first embodiment, a wet milling apparatus such as the kneaders described above may be used to grind the liquid composition containing the pigment, a water-soluble organic solvent, and a water-soluble inorganic salt. The operation conditions of the wet milling apparatus are not particularly limited. However, in order to effectively perform grinding by a milling media (the water-soluble inorganic salt), the operation conditions when a kneader is used as the apparatus are such that the number of revolutions of a blade in the apparatus is preferably from 10 to 200 r.p.m., and the rotation speed ratio between two axes is preferably relatively higher from the viewpoint of obtaining higher grinding effect. The operation time inclusive of dry milling time is preferably from 1 to 8 hours, and the internal temperature of the apparatus is preferably from 50 to 150° C. The water-soluble inorganic salt as a milling media preferably has a milling particle size of from 5 to 50 µm, a sharp particle diameter distribution, and a spherical shape.

The mixture after grinding is mixed with warm water having a temperature of 80° C. so as to dissolve the water-soluble organic solvent and the water-soluble inorganic salt, and thereafter subjected to filteration, washing with water, and drying in an oven, as a result of which a fine pigment is obtained.

When the liquid composition at the time of fining the organic pigment further includes a resin that is at least partially soluble in the water-soluble organic solvent, a fine processed pigment of which the surface is coated with a resin and which exhibits less aggregation of the pigment during drying is obtained.

The resin that is at least partially soluble in the water-soluble organic solvent, which is used in the process of preparing a processed pigment, may be a known resin used as a pigment dispersant. However, in the first embodiment, the resin that is at least partially soluble in the water-soluble organic solvent is preferably the (a) specific polymer described above.

The content of the (b) pigment in the pigment-dispersed composition of the first embodiment is preferably from 5% by mass to 50% by mass, more preferably from 10% by mass to 30% by mass, and further preferably from 10% by mass to 20% by mass.

(Processing of Pigment)

It is preferable that the pigment used in the second embodiment has been subjected to fining treatment in advance. With respect to fining of pigment primary particles, a method of mechanically kneading i) a pigment, ii) a water-soluble inorganic salt and iii) a water-soluble organic solvent that does not substantially dissolve the inorganic salt using a kneader or the like (salt milling method) is widely known. In this process, iv) a high-molecular compound for covering the pigment, v) a pigment derivative, or the like may be additionally used, if necessary.

Examples of the i) pigment include the pigments described above.

The ii) water-soluble inorganic salt is not particularly limited as long as it dissolves in water. Examples of water-soluble inorganic salts that can be used include sodium chloride, barium chloride, potassium chloride, and sodium sulfate. It is preferable to use sodium chloride or sodium sulfate from the viewpoint of price. The amount, in terms of mass ratio, of the inorganic salt used in salt milling may be 1 to 30 times, particularly 5 to 25 times, that of the organic pigment, from the viewpoints of both of processing efficiency and production efficiency. Furthermore, the moisture content is preferably 1% or less. Although a higher amount ratio of the inorganic salt to the organic pigment leads to an increased fining efficiency, it also reduces the amount of the pigment processed at one time.

The small amount of the iii) water-soluble organic solvent that does not substantially dissolve the inorganic salt is not particularly limited as long as it serves to wet the organic pigment and the inorganic salt, dissolves (is miscible) in water, and does not substantially dissolve the inorganic salt used. However, the water-soluble organic solvent is preferably a high-boiling solvent having a boiling point of 120° C. or higher from the viewpoint of safety since the temperature rises and evaporation of solvent is facilitated during salt milling. Examples of water-soluble organic solvents that can be used include 2-methoxyethanol, 2-butoxyethanol, 2-(isopentyloxy)ethanol, 2-(hexyloxy)ethanol, ethyleneglycol, diethyleneglycol, diethyleneglycol monoethyl ether, diethyleneglycol monoethyl ether acetate, diethyleneglycol monobutyl ether, triethyleneglycol, triethyleneglycol monomethyl ether, polyethyleneglycol in the liquid state, 1-methoxy-2-propanol, 1-ethoxy-2-propanol, dipropyleneglycol, dipropyleneglycol monomethyl ether, dipropyleneglycol monoethyl ether, and polypropyleneglycol in the liquid state.

However, benzene, toluene, xylene, ethylbenzene, chlorobenzene, nitrobenzene, aniline, pyridine, quinoline, tetrahydrofuran, dioxane, ethyl acetate, isopropyl acetate, butyl acetate, hexane, heptane, octane, nonane, decane, undecane, dodecane, cyclohexane, methylcyclohexane, halogenated hydrocarbon, acetone, methyl ethyl ketone, methyl isobutyl ketone, cyclohexanone, dimethyl formamide, dimethyl sulfoxide, N-methyl pyrrolidone, or the like may be used as long as the amount thereof is so small that the solvent is adsorbed on the pigment and do not flow into waste water. A mixture of two or more solvents may be used, if necessary.

The amount of the water-soluble organic solvent to be added in the second embodiment is preferably from 5 to 50 parts by weight, more preferably from 10 to 40 parts by weight, and most suitably 15 to 35 parts by weight, relative to 100 parts by weight of the inorganic salt. When the addition amount is less than 5 parts by weight, there are cases in which uniform kneading is difficult and the particle sizes are uneven. When the addition amount is 50 parts by weight or more, there are cases in which a kneaded composition is too soft, shear is less efficiently applied to the kneaded composition, and thus sufficient fining effect is not obtained.

The water-soluble organic solvent may be added all at once at an initial stage of salt milling, or may be added in portions. The water-soluble organic solvent may be used singly, or in combination of two or more thereof.

The operation conditions of the wet milling apparatus in the second embodiment are not particularly limited. However, in order to effectively perform grinding by a milling media, the operation conditions when a kneader is used as the apparatus are such that the number of revolutions of a blade in the apparatus is preferably from 10 to 200 r.p.m. and the rotation speed ratio between two axes is preferably relatively higher from the viewpoint of obtaining higher grinding effect. The operation time inclusive of dry milling time is preferably from 1 to 8 hours, and the internal temperature of the apparatus is preferably from 50 to 150° C. The water-soluble inorganic salt as a milling media preferably has a milling particle size of from 5 to 50 µm, a sharp particle diameter distribution, and a spherical shape.

At room temperature, the high-molecular compound for covering the pigment is preferably solid, water-insoluble, and at least partially soluble in the water-soluble organic solvent used as a wetting agent during salt milling. The high-molecular compound for covering the pigment may be a natural resin, a modified natural resin, a synthetic resin, a synthetic resin modified with a natural resin, or the (A) graft high-molecular polymer according to the second embodiment in which acrylic acid is copolymerized, and is particularly preferably the (A) specific graft polymer according to the second embodiment.

In the case of a dry processed pigment, the compound to be used is preferably solid at room temperature. A representative example of the natural resin is rosin, and examples of the modified natural resin include a rosin derivative, a cellulose derivative, a rubber derivative, a protein derivative and oligomers thereof Examples of the synthetic resin include an epoxy resin, an acrylic resin, a maleic acid resin, a butyral resin, a polyester resin, a melamine resin, a phenol resin, and a polyurethane resin. Examples of the synthetic resin modified with a natural resin include a rosin-modified maleic acid resin and a rosin-modified phenol resin.

Examples of the synthetic resin include: polyamidoamine and salts thereof; polycarboxylic acid and salts thereof; high-molecular unsaturated acid esters; polyurethane; polyester; poly(meth)acrylate; (meth)acrylic copolymers; and naphthalenesulfonic acid formalin condensates.

As the (A) specific graft polymer, the high-molecular compound described above may be used.

In regard to the time at which the resin is added, the resin may be added all at once at an initial stage of salt milling, or may be added in portions.

Examples of the pigment derivative in the second embodiment include those of the (E) pigment derivative described below.

[(c) Organic Solvent]

The pigment-dispersed composition of the first embodiment includes at least one (c) organic solvent.

Examples of the organic solvent used in the pigment-dispersed composition of the first embodiment include 1-methoxy-2-propyl acetate, 1-methoxy-2-propanol, ethyleneglycol monomethyl ether, diethyleneglycol monomethyl ether, ethyl acetate, butyl acetate, ethyl lactate, acetone, methyl ethyl ketone, methyl isobutyl ketone, cyclohexanone, n-propanol, 2-propanol, n-butanol, cyclohexanol, ethyleneglycol, diethyleneglycol, toluene, and xylene.

The amount of organic solvent to be added is suitably selected in accordance with, for example, the application of the pigment-dispersed composition. In a case in which the pigment-dispersed composition is to be used in the preparation of the colored photosensitive composition described below, the organic solvent may be added such that the concentration of solids, including the pigment and the like, becomes to be from 5% by mass to 50% by mass, from the viewpoint of handling properties.

[Other Components]

A pigment derivative is preferably used in the pigment-dispersed composition of the first embodiment.

In the first embodiment, a pigment derivative into which a portion having affinity for the dispersant or a polar group has been introduced may be allowed to be adsorbed on the surface of a processed pigment, and may be used as an adsorption site for the dispersant, as a result of which the pigment is dispersed in the pigment-dispersed composition as fine particles, and re-aggregation thereof is prevented. Namely, the pigment derivative has exerts effect of promoting adsorption of a high-molecular dispersant such as the (a) specific polymer, through modification of the pigment surface.

The pigment derivative is specifically a compound of which the mother skeleton is an organic pigment, and to which an acidic group, a basic group, or an aromatic group has been introduced, as a substituent, into a side chain. Specifically, examples of the organic pigment for forming the mother skeleton include a quinacridone pigment, a phthalocyanine pigment, an azo pigment, a quinophthalone pigment, an isoindoline pigment, an isoindolinone pigment, a quinoline pigment, a diketopyrrolopyrrole pigment, and a benzimidazolone pigment.

The scope of the mother skeleton includes a pale yellow aromatic polycyclic compound such as a naphthalene-based compound, an anthraquinone-based compound, a triazine-based compound, or a quinoline-based compound, each of which is not generally referred to as dye.

Examples of the pigment derivative in the first embodiment include those described in JP-A No. 11-49974, JP-A No. 11-189732, JP-A No. 10-245501, JP-A No. 2006-265528, JP-A No. 8-295810, JP-A No. 11-199796, JP-A No. 2005-234478, JP-A No. 2003-240938, JP-A No. 2001-356210, and the like.

When the pigment derivative is used in the pigment-dispersed composition of the first embodiment, the amount of the pigment derivative to be used is preferably in the range of from 1% by mass to 80% by mass, more preferably in the range of from 3% by mass to 65% by mass, and particularly preferably in the range of from 5% by mass to 50% by mass, relative to the pigment. When the content is within the above range, the pigment can be satisfactorily dispersed while maintaining the viscosity low, and, further, dispersion stability after dispersing is improved.

By applying the pigment-dispersed composition to production of a color filer, a color filter having high transmittance, excellent color properties, and high contrast can be obtained.

It is also possible to use a dispersant, such as a surfactant, in the pigment-dispersed composition of the first embodiment.

[Preparation of Pigment-Dispersed Composition]

The pigment-dispersed composition of the first embodiment can be prepared through a mixing-dispersing process in which mixing and dispersing is performed using various mixers or dispersers.

The mixing-dispersing process preferably includes kneading-dispersing and fine dispersing treatment subsequent thereto; however, kneading-dispersing may be omitted.

Specifically, the pigment-dispersed composition of the first embodiment can be prepared by, for example, subjecting the (a) specific polymer, the (b) pigment, and the (c) organic solvent to fine dispersing treatment with beads having a particle diameter of from 0.01 mm to 1 mm and made of glass, zirconia, or the like, using a vertical or horizontal sand grinder, a pin mill, a slit mill, an ultrasonic disperser, or the like.

Before the fine dispersing using beads, kneading-dispersing treatment may be performed while applying a strong shearing force by using, for example, a two-roll mill, a three-roll mill, a ball mill, a trommel, a disper, a kneader, a cokneader, a homogenizer, a blender, or a monoaxial or biaxial extruder.

Specifics of the kneading and the dispersing are described in "Paint Flow and Pigment dispersion liquid", authored by T. C. Patton (published by John Wiley and Sons Co. 1964) and the like. Methods described therein are applicable to the first embodiment.

<Colored Photosensitive Composition>

The colored photosensitive composition of the first embodiment includes the pigment-dispersed composition of the first embodiment described above, a photopolymerizable compound, and a photopolymerization initiator, and preferably further includes an alkali-soluble resin, and may further include other components if necessary.

Each of components contained in the colored photosensitive composition of the first embodiment is described in detail below.

[Pigment-Dispersed Composition]

The colored photosensitive composition of the first embodiment includes at least one kind of the pigment-dispersed composition of the first embodiment described above. The specifics of the pigment-dispersed composition of the first embodiment contained in the colored photosensitive composition are as described above.

The content of the pigment-dispersed composition in the colored photosensitive composition of the first embodiment is preferably such that the content of the pigment is preferably in the range of from 5% by mass to 70% by mass, more preferably in the range of from 15% by mass to 60% by mass, relative to the total solids content (mass) of the colored photosensitive composition. A content of the pigment-dispersed composition within the above range provides sufficient color density, and is effective in securing excellent color properties.

[Photopolymerizable Compound]

The colored photosensitive composition of the first embodiment includes at least one photopolymerizable compound.

The photopolymerizable compound that may be used in the first embodiment is an addition-polymerizable compound having at least one ethylenic unsaturated double bond, and is selected from compounds having at least one terminal ethylenic unsaturated bond, preferably two or more terminal ethylenic unsaturated bonds. Such a class of compounds is widely known in the relevant industrial field, and such compounds may be used in the first embodiment without particular limitations. The photopolymerizable compound may be in the chemical form of a monomer or a prepolymer, specifically a dimer, a trimer, or an oligomer, or a mixture thereof or a copolymer thereof.

Examples of the monomer and the copolymer thereof include unsaturated carboxylic acids (such as acrylic acid, methacrylic acid, itaconic acid, crotonic acid, isocrotonic acid, and maleic acid), esters thereof, and amides thereof. Preferable examples thereof include: an ester of an unsaturated carboxylic acid and an aliphatic polyhydric alcohol compound; an amide of an unsaturated carboxylic acid and an aliphatic polyamine compound; an addition reaction product of an unsaturated carboxylic ester or unsaturated carboxylic amide having a nucleophilic substituent (such as a hydroxyl group, an amino group, or a mercapto group), with a monofunctional or polyfunctional isocyanate or epoxy compound; and a dehydration condensation reaction product of the unsaturated carboxylic ester or unsaturated carboxylic amide with a monofunctional or polyfunctional carboxylic acid. Other preferable examples include: an addition reaction product of an unsaturated carboxylic ester or unsaturated carboxylic amide having an electrophilic substituent (such as an isocyanate group or an epoxy group), with a monofunctional or polyfunctional alcohol, amine, or thiol; and a substitution reaction product of an unsaturated carboxylic ester or unsaturated carboxylic amide having a halogen group or a leaving substituent (such as a tosyloxy group), with a monofunctional or polyfunctional alcohol, amine, or thiol. Still other examples for use include compounds each obtained by replacing an unsaturated carboxylic acid in the above examples by an unsaturated phosphonic acid, styrene, vinyl ether, or the like.

Specific examples of the ester of an aliphatic polyhydric alcohol compound and an unsaturated carboxylic acid as a monomer include:

an acrylic ester such as ethyleneglycol diacrylate, triethyleneglycol diacrylate, 1,3-butanediol diacrylate, tetramethyleneglycol diacrylate, propyleneglycol diacrylate, neopentylglycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethyleneglycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, a polyester acrylate oligomer, or an EO-modified isocyanuric acid triacrylate;

a methacrylic ester such as tetramethyleneglycol dimethacrylate, triethyleneglycol dimethacrylate, neopentylglycol dimethacrylate, trimethylolpropane trimethacrylate, trimethylolethane trimethacrylate, ethyleneglycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane, or bis[p-(methacryloxyethoxy)phenyl]dimethylmethane;

an itaconic ester such as ethyleneglycol diitaconate, propyleneglycol diitaconate, 1,3-butanediol diitaconate, 1,4-butanediol diitaconate, tetramethyleneglycol diitaconate, pentaerythritol diitaconate, or sorbitol tetraitaconate;

a crotonic ester such as ethyleneglycol dicrotonate, tetramethyleneglycol dicrotonate, pentaerythritol dicrotonate, or sorbitol tetradicrotonate;

an isocrotonic ester such as ethyleneglycol diisocrotonate, pentaerythritol diisocrotonate, or sorbitol tetraisocrotonate; and a maleic ester such as ethyleneglycol dimaleate, triethyleneglycol dimaleate, pentaerythritol dimaleate, or sorbitol tetramaleate.

Examples of other esters that can be suitably used include the aliphatic alcohol esters described in JP-B No. 51-47334 and JP-A No. 57-196231, the aromatic skeleton-containing esters described in JP-A No. 59-5240, JP-A No. 59-5241 and JP-A No. 2-226149, and the amino group-containing esters described in JP-A No. 01-165613. The ester monomers described above may be used in the form of a mixture thereof.

Examples of the amide of an aliphatic polyamine compound and an unsaturated carboxylic acid as a monomer include methylene bis-acrylamide, methylene bis-methacrylamide, 1,6-hexamethylene bis-acrylamide, 1,6-hexamethylene bis-methacrylamide, diethylenetriamine trisacrylamide, xylylene bisacrylamide, and xylylene bismethacrylamide.

Examples of other preferred amide monomers include those having a cyclohexylene structure described in JP-B No. 54-21726.

Addition-polymerizable urethane compounds produced by an addition reaction of isocyanate with a hydroxyl group are also preferred, specific examples of which include vinyl urethane compounds, which have two or more polymerizable vinyl groups within a molecule thereof and are produced by adding a hydroxyl group-containing vinyl monomer represented by the following Formula (a) to a polyisocyanate compound having two or more isocyanate groups within a molecule thereof and described in JP-B No. 48-41708.

 Formula (a)

(wherein R and R' each represent H or CH₃)

Urethane acrylates such as those described in JP-A No. 51-37193, JP-B No. 2-32293 and JP-B No. 2-16765, and urethane compounds having an ethyleneoxide skeleton and described in JP-B No. 58-49860, JP-B No. 56-17654, JP-B No. 62-39417 and JP-B No. 62-39418 are also preferable. A photopolymerizable composition having excellent photoresponsive speed can also be obtained by using an addition-polymerizable compound having an amino or sulfide structure in a molecule thereof, which are disclosed in JP-A No. 63-277653, JP-A No. 63-260909, and JP-A No. 1-105238.

Other examples include polyester acrylates such as those described in JP-A No. 48-64183, JP-B No. 49-43191, and JP-B No. 52-30490, and polyfunctional acrylates or methacrylates such as an epoxy acrylate obtained by reaction of an epoxy resin and (meth)acrylic acid. Further examples include the particular unsaturated compounds described in JP-B No. 46-43946, JP-B No. 1-40337, and JP-B No. 1-40336, and the vinylphosphonic acid compounds described in JP-A No. 2-25493. Further, the structure containing a perfluoroalkyl group and described in JP-A No. 61-22048 is suitably used in some cases. Photocurable monomers and oligomers described in *Nihon Secchaku Kyoukaishi* (Journal of the Adhesion Society of Japan), Vol. 20, No. 7, pp. 300 to 308 (1984) are also usable.

Details of how to use the addition-polymerizable compounds, such as what structure should be used, whether they should be used singly or in combination, or what amount should be added, may be freely determined depending on the final performance design of the colored photosensitive composition.

For example, they may be selected from the following viewpoints. In view of sensitivity, a structure having a higher content of the unsaturated groups per molecule is preferable, and difunctional or higher functional structures are preferred in many cases. In order to increase the strength of the cured film, tri- or higher-functional structures are preferred. A method of using a combination of compounds having different numbers of functional groups and/or different types of polymerizable groups (for example, an acrylic ester, a methacrylic ester, a styrenic compound, or a vinyl ether compound) is also effective for controlling both of sensitivity and strength.

How to select and use the addition-polymerizable compound is also an important factor for the compatibility with or dispersibility to other components contained in the colored photosensitive composition (such as a binder polymer (e.g., an alkali-soluble resin), a photopolymerization initiator, a colorant (pigment)). For example, in some cases, the compatibility may be improved by using a low-purity compound or by using a combination of two or more compounds.

A particular structure may also be selected in order to improve adhesion to a substrate or the like. The addition-polymerizable compound is used in an amount of preferably from 5% by mass to 70% by mass, and more preferably from 10% by mass to 60% by mass, relative to nonvolatile components in the colored photosensitive composition. The addition-polymerizable compound may be used singly, or in combination of two or more thereof. In regard to the manner of use of the addition-polymerizable compound, an appropriate structure, an appropriate composition, and an appropriate addition amount may be freely selected from the viewpoints of degree of polymerization inhibition due to oxygen, resolution, fogging properties, change in refractive index, surface adhesiveness, or the like.

<(E) Pigment Derivative>

A pigment derivative is added, if necessary, to the pigment-dispersed composition of the second embodiment. A pigment derivative into which a portion having affinity for the dispersant or a polar group has been introduced may be allowed to be adsorbed on the surface of a processed pigment, and may be used as an adsorption site for the dispersant, as a result of which the pigment is dispersed in the photocurable composition as fine particles, and re-aggregation thereof is prevented. Therefore, the pigment derivative is effective for forming a color filter that has high contrast and excellent transparency.

The pigment derivative is specifically a compound of which the mother skeleton is an organic pigment, and to which an acidic group, a basic group, or an aromatic group has been introduced, as a substituent, into a side chain. Specifically, examples of the organic pigment for forming the mother skeleton include a quinacridone pigment, a phthalocyanine pigment, an azo pigment, a quinophthalone pigment, an isoindoline pigment, an isoindolinone pigment, a quinoline pigment, a diketopyrrolopyrrole pigment, and a benzimidazolone pigment.

The scope of the matrix skeleton includes a pale yellow aromatic polycyclic compound such as a naphthalene-based compound, an anthraquinone-based compound, a triazine-based compound, or a quinoline-based compound, each of which is not generally referred to as dye. Examples of the dye derivative include those described in JP-A No. 11-49974, JP-A No. 11-189732, JP-A No. 10-245501, JP-A No. 2006-265528, JP-A No. 8-295810, JP-A No. 11-199796, JP-A No. 2005-234478, JP-A No. 2003-240938, JP-A No. 2001-356210 and the like.

The content of the pigment derivative in the pigment-dispersed composition of the second embodiment is preferably from 1 to 30 parts by weight, and more preferably from 3 to 20 parts by weight, relative to 100 parts by weight of the pigment. When the content is within the range, the pigment is satisfactorily dispersed while maintaining the viscosity low and, further, dispersion stability after dispersing is improved. By applying the pigment-dispersed composition to production of a color filter, a color filter having high transmittance, excellent color properties, and high contrast can be obtained.

In regard to the timing of adding the pigment derivative, the pigment derivative may be added at the time of salt milling, or at the time of dispersing. The pigment derivative may be added both of at the time of salt milling and at the time of dispersing.

In regard to the method of dispersing, dispersing may be carried out by, for example, finely dispersing a mixture, which has prepared by mixing the pigment and the dispersant in advance and dispersing the resultant with a homogenizer or the like in advance, by using, for example, a bead dispersing machine (for example, DISPERMAT, manufactured by GETZMANN) in which zirconia beads or the like are used. It is preferable that the dispersion time is approximately from 3 to 6 hours.

<Dispersant>

The pigment-dispersed composition of the second embodiment includes at least one dispersant. By using the dispersant, dispersibility of the pigment is improved.

As the dispersant, at least the (A) specific graft polymer described above needs to be used. The use of the (A) specific graft polymer provides a favorable dispersion state of the pigment in an organic solvent; for example in a case in which a color filter is produced using the pigment-dispersed composition of the second embodiment, the use of the (A) specific graft polymer offers high developability and surface smoothness even at high pigment content concentrations.

In a case in which the (A) specific graft polymer is used as a dispersant, the high-molecular compound described above may be used.

As necessary, a dispersant such as a conventional known pigment dispersant or a surfactant, and/or other components may be added in addition to the (A) specific graft polymer and the (D) basic graft high-molecular compound, which is a preferable additional component.

Examples of known dispersants (pigment dispersants) include high-molecular dispersants [for example, polyamidoamine and salts thereof, polycarboxylic acid and salt thereofs, high-molecular unsaturated acid esters, modified polyurethanes, modified polyesters, modified poly(meth)acrylates, (meth)acrylic copolymers, and naphthalenesulfonic acid formalin condensates], and polyoxyethylene alkyl phosphate esters, polyoxyethylene alkylamines, alkanolamines, and pigment derivatives.

High-molecular dispersants can be classified into linear polymers, terminal-modified polymers, graft polymers, and block polymers, based on the structures thereof.

The ratio of the high-molecular compound for covering the pigment to the dispersant is not particularly limited, and is preferably from 10/90 to 90/10, and more preferably from 20/80 to 80/20, when the dispersant is a high-molecular dispersant.

<(C) Organic Solvent>

The solvent in the pigment-dispersed composition of the second embodiment is not particularly limited as long as it is an organic solvent, and may be suitably selected from known solvents. Examples of thereof include (poly)alkyleneglycol monoalkyl ethers such as 1-methoxy-2-propyl acetate, 1-methoxy-2-propanol, ethyleneglycol monomethyl ether, ethyleneglycol monoethyl ether, propyleneglycol monomethyl ether, propyleneglycol monoethyl ether, diethyleneglycol monomethyl ether, and ethyleneglycol monoethyl ether, and acetic esters thereof; acetic esters such as ethyl acetate, n-propyl acetate, i-propyl acetate, n-butyl acetate, and i-butyl acetate; aromatic hydrocarbons such as benzene, toluene, and xylene; ketones such as methyl ethyl ketone, acetone, methyl isobutyl ketone, and cyclohexanone; and alcohols such as ethanol, propanol, butanol, hexanol, cyclohexanol, ethyleneglycol, diethyleneglycol, and glycerin. The solvent may be used singly, or in a combination of two or more thereof. Among them, alkyleneglycol monoalkyl ethers and acetic esters thereof, acetic esters, methyl ethyl ketone, and the like are preferable.

The content of the solvent in the pigment-dispersed composition is suitably selected in accordance with, for example, the applications of the pigment-dispersed composition. In a case in which the pigment-dispersed composition is used in preparation of the photocurable composition described below, the concentration of solids, including pigments and pigment dispersants, may be from 5 to 50% by mass, from the viewpoint of handling properties.

It is preferable that 1-methoxy-2-propyl acetate is contained, as an (C) organic solvent, at 10% by mass or higher.

A preferable embodiment of the pigment-dispersed composition of the second embodiment is a pigment-dispersed composition including a processed pigment coated with a high-molecular compound having a weight average molecular weight of 1,000 or more, a pigment derivative, and a dispersant which are dispersed in an organic solvent. The (A) specific graft polymer may be used as a high-molecular compound for covering the pigment to be added at the time of processing the pigment, or may be used as a dispersant. It is permissible to use independent (A) specific graft polymers as the high-molecular compound for covering the pigment and as the dispersant, respectively. The (A) specific graft polymer is preferably used as the dispersant.

The addition amount of the dispersant is preferably from 0.5 to 100% by mass, more preferably from 3 to 100% by mass, and particularly preferably from 5 to 80% by mass, with respect to the pigment when the dispersant is a high-molecular dispersant. When the amount of the pigment dispersant is within the range, sufficient pigment-dispersion effect is obtained. However, the optimal addition amount of the dispersant is suitably adjusted by a combination of the kind of a pigment to be used, and the kind of a solvent.

—Preparation of Pigment-Dispersed Composition—

The manner of preparing the pigment-dispersed composition of the second embodiment is not particularly limited. The pigment-dispersed composition of the second embodiment can be obtained by, for example, subjecting the pigment, the pigment dispersant, and the solvent to fine dispersing treatment with beads having a particle diameter of from 0.01 mm to 1 mm and made of glass, zirconia, or the like, using a vertical or horizontal sand grinder, a pin mill, a slit mill, an ultrasonic disperser, or the like.

Before the dispersing using beads, kneading-dispersing treatment may be performed while applying a strong shearing force by using, for example, a two-roll mill, a three-roll mill, a ball mill, a trommel, a disper, a kneader, a cokneader, a homogenizer, a blender, or a monoaxial or biaxial extruder.

Specifics of the kneading and the dispersing are described in "Paint Flow and Pigment dispersion liquid", authored by T. C. Patton (published by John Wiley and Sons Co. 1964) and the like.

The pigment-dispersed composition of the second embodiment is suitably used in a photocurable composition for use in production of a color filter.

[Photocurable Composition]

The photocurable composition of the second embodiment includes the pigment-dispersed composition of the second embodiment described above, (F) a polymerizable compound, and (G) a photopolymerization initiator, and may contain other components such as an alkali-soluble resin, if necessary. Each component is described in detail below.

The concentration of pigment in the photocurable composition of the second embodiment (the proportion of pigment (in terms of % by mass) relative to the total solids content of the photocurable composition) is preferably 35% by mass or higher, and more preferably 40% by mass or higher. The effect of the second embodiment is particularly conspicuous when the pigment concentration is high; it is possible to provide a photocurable composition which has high pigment dispersibility and dispersion stability that has not been achieved by conventional techniques, and which provides a dry film having high solvent solubility and generates less development residues on the substrate.

(F) Polymerizable Compound

The polymerizable compound is preferably a compound having at least one ethylenic unsaturated group capable of addition polymerization, and having a boiling point of 100° C. or higher at normal pressure. The polymerizable compound is more preferably a tetra- or higher-functional acrylate compound.

Examples of the compound having at least one ethylenic unsaturated group capable of addition polymerization, and having a boiling point of 100° C. or higher at normal pressure include: monofunctional acrylates or methacrylates, such as polyethyleneglycol mono(meth)acrylate, polypropyleneglycol mono(meth)acrylate, and phenoxyethyl(meth)acrylate;

and polyfunctional acrylates or methacrylates such as polyethyleneglycol di(meth)acrylate, trimethylolethane tri(meth)acrylate, neopentylglycol di(meth)acrylate, pentaerythritol tri(meth)acrylate, pentaerythritol tetra(meth)acrylate, dipentaerythritol hexa(meth)acrylate, hexanediol(meth)acrylate, trimethylolpropane tri(acryloyloxypropyl)ether, tri(acryloyloxyethyl)isocyanurate, compounds obtained by adding ethylene oxide or propylene oxide to a polyfunctional alcohol such as glycerin or trimethylolethane and then (meth)acrylating the resultant, poly(meth)acrylated pentaerythritol or poly(meth)acrylated dipentaerythritol, urethane acrylates described in JP-B Nos. 48-41708 and 50-6034 and JP-A No. 51-37193, polyester acrylates described in JP-A No. 48-64183 and JP-B Nos. 49-43191 and 52-30490, and epoxy acrylates which are reaction products of epoxy resins and (meth)acrylic acid.

Photocurable monomers and oligomers described in *Nihon Secchaku Kyoukaishi* (Journal of the Adhesion Society of Japan), Vol. 20, No. 7, pp. 300 to 308 are also usable.

The compounds obtained by adding ethylene oxide or propylene oxide to a polyfunctional alcohol and (meth)acrylating the resultant, and which are described as Formulas (1) and (2) together with specific examples thereof in JP-A No. 10-62986, are also usable.

In particular, dipentaerythritol penta(meth)acrylate, dipentaerythritol hexa(meth)acrylate, and structures in which acryloyl groups of either of these compounds are linked to the dipentaerythritol via ethyleneglycol or propyleneglycol residues, are preferable. Oligomers thereof are also usable.

Urethane acrylates such as those described in JP-B No. 48-41708, JP-A No. 51-37193, JP-B No. 2-32293, and JP-B No. 2-16765, and urethane compounds having an ethyleneoxide skeleton and described in JP-B Nos. 58-49860, 56-17654, 62-39417, and 62-39418, are also preferable. Photopolymerizable compositions having excellent photoresponsive speed can be obtained by using addition-polymerizable compounds having an amino structure or a sulfide structure in a molecule thereof, which are described in JP-A Nos. 63-277653, 63-260909, and 1-105238. Commercially available products thereof include: urethane oligomers UAS-10 and UAB-140 (manufactured by Sanyo-Kokusaku pulp Co., Ltd.); UA-7200 (manufactured by Shin-Nakamura Chemical Co., Ltd.); DPHA-40H (manufactured by Nippon Kayaku Co., Ltd.); and UA-306H, UA-306T, UA-306I, AH-600, T-600, and AI-600 (manufactured by Kyoei Co., Ltd.).

Ethylenic unsaturated compounds having an acid group are also preferable, and commercially-available products thereof include TO-756 (manufactured by Toagosei Co., Ltd.), which is a trifunctional acrylate containing a carboxyl group, and TO-1382 (manufactured by Toagosei Co., Ltd.), which is a pentafunctional acrylate containing a carboxyl group.

The (F) polymerizable compound may be used singly, or in combination of two or more thereof.

The content of polymerizable compound in the photocurable composition is preferably from 3 to 55% by mass, more preferably from 10 to 50% by mass, relative to the total solids content of the composition. When the content of polymerizable compound is within the above range, curing reaction proceeds sufficiently.

[Photopolymerization Initiator]

The following descriptions of photopolymerization initiator are common to all aspects of the invention, including the first and second embodiments. Examples of photopolymerization initiator in the invention include: the halomethyl oxadiazoles described in JP-A No. 57-6096; active halogen compounds such as halomethyl-s-triazines such as those described in JP-B No. 59-1281 and JP-A No. 53-133428; aromatic carbonyl compounds such as the ketals, acetals, or benzoin alkyl ethers described in U.S. Pat. No. 4,318,791, European Patent Application Publication No. 88050, and the like; aromatic ketone compounds such as the benzophenones described in U.S. Pat. No. 4,199,420; the (thio)xanthone or acridine compounds described in French Patent of Invention No. 2456741; compounds, such as coumarin compounds and lophine dimers, described in JP-A No. 10-62986; and sulfonium organic boron complexes such as those described in JP-A No. 8-015521.

Preferable examples of the photopolymerization initiator in the invention include polymerization initiators of the following types: acetophenone type; ketal type; benzophenone type; benzoin type; benzoyl type; xanthone type; active halogen compound (triazine type, oxadiazole type, coumarin type); acridine type; biimidazole type; and oxime ester type.

Preferable examples of acetophenone photopolymerization initiators include 2,2-diethoxyacetophenone, p-dimethylaminoacetophenone, 2-hydroxy-2-methyl-1-phenyl-propan-1-one, p-dimethylaminoacetophenone, 4'-isopropyl-2-hydroxy-2-methyl-propiophenone, 1-hydroxy-cyclohexyl-phenyl-ketone, and 2-benzyl-2-dimethylamino-1-(4-morpholinophenyl)-butanone-1,2-tolyl-2-dimethylamino-1-(4-morpholinophenyl)-butanone-1,2-methyl-1-[4-(methylthio)phenyl]-2-morpholinopropanone-1.

Preferable examples of ketal photopolymerization initiators include benzil dimethyl ketal and benzil-β-methoxyethylacetal.

Preferable examples of benzophenone photopolymerization initiators include benzophenone, 4,4'-(bisdimethylamino)benzophenone, 4,4'-(bisdiethylamino)benzophenone, and 4,4'-dichlorobenzophenone.

Preferable examples of benzoin or benzoyl photopolymerization initiators include benzoin isopropyl ether, benzoin isobutyl ether, benzoin methyl ether, and methyl o-benzoyl benzoate.

Preferable examples of xanthone photopolymerization initiators include diethylthioxanthone, diisopropylthioxanthone, monoisopropylthioxanthone, and chlorothioxanthone.

Preferable examples of active halogen compounds (triazine type, oxadiazole type, and coumarin type) include 2,4-bis(trichloromethyl)-6-p-methoxyphenyl-s-triazine, 2,4-bis(trichloromethyl)-6-p-methoxystyryl-s-triazine, 2,4-bis(trichloromethyl)-6-(1-p-dimethylaminophenyl)-1,3-butadienyl-s-triazine, 2,4-bis(trichloromethyl)-6-biphenyl-s-triazine, 2,4-bis(trichloromethyl)-6-(p-methylbiphenyl)-s-triazine, p-hydroxyethoxystyryl-2,6-di(trichloromethyl)-s-triazine, methoxystyryl-2,6-di(trichloromethyl)-s-triazine, 3,4-dimethoxystyryl-2,6-di(trichloromethyl)-s-triazine, 4-benzoxolan-2,6-di(trichloromethyl)-s-triazine, 4-(o-bromo-p-N,N-(diethoxycarbonylamino)-phenyl)-2,6-di(chloromethyl)-s-triazine, 4-(p-N,N-(diethoxycarbonylamino)-phenyl)-2,6-di(chloromethyl)-s-triazine, 2-trichloromethyl-5-styryl-1,3,4-oxadiazole, 2-trichloromethyl-5-(cyanostyryl)-1,3,4-oxadiazole, 2-trichloromethyl-5-(naphth-1-yl)-1,3,4-oxadiazole, 2-trichloromethyl-5-(4-styryl)styryl-1,3,4-oxadiazole, 3-methyl-5-amino-((s-triazine-2-yl)amino)-3-phenylcoumarin, 3-chloro-5-diethylamino-((s-triazine-2-yl)amino)-3-phenylcoumarin, and 3-butyl-5-dimethylamino-((s-triazine-2-yl)amino)-3-phenylcoumarin.

Preferable examples of acridine photopolymerization initiators include 9-phenylacridine and 1,7-bis(9-acrydinyl)heptane.

Preferable examples of biimidazole photopolymerization initiators include: 2-(o-chlorophenyl)-4,5-diphenylimidazolyl dimer, 2-(o-methoxyphenyl)-4,5-diphenylimidazolyl dimer, and 2-(2,4-dimethoxyphenyl)-4,5-diphenylimidazolyl dimer.

Further examples include 1-phenyl-1,2-propanedione-2-(o-ethoxycarbonyl)oxime, o-benzoyl-4'-(benzmercapto)benzoyl-hexyl-ketoxime, 2,4,6-trimethylphenylcarbonyl-diphenylphosphonyl oxide, and a hexafluorophosphorotrialkylphenyl phosphonium salt.

In the invention, photopolymerization initiators are not limited to the above, and other known photopolymerization initiators may be used. Examples thereof include: vicinal polyketolaldonyl compounds described in U.S. Pat. No. 2,367,660; α-carbonyl compounds described in U.S. Pat. Nos. 2,367,661 and 2,367,670; acyloin ethers described in U.S. Pat. No. 2,448,828; aromatic acyloin compounds substituted by an α-hydrocarbon described in U.S. Pat. No. 2,722,512; polynuclear quinone compounds described in U.S. Pat. Nos. 3,046,127 and 2,951,758; a combination of a triallylimidazole dimer/p-aminophenyl ketone described in U.S. Pat. No. 3,549,367; benzothiazole compounds/trihalomethyl-s-triazine compounds described in JP-B No. 51-48516; and oxime ester compounds described in J. C. S. Perkin II (1979) 1653-1660, J. C. S. Perkin II (1979) 156-162, Journal of Photopolymer Science and Technology (1995) 202-232, and JP-A No. 2000-66385.

These photopolymerization initiators may be used in combination.

The content of photopolymerization initiator in the colored photosensitive composition in the first embodiment is preferably from 0.1% by mass to 10.0% by mass, and more preferably from 0.5% by mass to 5.0% by mass, relative to the total solids content of the composition. When the content of the photopolymerization initiator is within the above range, polymerization reaction proceeds well, thereby allowing formation of a film having favorable strength.

The content of photopolymerization initiator in the photocurable composition of the second embodiment is preferably from 0.1 to 10.0% by mass, and more preferably from 0.5 to 5.0% by mass, relative to the total solids content of the composition. When the content of the photopolymerization initiator is within the above range, polymerization reaction proceeds well, thereby allowing formation of a film having favorable strength.

[Alkali-Soluble Resin]

The colored photosensitive composition of the first embodiment preferably includes an alkali-soluble resin. Inclusion of an alkali-soluble resin in the colored photosensitive composition improves pattern formation properties in a case in which the colored photosensitive composition is applied to photolithographic pattern formation. Similarly, the photocurable composition of the second embodiment may include an alkali-soluble resin. The following descriptions of alkali-soluble resin are common to all aspects of the invention, including the first and the second embodiments.

The alkali-soluble resin is a linear organic high-molecular polymer, and may be suitably selected from alkali-soluble resins having at least one alkali-solubility-promoting group (such as a carboxyl group, a phosphoric acid group, or a sulfonic acid group) within a molecule (preferably a molecule of which the main chain is an acrylic copolymer or a styrenic copolymer). Among these, alkali-soluble resins that are soluble in an organic solvent and developable by a weakly alkaline aqueous solution are more preferable.

For production of an alkali-soluble resin, for example, a method involving a known radical polymerization method may be applied. When producing an alkali-soluble resin according to a radical polymerization method, polymerization conditions such as the temperature, the pressure, the type and amount of radical initiator and the type of solvent can be easily set by a person skilled in the art, and can be determined experimentally The linear organic high-molecular polymer is preferably a polymer having carboxylic acid at a side chain thereof. Examples thereof include methacrylic acid copolymers, acrylic acid copolymers, itaconic acid copolymers, crotonic acid copolymers, maleic acid copolymers, and partially-esterified maleic acid copolymers such as those described in JP-A No. 59-44615, JP-B No. 54-34327, JP-B No. 58-12577, JP-B No. 54-25957, JP-A No. 59-53836, and JP-A No. 59-71048; acidic cellulose derivatives having carboxylic acid at a side chain thereof; and products obtained by addition of an acid anhydride to a polymer having a hydroxyl group. Preferable examples also include high-molecular polymers having a (meth)acryloyl group at a side chain thereof.

of these, benzyl(meth)acrylate/(meth)acrylic acid copolymers and multicomponent copolymers composed of benzyl (meth)acrylate/(meth)acrylic acid/other monomer(s) are preferable.

Further, copolymers obtained by copolymerization of 2-hydroxyethyl methacrylate are also useful. The polymer may be mixed in an arbitrary amount and used.

Further examples include a 2-hydroxypropyl(meth)acrylate/polystyrene macromonomer/benzyl methacrylate/methacrylic acid copolymer, a 2-hydroxy-3-phenoxypropyl acrylate/poly(methyl methacrylate)macromonomer/benzyl methacrylate/methacrylic acid copolymer, a 2-hydroxyethyl methacrylate/polystyrene macromonomer/methyl methacrylate/methacrylic acid copolymer, and a 2-hydroxyethyl methacrylate/polystyrene macromonomer/benzyl methacrylate/methacrylic acid copolymer, which are described in JP-A No. 7-140654.

A preferable example of the alkali-soluble resin in the invention is a copolymer of (meth)acrylic acid and other monomer(s) copolymerizable therewith. Here, "(meth)acrylic acid" is a generic term encompassing acrylic acid and methacrylic acid, and "(meth)acrylate" is a generic term encompassing acrylate and methacrylate; the same applies hereinafter.

Examples of the above-mentioned other monomers copolymerizable with (meth)acrylic acid include alkyl(meth)acrylates, aryl(meth)acrylates, and vinyl compounds. Here, a hydrogen atom of the alkyl group and a hydrogen atom of the aryl group may be replaced by a substituent.

Specific examples of the alkyl(meth)acrylates and the aryl (meth)acrylates include methyl(meth)acrylate, ethyl(meth) acrylate, propyl(meth)acrylate, butyl(meth)acrylate, isobutyl (meth)acrylate, pentyl(meth)acrylate, hexyl(meth)acrylate, octyl(meth)acrylate, phenyl(meth)acrylate, benzyl(meth) acrylate, tolyl(meth)acrylate, naphthyl(meth)acrylate, and cyclohexyl(meth)acrylate.

Examples of the vinyl compounds include styrene, α-methylstyrene, vinyltoluene, glycidyl methacrylate, acrylonitrile, vinyl acetate, N-vinylpyrrolidone, tetrahydrofurfuryl methacrylate, polystyrene macromonomer, poly(methyl methacrylate)macromonomer, $CH_2=CR^1R^2$, and $CH_2=C(R^1)(COOR^3)$, wherein $R^1$ represents a hydrogen atom or an alkyl group having from 1 to 5 carbon atoms, $R^2$ represents an aromatic hydrocarbon ring having from 6 to 10 carbon atoms, and $R^3$ represents an alkyl group having from 1 to 8 carbon atoms or an aralkyl group having from 6 to 12 carbon atoms.

The above-described other copolymerizable monomers may be used singly, or in combination of two or more thereof.

The other copolymerizable monomer or monomers are preferably at least one selected from $CH_2=CR^1R^2$, $CH_2=C$ ($R^1$)($COOR^3$), phenyl(meth)acrylate, benzyl(meth)acrylate, and styrene, and are particularly preferably $CH_2=CR^1R^2$ and/or $CH_2=C(R^1)(COOR^3)$.

The content of alkali-soluble resin in the colored photosensitive composition in the first embodiment is preferably from 1% by mass to 30% by mass, more preferably from 1% by mass to 25% by mass, and particularly preferably from 2% by mass to 20% by mass, relative to the total solids content of the composition. The content of alkali-soluble resin in the photocurable composition of the second embodiment is preferably from 0 to 15% by mass, more preferably from 1 to 12% by mass, and particularly preferably from 1 to 10% by mass, relative to the total solids content of the composition.

[Solvent]

The colored photosensitive composition of the first embodiment can be suitably prepared generally using a solvent together with the components described above.

Examples of the solvent include: esters such as ethyl acetate, n-butyl acetate, isobutyl acetate, amyl formate, isoamyl acetate, isobutyl acetate, butyl propionate, isopropyl butyrate, ethyl butyrate, butyl butyrate, alkyl esters, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, alkyl 3-oxypropionates such as methyl 3-oxypropionate and ethyl 3-oxypropionate, methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate, and ethyl 2-oxobutanoate;

ethers such as diethyleneglycol dimethyl ether, tetrahydrofuran, ethyleneglycol monomethyl ether, ethyleneglycol monoethyl ether, methyl cellosolve acetate, ethyl cellosolve acetate, diethyleneglycol monomethyl ether, diethyleneglycol monoethyl ether, diethyleneglycol monobutyl ether, propyleneglycol methyl ether acetate, propyleneglycol ethyl ether acetate, and propyleneglycol propyl ether acetate;

ketones such as methyl ethyl ketone, cyclohexanone, 2-heptanone, and 3-heptanone; and aromatic hydrocarbons such as toluene and xylene.

of these, methyl 3-ethoxypropionate, ethyl 3-ethoxypropionate, ethyl cellosolve acetate, ethyl lactate, diethyleneglycol dimethyl ether, butyl acetate, methyl 3-methoxypropionate, 2-heptanone, cyclohexanone, and propyleneglycol methyl ether acetate are preferable.

The solvent may be used singly, or in combination of two or more thereof

[Other Components]

The colored photosensitive composition of the first embodiment may include various additives as necessary, such as sensitizing dyes, epoxy resins, fluorine-containing organic compounds, thermal polymerization initiators, thermally-polymerizable components, thermal polymerization inhibitors, fillers, polymer compounds other than the alkali-soluble resin, surfactants, adhesion improvers, antioxidants, UV absorbers, and aggregation inhibitors.

[Sensitizing Dye]

A sensitizing dye may be added, if necessary, to the colored photosensitive composition of the first embodiment. Also in the second embodiment, it is preferable to add a sensitizing dye, as necessary. The following descriptions of sensitizing dye are common to all aspects of the invention, including the first and the second embodiments. The sensitizing dye is capable of promoting a radical generating reaction of the photopolymerization initiator or a polymerization reaction of the photopolymerizable compound caused by the photopolymerization initiator, when exposed to light having a wavelength that the sensitizing dye can absorb.

Examples of the sensitizing dye include known spectral sensitizing pigments or dyes, and dyes or pigments which absorbs light to interact with the photopolymerization initiator.

(Spectral Sensitizing Pigment or Dye)

Examples of spectral sensitizing pigments or dyes that are preferable for use as sensitizing dyes in the invention include: polynuclear aromatics (such as pyrene, perylene, and triphenylene); xanthenes (such as fluorescein, eosin, erythrosin, rhodamine B, and rose bengal); cyanines (such as thiacarbocyanine and oxacarbocyanine); merocyanines (such as merocyanine, and carbomerocyanine); thiazines (such as thionine, methylene blue, and toluidine blue); acridines (such as acridine orange, chloroflavin, and acriflavine); phthalocyanines (such as phthalocyanine and metal phthalocyanines); porphyrins (such as tetraphenylporphyrin and central metal-substituted porphyrins); chlorophylls (such as chlorophyll, chlorophyllin, and central metal-substituted chlorophyll); metal complexes (such as the following compounds); and anthraquinones (such as anthraquinone); squaryliums (such as squarylium).

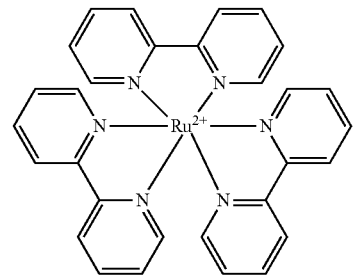

More preferable examples of the spectral sensitizing pigments or dyes include the following: styryl-based dyes described in JP-B No. 37-13034; cation dyes described in JP-A No. 62-143044; quinoxalinium salts described in JP-B No. 59-24147; novel methylene blue compounds described in JP-A No. 64-33104; anthraquinones described in JP-A No. 64-56767; benzoxanthene dyes described in JP-A No. 2-1714; acridines described in JP-A No. 2-226148 and JP-A No. 2-226149; pyrylium salts described in JP-B No. 40-28499; cyanines described in JP-B No. 46-42363; benzofuran dyes described in JP-A No. 2-63053; conjugate ketone dyes described in JP-A No. 2-85858 and JP-A No. 2-216154; dyes described in JP-A No. 57-10605; azocinnamylidene derivatives described in JP-B No. 2-30321; cyanine dyes described in JP-A No. 1-287105; xanthene-based dyes described in JP-A No. 62-31844, JP-A No. 62-31848, and JP-A No. 62-143043; aminostyryl ketones described in JP-B No. 59-28325; dyes described in JP-A No. 2-179643; melocyanine dyes described in JP-A No. 2-244050; melocyanine dyes described in JP-B No. 59-28326; melocyanine dyes described in JP-A No. 59-89303; melocyanine dyes described in JP-A No. 8-129257; and benzopyran dyes described in JP-A No. 8-334897.

(Dyes Having Absorption Maximum Wavelength at from 350 nm to 450 nm)

Examples of other preferable embodiments of the sensitizing dye include dyes belonging to the following groups of compounds and having an absorption maximum wavelength in the range of from 350 nm to 450 nm.

Examples of compound groups include polynuclear aromatics (e.g. pyrene, perylene, and triphenylene), xanthenes (e.g. fluorescein, eosin, erythrosine, rhodamine B, and rose bengal), cyanines (e.g. thiacarbocyanine and oxacarbocyanine), melocyanines (e.g. melocyanine and carbomelocyanine), thiazines (e.g. thionine, methylene blue, and toluidine blue), acridines (e.g. acridine orange, chloroflavine, and acriflavine), anthraquinones (e.g. anthraquinone), and squaryliums (e.g. squarylium).

More preferable examples of the sensitizing dye include compounds represented by the following Formulae (XIV) to (XVIII).

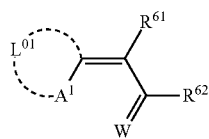

Formula (XIV)

(In Formula (XIV), $A^1$ represents a sulfur atom or $-NR^{60}-$; $R^{60}$ represents an alkyl group or an aryl group; $L^{01}$ represents a nonmetallic atom group which, together with $A^1$ and the carbon atom that are adjacent to $L^{01}$, forms a basic nucleus of a dye; $R^{61}$ and $R^{62}$ each independently represent a hydrogen atom or a monovalent nonmetallic atom group; and $R^{61}$ and $R^{62}$ may be bonded to each other to form an acidic nucleus of a dye. W represents an oxygen atom or a sulfur atom.)

Specific preferable examples [(F-1) to (F-5)] of compounds represented by Formula (XIV) are shown below.

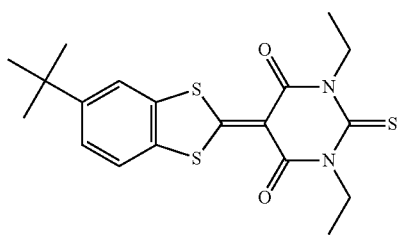
(F-1)

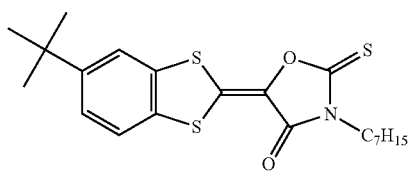
(F-2)

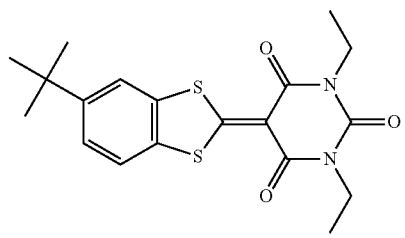
(F-3)

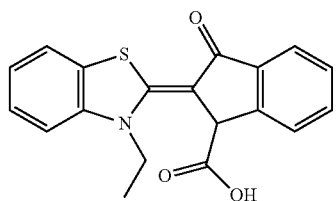
(F-4)

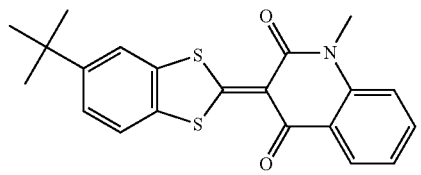
(F-5)

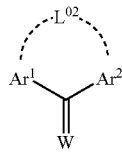

Formula (XV)

(In Formula (XV), $Ar^1$ and $Ar^2$ each independently represent an aryl group, and $Ar^1$ and $Ar^2$ are connected to each other via -$L^{02}$-. -$L^{02}$- represents —O— or —S—. W has the same definition as in Formula (XIV)).

Preferable examples of compounds represented by Formula (XV) include (F-6) to (F-8) shown below.

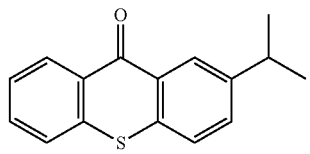
(F-6)

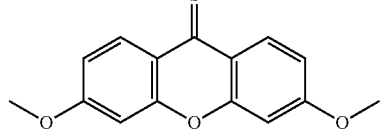
(F-7)

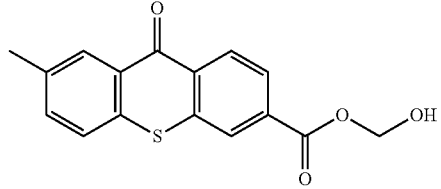
(F-8)

Formula (XVI)

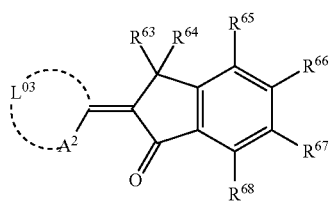

(In Formula (XVI), $A^2$ represents a sulfur atom or $-NR^{69}-$; $L^{03}$ represents a nonmetallic atom group which, together with $A^2$ and the carbon atom that are adjacent to $L^{93}$, forms a basic nucleus of a dye; $R^{63}$, $R^{64}$, $R^{65}$, $R^{66}$, $R^{67}$, and $R^{68}$ each independently represent a monovalent nonmetallic atom group; and $R^{69}$ represents an alkyl group or an aryl group).

Preferable examples of compounds represented by Formula (XVI) include (F-9) to (F-11) shown below.

(F-9)

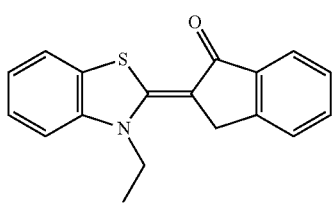

(F-10)

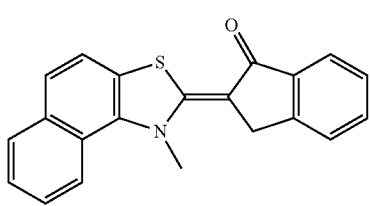

(F-11)

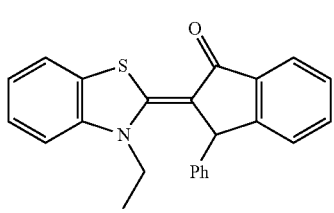

Formula (XVII)

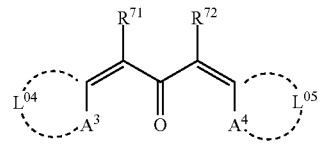

(In Formula (XVII), $A^3$ and $A^4$ each independently represent $-S-$ or $-NR^{73}-$; $R^{73}$ represents a substituted or unsubstituted alkyl group, or a substituted or unsubstituted aryl group; $L^{04}$ and $L^{05}$ each independently represent a nonmetallic atom group which, together with $A^3$ or $A^4$ and the carbon atom that are adjacent to $L^{04}$ or $L^{05}$, forms a basic nucleus of a dye; $R^{71}$ and $R^{72}$ each independently represent a monovalent nonmetallic atom group; and $R^{71}$ and $R^{72}$ may be bonded to each other to form an aliphatic or aromatic ring.)

Preferable examples of compounds represented by Formula (XVII) include (F-12) to (F-15) shown below.

(F-12)

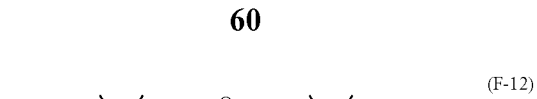

(F-13)

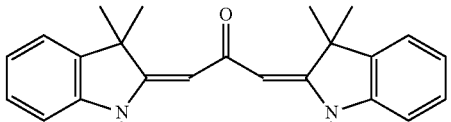

(F-14)

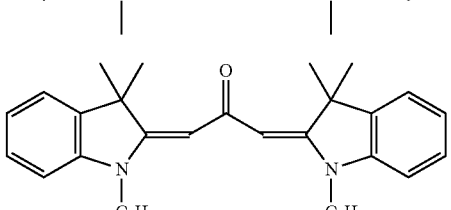

(F-15)

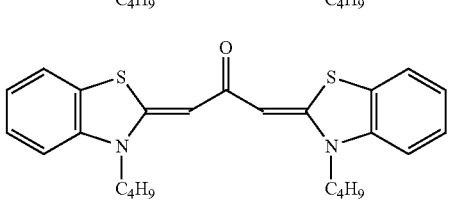

Preferable examples of the sensitizing dye used in the invention include those represented by the following formula (XVIII).

Formula (XVIII)

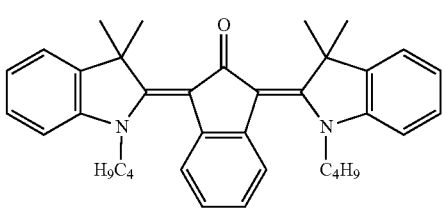

In Formula (XVIII), $A^5$ represents an aromatic ring or a heterocycle, each of which may have a substituent; X represents an oxygen atom, a sulfur atom, or $-N(R^{74})-$; Y represents an oxygen atom, a sulfur atom, or $=N(R^{74})$; $R^{74}$, $R^{75}$, and $R^{76}$ each independently represent a hydrogen atom or a monovalent nonmetallic atom group; $A^5$ and $R^{74}$ may be bonded to each other to form an aliphatic or aromatic ring; $A^5$ and $R^{75}$ may be bonded to each other to form an aliphatic or aromatic ring; and $A^5$ and $R^{76}$ may be combined respectively with each other to form an aliphatic or aromatic ring.

Here, when any of $R^{74}$, $R^{75}$, or $R^{76}$ represents a monovalent nonmetallic atom group, the monovalent nonmetallic atom group is preferably a substituted or unsubstituted alkyl group or a substituted or unsubstituted aryl group.

Next, specific preferable examples of $R^{74}$, $R^{75}$, and $R^{76}$ are described below. Preferable examples of the alkyl group include C1-C20 linear alkyl groups, C1-C20 branched alkyl groups, and C1-C20 cyclic alkyl groups. Specific examples thereof include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a s-butyl group, a t-butyl group, an isopentyl group, a neopentyl group, a 1-methylbutyl group, an isohexyl group, a 2-ethylhexyl group, a 2-methylhexyl group, a cyclohexyl group, a cyclopentyl group, and a 2-norbornyl group. Among them, linear alkyl groups having from 1 to 12 carbon atoms, branched alkyl groups having from 3 to 12 carbon atoms, and cyclic alkyl groups having from 5 to 10 carbon atoms are more preferable.

A substituent of the substituted alkyl group may be a monovalent nonmetallic atom group other than hydrogen. Preferable examples thereof include a halogen atom (—F, —Br, —Cl, —I), a hydroxyl group, an alkoxy group, an aryloxy group, a mercapto group, an alkylthio group, an arylthio group, an alkyldithio group, an aryldithio group, an amino group, an N-alkylamino group, an N,N-dialkylamino group, an N-arylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acyloxy group, an acylthio group, an acylamino group, an N-alkylacylamino group, an N-arylacylamino group, a ureido group, an N-alkylureido group, an N,N-dialkylureido group, an N-arylureido group, an N,N-diarylureido group, an N-alkyl-N-arylureido group, an N-alkylureido group, an N-arylureido group, an N-alkyl-N-alkylureido group, an N-alkyl-N-arylureido group, an N,N-dialkyl-N-alkylureido group, an N,N-dialkyl-N-arylureido group, an N-aryl-N-alkylureido group, an N-aryl-N-arylureido group, an N,N-diaryl-N-alkylureido group, an N,N-diaryl-N-arylureido group, an N-alkyl-N-aryl-N-alkylureido group, an N-alkyl-N-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsulfinyl group, an arylsulfinyl group, an alkylsulfonyl group, an arylsulfonyl group, a sulfo group (—SO$_3$H) and a conjugate base group thereof (hereinafter referred to as a sulfonato group), an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, a phosphono group (—PO$_3$H$_2$) and a conjugate base group thereof (hereinafter referred to as a phosphonato group), a dialkylphosphono group (—PO$_3$(alkyl)$_2$), a diarylphosphono group (—PO$_3$(aryl)$_2$), an alkylarylphosphono group (—PO$_3$(alkyl)(aryl)), a monoalkylphosphono group (—PO$_3$H(alkyl)) and a conjugate base group thereof (hereinafter referred to as an alkylphosphonato group), a monoarylphosphono group (—PO$_3$H(aryl)) and a conjugate base group thereof (hereinafter referred to as an arylphosphonato group), a phosphonooxy group (—OPO$_3$H$_2$) and a conjugate base group thereof (hereinafter referred to as a phosphonatooxy group), a dialkylphosphonooxy group (—OPO$_3$(alkyl)$_2$), a diarylphosphonooxy group (—OPO$_3$(aryl)$_2$), an alkylarylphosphonooxy group (—OPO$_3$(alkyl)(aryl)), a monoalkylphosphonooxy group (—OPO$_3$H(alkyl)) and a conjugate base group thereof (hereinafter referred to as an alkylphosphonatooxy group), a monoarylphosphonooxy group (—OPO$_3$H(aryl)) and a conjugate base group thereof (hereinafter referred to as an arylphosphonatooxy group), a cyano group, a nitro group, an aryl group, a heteroaryl group, an alkenyl group, an alkynyl group, and a silyl group.

Specific examples of alkyl groups in these substituents include the alkyl groups described above, which may have a further substituent.

Specific examples of the aryl group include a phenyl group, a biphenyl group, a naphthyl group, a tolyl group, a xylyl group, a mesityl group, a cumenyl group, a chlorophenyl group, a bromophenyl group, a chloromethylphenyl group, a hydroxyphenyl group, a methoxyphenyl group, an ethoxyphenyl group, a phenoxyphenyl group, an acetoxyphenyl group, a benzoyloxyphenyl group, a methylthiophenyl group, a phenylthiophenyl group, a methylaminophenyl group, a dimethylaminophenyl group, an acetylaminophenyl group, a carboxyphenyl group, a methoxycarbonylphenyl group, an ethoxyphenylcarbonyl group, a phenoxycarbonylphenyl group, an N-phenylcarbamoylphenyl group, a phenyl group, a cyanophenyl group, a sulfophenyl group, a sulfonatophenyl group, a phosphonophenyl group, and a phosphonatophenyl group.

A group derived from a monocyclic or polycyclic aromatic ring containing at least one nitrogen, oxygen, or sulfur atom may be used as the heteroaryl group. Particularly preferable examples of the heteroaryl ring in the heteroaryl group include thiophene, thianthrene, furan, pyran, isobenzofuran, chromene, xanthene, phenoxazine, pyrrole, pyrazole, isothiazole, isoxazole, pyrazine, pyrimidine, pyridazine, indolizine, isoindolizine, indole, indazole, purine, quinolizine, isoquinoline, phthalazine, naphthyridine, quinazoline, cinnoline, pteridine, carbazole, carboline, phenanthrene, acridine, perimidine, phenanthroline, phthalazine, phenarsazine, phenoxazine, furazan, and phenoxazine, each of which may be further condensed with a benzene ring, and each of which may have a substituent.

Examples of the alkenyl group include a vinyl group, a 1-propenyl group, a 1-butenyl group, a cinnamyl group, and a 2-chloro-1-ethenyl group. Examples of the alkynyl group include an ethynyl group, a 1-propynyl group, a 1-butynyl group, and a trimethylsilylethynyl group. Examples of G$^1$ in the acyl group (G$^1$CO—) include a hydrogen atom, and the alkyl groups and the aryl groups described above. Among these substituents, more preferable examples include a halogen atom (—F, —Br, —Cl, and —I), an alkoxy group, an aryloxy group, an alkylthio group, an arylthio group, an N-alkylamino group, an N,N-dialkyl amino group, an acyloxy group, an N-alkylcarbamoyloxy group, an N-arylcarbamoyloxy group, an acylamino group, a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N-alkyl-N-arylcarbamoyl group, a sulfo group, a sulfonato group, a sulfamoyl group, an N-alkylsulfamoyl group, an N,N-dialkylsulfamoyl group, an N-arylsulfamoyl group, an N-alkyl-N-arylsulfamoyl group, a phosphono group, a phosphonato group, a dialkylphosphono group, a diarylphosphono group, a monoalkylphosphono group, an alkylphosphonato group, a monoarylphosphono group, an arylphosphonato group, a phosphonooxy group, a phosphonatooxy group, an aryl group, an alkenyl group, and an alkylidene group (e.g. a methylene group).

Examples of the alkylene group in the substituted alkyl group include a divalent organic residue obtained by removing any one of the hydrogen atoms of any one of the C1-C20 alkyl groups described above. Preferable examples thereof include a C1-C12 linear alkylene group, a C3-C12 branched alkylene group, and a C5-C10 cyclic alkylene group.

Specific examples of substituted alkyl groups that are preferable as $R^{74}$, $R^{75}$, or $R^{76}$, and that are obtained by combining the substituent with an alkylene group, include a chloromethyl group, a bromomethyl group, a 2-chloroethyl group, a trifluoromethyl group, a methoxymethyl group, a methoxyethoxyethyl group, an allyloxymethyl group, a phenoxymethyl group, a methylthiomethyl group, a tolylthiomethyl group, an ethylaminoethyl group, a diethylaminopropyl group, a morpholinopropyl group, an acetyloxymethyl group, a benzoyloxymethyl group, an N-cyclohexylcarbamoyloxyethyl group, an N-phenylcarbamoyloxyethyl group, an acetylaminoethyl group, an N-methylbenzoylaminopropyl group, a 2-oxoethyl group, a 2-oxopropyl group, a carboxypropyl group, a methoxycarbonylethyl group, an allyloxycarbonylbutyl group, a chlorophenoxycarbonylmethyl group, a carbamoylmethyl group, an N-methylcarbamoylethyl group, an N,N-dipropylcarbamoylmethyl group, an N-(methoxyphenyl)carbamoylethyl group, an N-methyl-N-(sulfophenyl)carbamoylmethyl group, a sulfobutyl group, a sulfonatopropyl group, a sulfonatobutyl group, a sulfamoylbutyl group, an N-ethylsulfamoylmethyl group, an N,N-dipropylsulfamoylpropyl group, an N-tolylsulfamoylpropyl group, an N-methyl-N-(phosphonophenyl)sulfamoyloctyl group, a phosphonobutyl group, a phosphonatohexyl group, a diethylphosphonobutyl group, a diphenylphosphonopropyl group, a methylphosphonobutyl group, a methylphosphonatebutyl group, a tolylphosphonohexyl group, a tolylphosphonatohexyl group, a phosphonooxypropyl group, a phosphonatooxybutyl group, an benzyl group, an phenethyl group, an α-methylbenzyl group, a 1-methyl-1-phenylethyl group, a p-methylbenzyl group, a cinnamyl group, an allyl group, a 1-propenylmethyl group, a 2-butenyl group, a 2-methylallyl group, a 2-methylpropenylmethyl group, a 2-propynyl group, a 2-butynyl group, and a 3-butynyl group.

Preferable specific examples of the aryl group as $R^{74}$, $R^{75}$ or $R^{76}$ include a condensed ring formed from 1 to 3 benzene rings, and a condensed ring formed from at least one benzene ring and at least one 5-membered unsaturated ring. Specific examples thereof include a phenyl group, a naphthyl group, an anthryl group, a phenanthryl group, an indenyl group, an acenaphthenyl group, and a fluorenyl group. Among these groups, a phenyl group or a naphthyl group are more preferable.

Preferable specific examples of the substituted aryl group as $R^{74}$, $R^{75}$, or $R^{76}$ include a group in which a monovalent nonmetallic atom group (other than a hydrogen atom) is present as a substituent on a carbon atom contained in a ring of any of the above aryl groups. Preferable examples of the substituent include the alkyl groups described above, the substituted alkyl groups described above, and the above-described examples of substituents in the substituted alkyl groups. Preferable specific examples of the substituted aryl group include a biphenyl group, a tolyl group, a xylyl group, a mesityl group, a cumenyl group, a chlorophenyl group, a bromophenyl group, an fluorophenyl group, a chloromethylphenyl group, a trifluoromethylphenyl group, a hydroxyphenyl group, a methoxyphenyl group, a methoxyethoxyphenyl group, an allyloxyphenyl group, a phenoxyphenyl group, a methylthiophenyl group, a tolylthiophenyl group, an ethylaminophenyl group, a diethylaminophenyl group, a morpholinophenyl group, an acetyloxyphenyl group, a benzoyloxyphenyl group, an N-cyclohexylcarbamoyloxyphenyl group, an N-phenylcarbamoyloxyphenyl group, an acetylaminophenyl group, an N-methylbenzoylaminophenyl group, a carboxyphenyl group, a methoxycarbonylphenyl group, an allyloxycarbonylphenyl group, a chlorophenoxycarbonylphenyl group, a carbamoylphenyl group, an N-methylcarbamoylphenyl group, an N,N-dipropylcarbamoylphenyl group, an N-(methoxyphenyl)carbamoylphenyl group, an N-methyl-N-(sulfophenyl)carbamoylphenyl group, a sulfophenyl group, a sulfonatophenyl group, a sulfamoylphenyl group, an N-ethylsulfamoylphenyl group, an N,N-dipropylsulfamoylphenyl group, an N-tolylsulfamoylphenyl group, an N-methyl-N-(phosphonophenyl)sulfamoylphenyl group, a phosphonophenyl group, a phosphonatophenyl group, a diethylphosphonophenyl group, a diphenylphosphonophenyl group, a methylphosphonophenyl group, a methylphosphonatophenyl group, a tolylphosphonophenyl group, a tolylphosphonatophenyl group, an allylphenyl group, a 1-propenylmethylphenyl group, a 2-butenylphenyl group, a 2-methylallylphenyl group, a 2-methylpropenylphenyl group, a 2-propynylphenyl group, a 2-butynylphenyl group, and a 3-butynylphenyl group.

More preferable examples of $R^{75}$ and $R^{76}$ include a substituted or unsubstituted alkyl group. More preferable examples of $R^{74}$ include a substituted or unsubstituted aryl group. The reason for this is not clear, but is presumed to be as follows: a substituent of this kind particularly strengthen the interaction between an electron excited state generated by light absorption and an initiator compound, thereby improving the efficiency of radical, acid, or base generation by the initiator compound.

Next, $A^5$ in Formula (XVIII) is described below. $A^5$ represents an aromatic ring or heterocycle, each of which may have a substituent. Specific examples of the aromatic ring or heterocycle include the above examples described in the description of $R^{74}$, $R^{75}$ or $R^{76}$ in Formula (XVIII).

Among them, preferable examples of $A^5$ include an aryl group having an alkoxy group, a thioalkyl group, or an amino group, and particularly preferable examples of $A^5$ include an aryl group having an amino group.

Next, Y in Formula (XVIII) is described. Y represents a nonmetallic atom or nonmetallic atomic group that is directly bonded to the nitrogen-containing heterocycle in Formula (XVIII) by a double bind, and represents an oxygen atom, a sulfur atom, or $=N(R^{74})$.

X in Formula (XVIII) represents an oxygen atom, a sulfur atom, or $-N(R^{74})-$.

Next, a compound represented by the following formula (XVIII-1), which is a preferable embodiment of the compound represented by Formula (XVIII) used in the invention, is described.

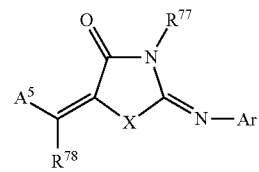

Formula (XVIII-1)

In Formula (XVIII-1), $A^5$ represents a aromatic ring or a heterocycle, each of which may have a substituent; X represents an oxygen atom, a sulfur atom, or $-N(R^{74})-$; $R^{74}$, $R^{77}$ and $R^{78}$ each independently represent a hydrogen atom or a monovalent nonmetallic atom group; $A^5$ and $R^{74}$ may be bonded to each other to form an aliphatic or aromatic ring; $A^5$ and $R^{77}$ may be bonded to each other to form an aliphatic or aromatic ring; $A^5$ and $R^{78}$ may be bonded to each other to form an aliphatic or aromatic ring; Ar represents an aromatic ring or a heterocycle, each of which has a substituent. The sum total of the Hammett's values of the substituents on the Ar skeleton needs to be greater than 0. The "sum total of Hammett's values is larger than 0" as used herein encompasses both of a case in which one substituent is present and the Hammett's value of the substituent is larger than 0 and a case in which plural substituents are present and the sum total of the Hammett's values of the substituents is larger than 0.

In Formula (XVIII-1), $A^5$ and $R^{74}$ respectively have the same definitions as in Formula (XVIII), $R^{77}$ has the same definition as $R^{75}$ in Formula (XVIII), and $R^{78}$ has the same definition as $R^{76}$ in Formula (XVIII). Ar represents an aromatic ring or a heterocycle, each of which has a substituent, and has the same definition as $A^5$ in Formula (XVIII).

However, the total sum of the Hammett's values of the substituents to be introduced into Ar in Formula (XVIII-1) needs to be 0 or greater. Examples of such substituents include a trifluoromethyl group, a carbonyl group, an ester group, a halogen atom, a nitro group, a cyano group, a sulfoxide group, an amido group, and a carboxyl group. The Hammett's value of these substituents are as follows: trifluoromethyl group (—$CF_3$, m: 0.43, p: 0.54); carbonyl group (e.g. —COH, m: 0.36, p: 0.43); ester group (—$COOCH_3$, m: 0.37, p: 0.45); halogen atom (e.g. Cl, m: 0.37, p: 0.23); cyano group (—CN, m: 0.56, p: 0.66); sulfoxide group (e.g. —$SOCH_3$, m: 0.52, p: 0.45); amido group (e.g. —NH-$COCH_3$, m: 0.21, p: 0.00); and carboxyl group (—COOH, m: 0.37, p: 0.45). The site of the substituent in the aryl skeleton and the Hammett's value of the substituent are listed inside the parentheses, and (m: 0.50) means that the Hammett's value of the substituent when introduced at a meta position is 0.50. Preferable examples of Ar include a phenyl group having a substituent, and preferable examples of a substituent on the Ar skeleton include an ester group and a cyano group. In regard to the substitution position, the substituent is particularly preferably located at an ortho position on the Ar skeleton.

Specific preferable examples [exemplary compounds (F-16) to (F-71)] of the sensitizing dyes represented by Formula (XVIII) according to the invention are shown in below. However, the invention is not limited thereto.

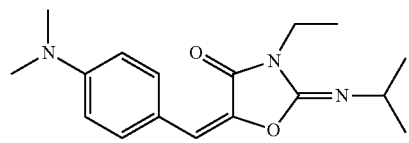
(F16)

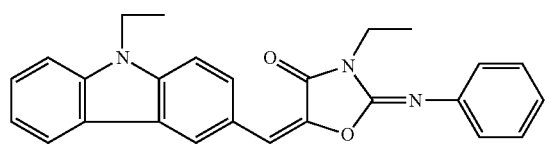
(F17)

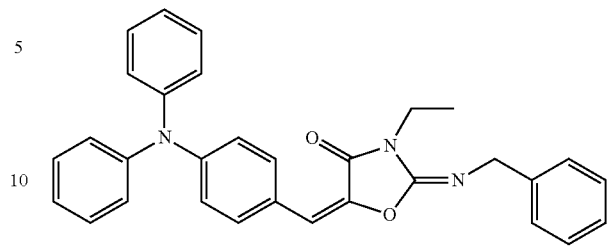
(F18)

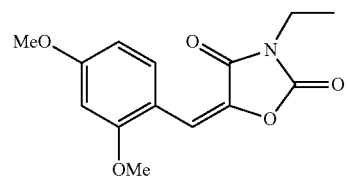
(F19)

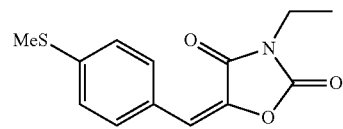
(F20)

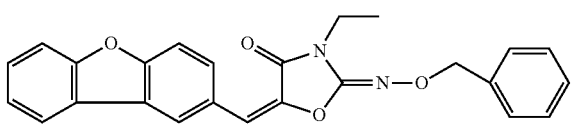
(F21)

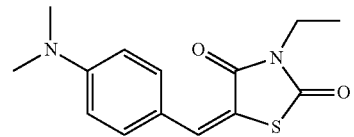
(F22)

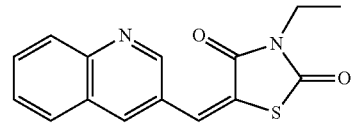
(F23)

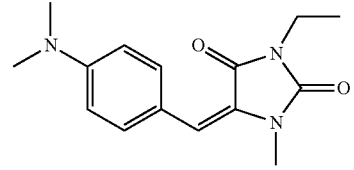
(F24)

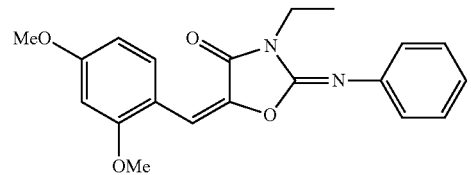
(F25)

-continued
(F26)
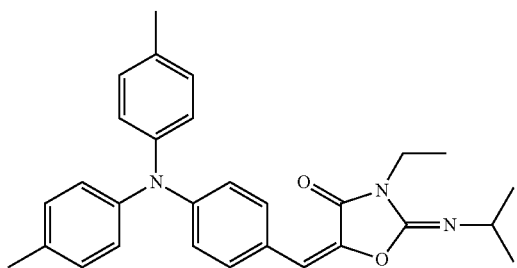
(F27)
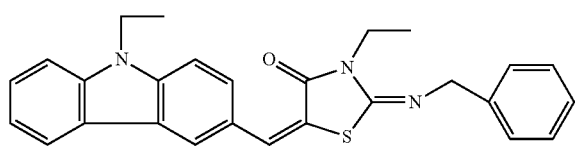
(F28)
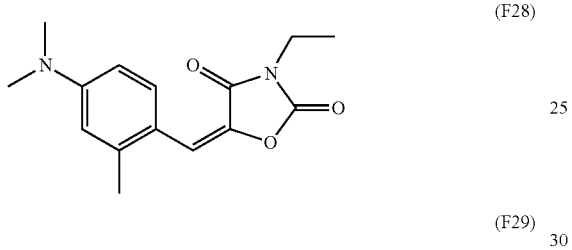
(F29)
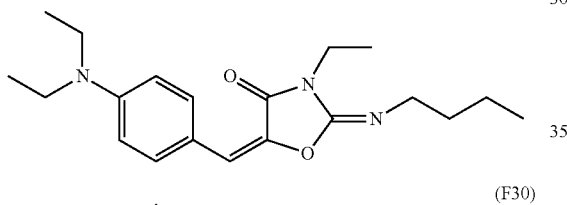
(F30)
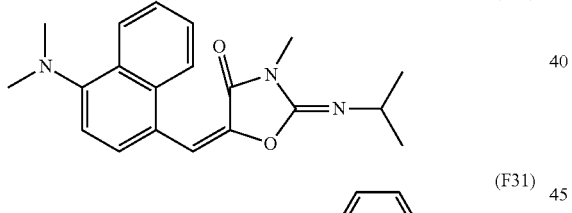
(F31)
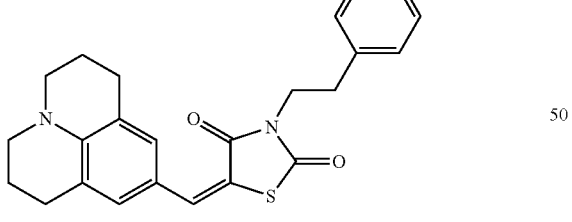
(F32)
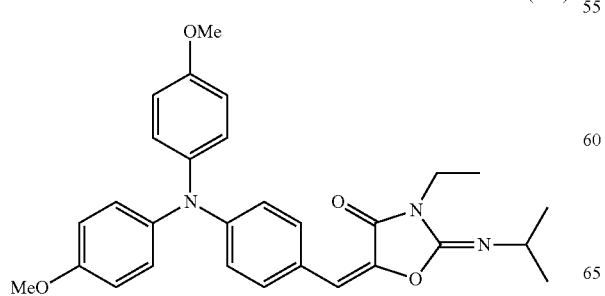
-continued
(F33)
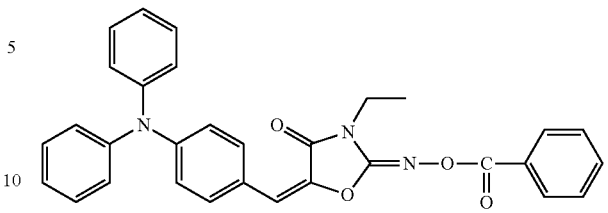
(F34)
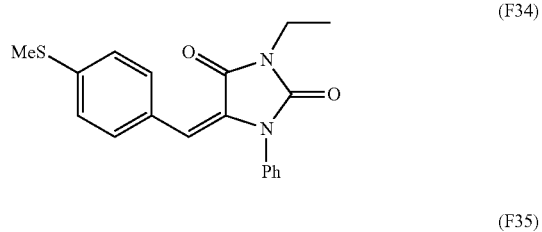
(F35)
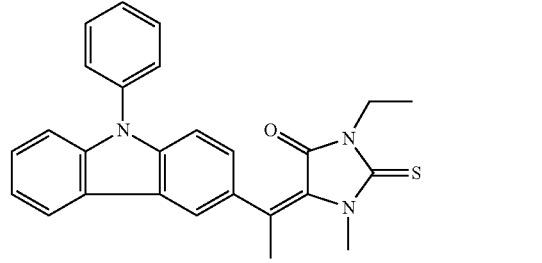
(F36)
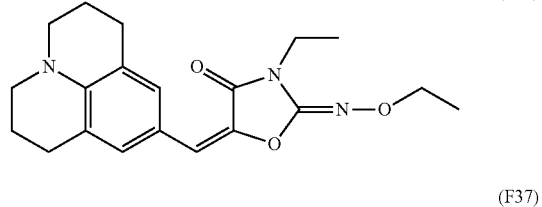
(F37)
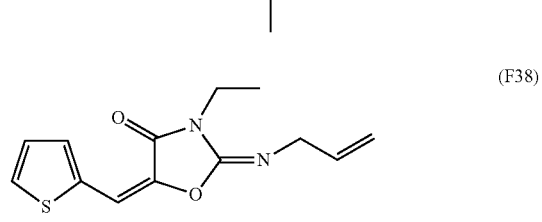
(F38)
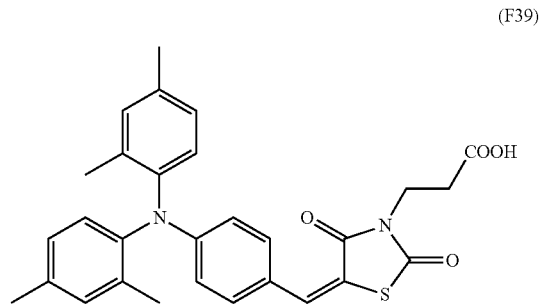
(F39)

(F40) 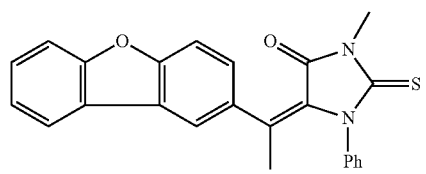
(F41) 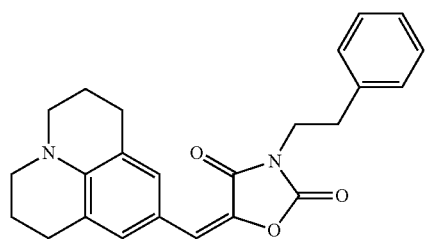
(F42) 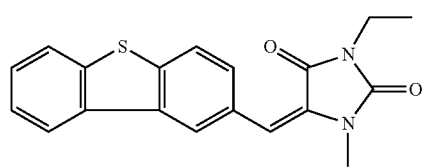
(F43) 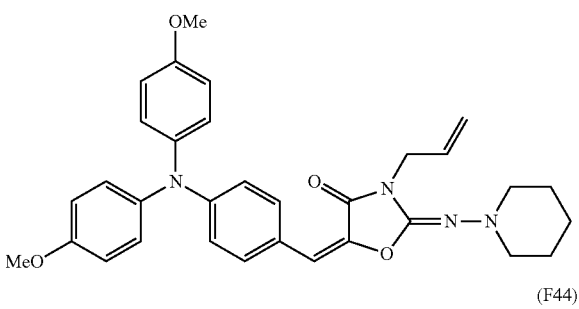
(F44) 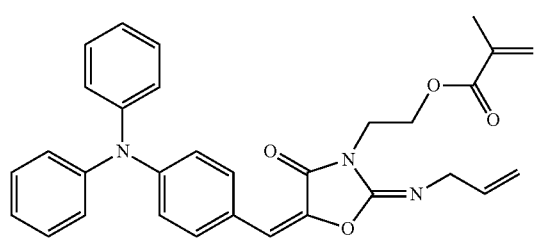
(F45) 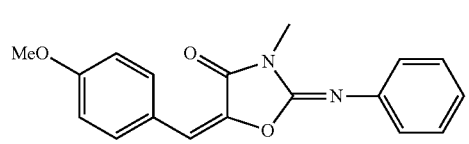
(F46) 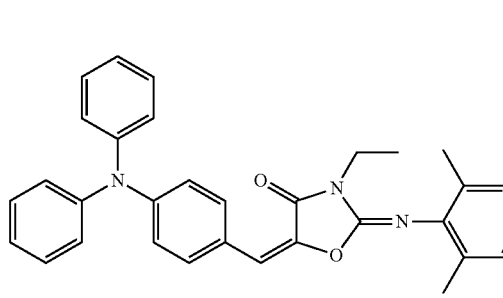
(F47) 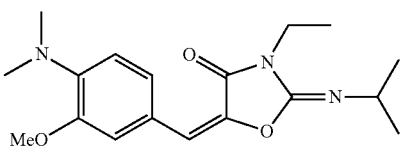
(F48) 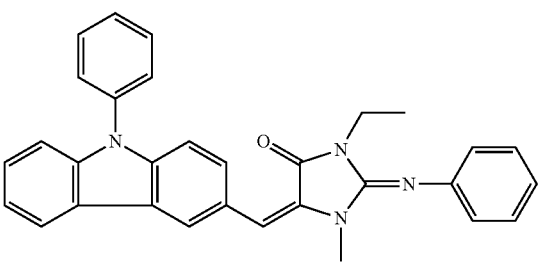
(F49) 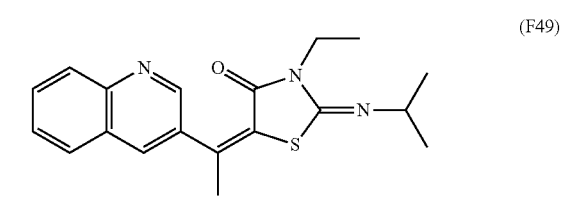
(F50) 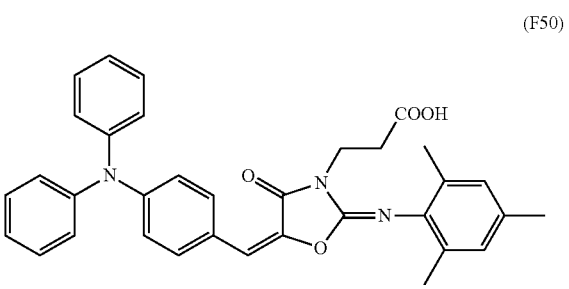
(F51) 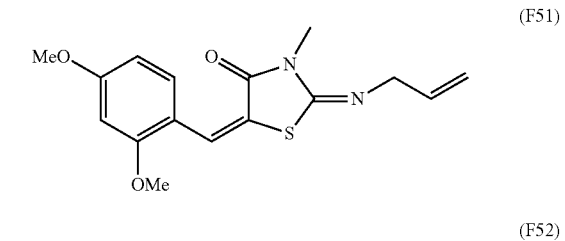
(F52) 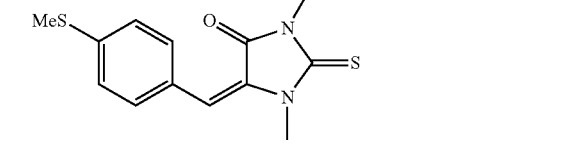
(F53) 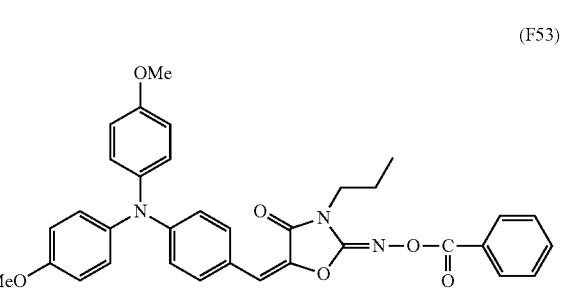

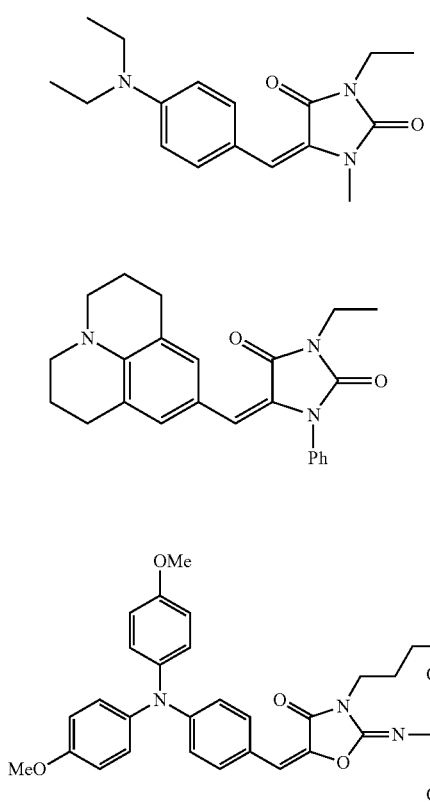
(F54)
(F55)
(F56)
(F57)
(F58)
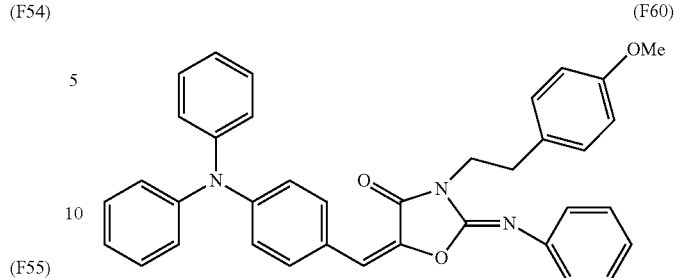
(F60)
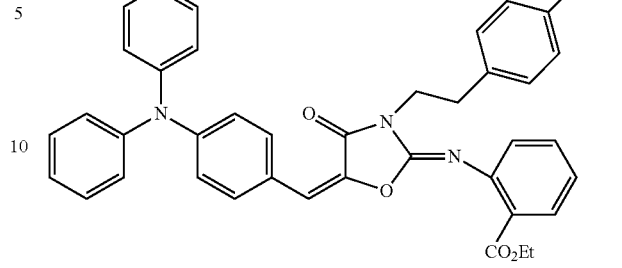
(F61)
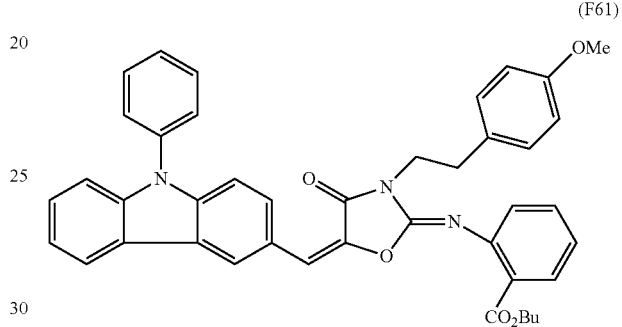
(F62)
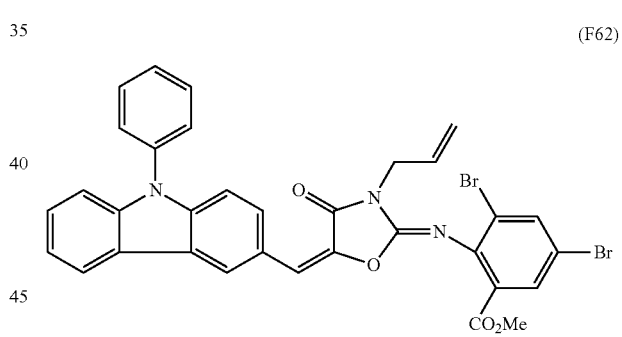
(F63)
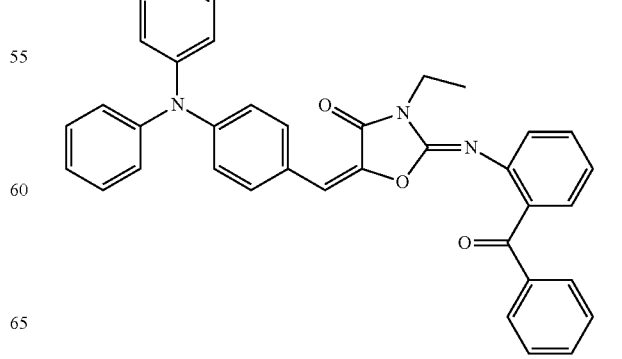

-continued (F64)
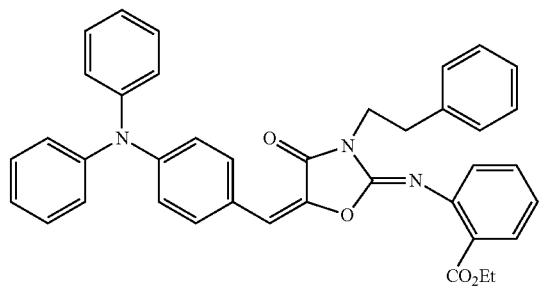

(F65)
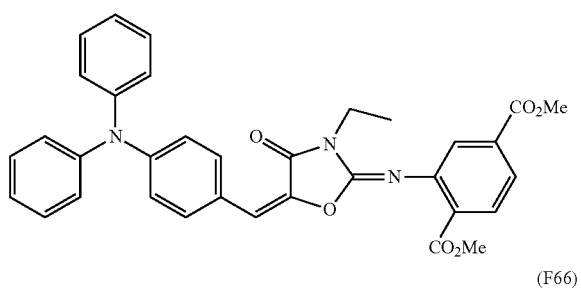

(F66)
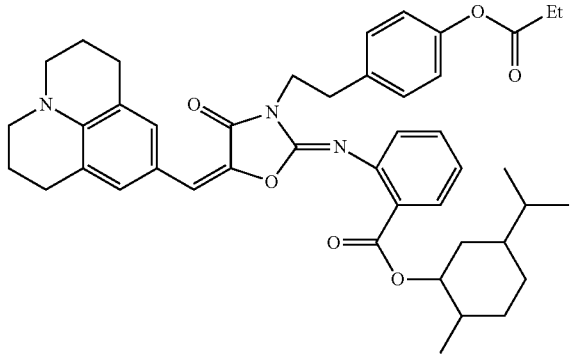

(F67)
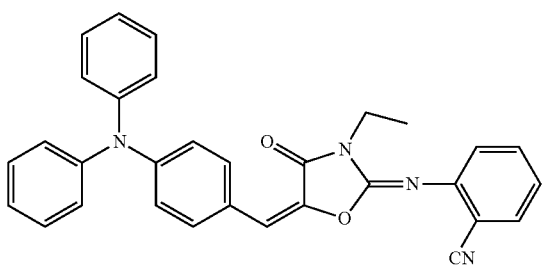

(F68)
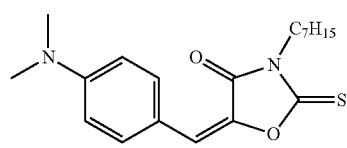

(F69)
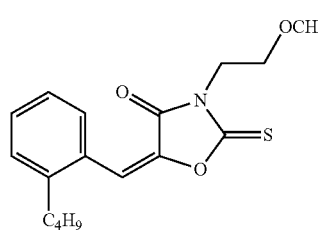

-continued (F70)

(F71)

Among sensitizing dyes applicable to the invention, compounds represented by Formula (XVIII) are preferable from the viewpoint of curability of deep portions.

Various chemical modifications, such as those described below, may be performed on the sensitizing dye in order to improve the characteristics of the colored photosensitive composition of the invention. For example, bonding of the sensitizing dye to an addition-polymerizable compound structure (such as an acryloyl group or a methacryloyl group) by a method such as a covalent bond, an ionic bond, or a hydrogen bond improves the strength of the crosslinked cured film and enhanced suppression of unnecessary precipitation of the dye from the crosslinked cured film.

The content of sensitizing dye is preferably from 0.01% by mass to 20% by mass, more preferably from 0.01% by mass to 10% by mass, and further preferably from 0.1% by mass to 5% by mass, relative to the total solids content of the colored photosensitive composition.

A content of sensitizing dye within the above range is preferable in terms of high sensitivity to the exposure wavelengths of an ultrahigh pressure mercury lamp, provision of curability of deep portions of the layer, development margin, and pattern formation properties.

(Epoxy Resin)

In the colored photosensitive composition of the first embodiment, an epoxy resin may be used as a thermally-polymerizable component in order to increase the strength of a formed coating film.

Examples of the epoxy resin include a compound having two or more epoxy rings in a molecule thereof, such as a bisphenol-A epoxy resin, a cresol novolac epoxy resin, a biphenyl epoxy resin, or an alicyclic epoxy resin.

Examples of the bisphenol-A epoxy resin include EPOTOHTO YD-115, YD-118T, YD-127, YD-128, YD-134, YD-8125, YD-7011R, ZX-1059, YDF-8170, and YDF-170 (manufactured by Tohto Kasei Co., Ltd.), DENACOL EX-1101, EX-1102, and EX-1103 (manufactured by Nagase Kasei Co., Ltd.), and PRAXEL GL-61, GL-62, G101, and G102 (manufactured by Daicel Chemical Industries, Ltd.), and bisphenol-F epoxy resins and bisphenol-S epoxy resins which are similar to the above products. Epoxy acrylates such as EBECRYL 3700, EBECRYL 3701 and EBECRYL 600 (manufactured by Daicel UCB Ltd.) are also usable.

Examples of the cresol novolac epoxy resin include EPOTOHTO YDPN-638, YDPN-701, YDPN-702, YDPN-703, and YDPN-704 (manufactured by Tohto Kasei Co., Ltd.), and DENACOL EM-125 (manufactured by Nagase Kasei Co., Ltd.). Examples of the biphenyl epoxy resin include 3,5,3',5'-tetramethyl-4,4'diglycidyl biphenyl. Examples of the alicyclic epoxy resin include CELLOXIDE 2021, CELLOXIDE 2081, CELLOXIDE 2083, CELLOXIDE 2085, EPOLEAD GT-301, GT-302, GT-401, GT-403, and EHPE-3150 (manufactured by Daicel Chemical Industries, Ltd.), SUNTOHTO ST-3000, ST-4000, ST-5080, and ST-5100 (manufactured by Tohto Kasei Co., Ltd.), EPICLON 430, EPICLON 673, EPICLON 695, EPICLON 8505, and EPICLON 4032 (manufactured by DAINIPPON INK & CHEMICALS INC).

Other examples of epoxy resins that can be used include 1,1,2,2-tetrakis(p-glycidyloxyphenyl)ethane, tris(p-glycidyloxyphenyl)methane, triglycidyl tris(hydroxyethyl)isocyanurate, diglycidyl o-phthalate, diglycidyl terephthalate, as well as EPOTOHTO YH-434 and YH-434L, both of which are amine-type epoxy resins, and glycidyl esters in which the skeleton of a bisphenol-A epoxy resin is modified with a dimer acid.

Among them, the ratio of (molecular weight)/(number of epoxy rings) is preferably 100 or higher, and more preferably from 130 to 500. If the ratio of (molecular weight)/(number of epoxy rings) is small, curability is high, and contraction during curing is large. If the ratio is excessively high, curability is insufficient, which leads to reduced reliability or deterioration in flatness.

Specific preferable compounds include EPOTOHTO YD-115, YD-118T, YD-127, YDF-170, YDPN-638, YDPN-701, PRAXEL GL-61, GL-62, 3,5,3',5'-tetramethyl-4,4'diglycidylbiphenyl, CELLOXIDE 2021, CELLOXIDE 2081, EPOLEAD GT-302, GT-403, and EHPE-3150.

(Fluoroorganic Compound)

Inclusion of a fluoroorganic compound in the colored photosensitive composition of the first embodiment or the photocurable composition of the second embodiment improves liquid characteristics (in particular flowability) of a coating liquid formed therefrom, and improves the coating thickness uniformity and liquid saving properties.

Namely, the colored photosensitive composition a fluoroorganic compound or the photocurable composition containing a fluoroorganic compound is effective in that it exhibits reduced surface tension between a surface to be coated and the coating liquid, thus improves wettability with respect to the coated surface and the coating properties on the surface to be coated, thereby enabling formation of a film having uniform thickness with reduced thickness unevenness even when a thin film having a thickness of a few micrometers is formed using a small amount of liquid.

The fluorine content of the fluoroorganic compound is preferably from 3% by mass to 40% by mass, more preferably from 5% by mass to 30% by mass, and particularly preferably from 7% by mass to 25% by mass. A fluorine content within the above range is effective in terms of coating thickness uniformity and liquid saving properties, and exhibits a favorable solubility in the composition.

Examples of the fluoroorganic compound in the first embodiment include: MEGAFACE F171, MEGAFACE F172, MEGAFACE F173, MEGAFACE F177, MEGAFACE F141, MEGAFACE F142, MEGAFACE F143, MEGAFACE F144, MEGAFACE R30, and MEGAFACE F437 (manufactured by Dainippon Ink and Chemicals, Inc.); FLUORAD FC430, FLUORAD FC431 and FLUORAD FC171 (manufactured by Sumitomo 3M); and SURFLON S-382, SURFLON SC-101, SURFLON SC-103, SURFLON SC-104, SURFLON SC-105, SURFLON SC1068, SURFLON SC-381, SURFLON SC-383, SURFLON 5393, and SURFLON KH-40 (manufactured by Asahi Glass Co., Ltd.).

The fluoroorganic compound is particularly effective for prevention of coating unevenness or thickness unevenness in the case of forming a thin coating film using the colored photosensitive composition of the first embodiment. The fluoroorganic compound is also effective in the case of applying the colored photosensitive composition of the first embodiment to a slit coating, in which liquid shortage tends to occur.

The addition amount of the fluoroorganic compound is preferably from 0.001% by mass to 2.0% by mass, and more preferably from 0.005% by mass to 1.0% by mass, relative to the total mass of the colored photosensitive composition.

A fluoroorganic compound having a fluoroalkyl group or a fluoroalkylene group at least one of a terminal, main chain, or side chain thereof can be preferably used as a fluorosurfactant in the second embodiment. Examples of specific commercial products thereof include MEGAFACE F142D, MEGAFACE F172, MEGAFACE F173, MEGAFACE F176, MEGAFACE F177, MEGAFACE F183, MEGAFACE 780, MEGAFACE 781, MEGAFACE R30, MEGAFACE R08, MEGAFACE F-472 SF, MEGAFACE BL20, MEGAFACE R-61, and MEGAFACE R-90 (manufactured by Dainippon Ink); FLUORAD FC-135, FLUORAD FC-170C, FLUORAD FC-430, FLUORAD FC-431, and NOVEC FC-4430 (manufactured by Sumitomo 3M); ASAHI GUARD AG7105, ASAHI GUARD 7000, ASAHI GUARD 950, ASAHI GUARD 7600, SURFLON S-112, SURFLON S-113, SURFLON S-131, SURFLON S-141, SURFLON S-145, SURFLON S-382, SURFLON SC-101, SURFLON SC-102, SURFLON SC-103, SURFLON SC-104, SURFLON SC-105, and SURFLON SC-106 (manufactured by Asahi Glass Co., Ltd.); and EFTOP EF351, EFTOP 352, EFTOP 801, and EFTOP 802 (manufactured by JEMCO).

The fluoroorganic compound is particularly effective for prevention of coating unevenness or thickness unevenness in a case in which the coating film is thin. The fluoroorganic compound is also effective in the case of slit coating, in which liquid shortage tends to occur.

The addition amount of the fluoroorganic compound is preferably from 0.001 to 2.0% by mass, and more preferably from 0.005 to 1.0% by mass, relative to the total mass of the photocurable composition.

(Thermal Polymerization Initiator)

It is effective that the colored photosensitive composition of the first embodiment or the photocurable composition of the second embodiment includes a thermal polymerization initiator.

Examples of the thermal polymerization initiator include various azo compounds and peroxide compounds.

Examples of the azo compounds include azobis compounds, and examples of the peroxide compounds include ketone peroxide, peroxyketal, hydroperoxide, dialkyl peroxide, diacyl peroxide, peroxyester, and peroxydicarbonate.

(Surfactant)

Various surfactants may be incorporated into the colored photosensitive composition of the first embodiment in order to improve coating properties. Examples of surfactants that can be used include, besides the fluorosurfactants described above, various nonionic surfactants, cationic surfactants, and anionic surfactants.

Among these, fluorosurfactants which have a perfluoroalkyl group and which are nonionic surfactants, and nonionic surfactants are preferable.

Specific examples of fluorosurfactants include MEGAFACE (registered trademark) series manufactured by DAINIPPON INK & CHEMICALS INC, and FLUORAD (registered trademark) series manufactured by 3M.

Specific examples of cationic surfactants include: phthalocyanine derivatives (commercial product: EFKA-745 (manufactured by Morishita & Co., Ltd.)); an organosiloxane polymer KP341 (manufactured by Shin-Etsu Chemical Co., Ltd.); POLYFLOW No. 75, POLYFLOW No. 90, and POLYFLOW No. 95, which are (meth)acrylic (co)polymers (manufactured by KYOEISHA CHEMICAL Co., LTD); and W001 (manufactured by Yusho Co., Ltd.).

Specific examples of nonionic surfactants include polyoxyethylene lauryl ether, polyoxyethylene stearyl ether, polyoxyethylene oleyl ether, polyoxyethylene octylphenyl ether, polyoxyethylene nonylphenyl ether, polyethyleneglycol dilaurate, polyethyleneglycol distearate, and sorbitan fatty acid esters (PLURONIC L10, PLURONIC L31, PLURONIC L61, PLURONIC L62, PLURONIC 10R5, PLURONIC 17R2, PLURONIC 25R2, TETRONIC 304, TETRONIC 701, TETRONIC 704, TETRONIC 901, TETRONIC 904, TETRONIC 150R1, manufactured by BASF).

Furthermore, specific examples of anionic surfactants include W004, W005, and W017 (manufactured by Yusho Co., Ltd.).

Other Additives in the First Embodiment

Besides those described above, various additives may be incorporated into the colored photosensitive composition of the first embodiment.

Specific examples of the additives include: fillers such as glass and alumina; alkali-soluble resins such as itaconic acid copolymers, crotonic acid copolymers, maleic acid copolymers, partially esterified maleic acid copolymers, acidic cellulose derivatives, products formed by addition of an acid anhydride to a polymer having a hydroxyl group, an alcohol-soluble nylon, and a phenoxy resin formed from bisphenol A and epichlorohydrin; high-molecular dispersants such as EFKA-46, EFKA-47, EFKA-47EA, EFKA Polymer 100, EFKA Polymer 400, EFKA Polymer 401, and EFKA Polymer 450 (manufactured by Morishita & Co., Ltd.), and DISPERSE AID 6, DISPERSE AID 8, DISPERSE AID 15, and DISPERSE AID 9100 (manufactured by SAN NOPCO LIMITED); various SOLSPERSE dispersants such as SOLSPERSE 3000, SOLSPERSE 5000, SOLSPERSE 9000, SOLSPERSE 12000, SOLSPERSE 13240, SOLSPERSE 13940, SOLSPERSE 17000, SOLSPERSE 24000, SOLSPERSE 26000 and SOLSPERSE 28000 (manufactured by Zeneca); ADEKA PLURONIC L31, ADEKA PLURONIC F38, ADEKA PLURONIC L42, ADEKA PLURONIC L44, ADEKA PLURONIC L61, ADEKA PLURONIC L64, ADEKA PLURONIC F68, ADEKA PLURONIC L72, ADEKA PLURONIC P95, ADEKA PLURONIC F77, ADEKA PLURONIC P84, ADEKA PLURONIC F87, ADEKA PLURONIC P94, ADEKA PLURONIC L101, ADEKA PLURONIC P103, ADEKA PLURONIC F 108, ADEKA PLURONIC L121, and ADEKA PLURONIC P-123 (manufactured by Adeka Corporation), and ISONET S-20 (manufactured by Sanyo Chemical Industries, Ltd.); ultraviolet absorbers such as 2-(3-t-butyl-5-methyl-2-hydroxyphenyl)-5-chlorobenzotriazole and alkoxybenzophenone; and aggregation inhibitors such as sodium polyacrylate.

In order to enhance alkali-solubility of uncured portions and further improve the developability of the colored photosensitive composition, it is preferable to incorporate an organic carboxylic acid, preferably a low-molecular organic carboxylic acid having a molecular weight of 1,000 or less, into the colored photosensitive composition of the first embodiment.

Specific examples thereof include aliphatic monocarboxylic acids such as formic acid, acetic acid, propionic acid, butyric acid, valeric acid, pivalic acid, caproic acid, diethylacetic acid, enanthic acid, and caprylic acid; aliphatic dicarboxylic acids such as oxalic acid, malonic acid, succinic acid, glutaric acid, adipic acid, pimelic acid, suberic acid, azelaic acid, sebacic acid, brassylic acid, methylmalonic acid, ethylmalonic acid, dimethylmalonic acid, methylsuccinic acid, tetramethylsuccinic acid, and citraconic acid; aliphatic tricarboxylic acids such as tricarballylic acid, aconitic acid, and camphoronic acid; aromatic monocarboxylic acids such as benzoic acid, toluic acid, cuminic acid, hemellitic acid, and mesitylenic acid; aromatic polycarboxylic acids such as phthalic acid, isophthalic acid, terephthalic acid, trimellitic acid, trimesic acid, mellophanic acid, and pyromellitic acid; and other carboxylic acids such as phenylacetic acid, hydratropic acid, hydrocinnamic acid, mandelic acid, phenylsuccinic acid, atropic acid, cinnamic acid, methyl cinnamate, benzyl cinnamate, cinnamylideneacetic acid, coumaric acid, and umbellic acid.

A thermal-polymerization inhibitor may be incorporated into the colored photosensitive composition of the first embodiment. Examples of compounds that are useful as thermal-polymerization inhibitor include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), and 2-mercaptobenzimidazole.

The colored photosensitive composition of the first embodiment can be prepared by adding a photopolymerizable compound, a photopolymerization initiator, and, optionally, additives (such as alkali-soluble resins, solvents, and surfactants) to the pigment-dispersed composition of the first embodiment described above.

Since the colored photosensitive composition of the first embodiment includes the pigment-dispersed composition containing the processed pigment of the invention, the colored photosensitive composition exhibits excellent dispersibility of the processed pigment, and excellent color properties.

For this reason, it is preferable that the composition is used to form a colored region of a color filter which is required to have superior color properties.

<Color Filter>

The color filter of the first embodiment has a colored region formed from the colored photosensitive composition of the first embodiment on a substrate.

Here, the scope of colored region includes both of a three-color or four-color colored pattern (pixel portion), and a black matrix.

The color filter of the first embodiment is described below in detail by reference to a production method thereof.

The process for producing the color filter of the first embodiment is described below.

First, the colored photosensitive composition of the first embodiment is coated on a substrate directly or with at least one other layer therebetween by a coating method such as spin coating, slit coating, casting coating, roll coating, or bar coating, thereby forming a coating film formed from the colored photosensitive composition (coating process). Thereafter, the coating film is exposed to light through a predetermined mask pattern (light exposure process). After exposure to light, uncured portions of the coating film are removed by development with a developer liquid (development process). Through these processes, a colored pattern composed of pixels of respective colors (three colors or four colors) is formed, thereby providing a color filter.

This method enables production of a high-quality color filter for use in liquid crystal display devices or solid-state image pickup devices, with little process-associated difficulty and at low cost. Each process is described in detail below.

[Coating Process]

First, the substrate used in the coating process is described.

Examples of substrates used in the color filter of the first embodiment include: alkali-free glass, soda glass, PYREX (registered trademark) glass, quartz glass, and materials obtained by attaching a transparent conductive film to these glasses, which are used in liquid crystal display devices and the like; photoelectric conversion device substrates such as silicon substrates, which are used in solid-state imaging devices; and plastic substrates.

A black matrix that separates the respective pixels may be formed on the support, and/or a transparent resin layer may be formed on the support in order to, for example, improve adhesion.

A surface of a plastic substrate is preferably provided with a gas barrier layer and/or a solvent-resistance layer.

Further, a color filter may be produced by providing a substrate for driving on which thin-film transistors (TFTs) for thin-film transistor (TFT) color liquid crystal displays are disposed (hereinafter referred to as "substrate for TFT liquid crystal driving"), and forming a colored pattern by using the colored photosensitive composition of the first embodiment on the substrate for driving.

Examples of the substrate of the "substrates for TFT liquid crystal driving" include glass, silicone, polycarbonate, polyester, aromatic polyamide, polyamidoimide, and polyimide. These substrates have been optionally subjected to appropriate pretreatment such as chemical treatment with, for example, a silane coupling agent, plasma treatment, ion plating, sputtering, vapor phase reaction, vacuum deposition. For example, a substrate obtained by forming a passivation film, such as a silicon nitride film, on a surface of the substrate for TFT liquid crystal driving may be used.

The method whereby the colored photosensitive composition of the first embodiment is coated on a substrate employed in the coating process is not particularly limited, but a method using a slit nozzle (hereinafter referred to as "slit nozzle coating method") such as a slit-and-spin method or a spinless coating method is preferable.

Among slit nozzle coating methods, the conditions of the slit-and-spin coating method and the spinless coating method may vary with the size of the substrate on which coating is to be performed. For example, in the case of coating on a fifth-generation glass substrate (1,100 mm×1,250 mm) by a spinless coating method, the amount of the colored photosensitive composition ejected from the slit nozzle is usually from 500 to 2,000 microliters/second, and preferably from 800 to 1,500 microliters/second, and the coating speed is usually from 50 to 300 mm/second, and preferably from 100 to 200 mm/second.

The solids content of the colored photosensitive composition used in the coating process is usually from 10% to 20%, and preferably from 13% to 18%.

In the case of forming a coating film from the colored photosensitive composition of the first embodiment on a substrate, the thickness of the coating film (after prebaking treatment) is generally from 0.3 to 5.0 µm, desirably from 0.5 to 4.0 µm, and most desirably from 0.5 to 3.0 µm.

In the case of a color filter for a solid-state image pickup device, the thickness of the coating film (after prebaking treatment) is preferably within the range of from 0.5 to 5.0 µm.

In the coating process, prebaking treatment is usually preformed after coating. Vacuum treatment may be performed before prebaking, if necessary.

The conditions of the vacuum drying may be such that the degree of vacuum is usually from 0.1 to 1.0 torr, and is preferably approximately from 0.2 to 0.5 torr.

The prebaking treatment may be performed using a hot plate, an oven, or the like, at a temperature range of from 50 to 140° C., preferably about 70 to 110° C., for from 10 to 300 seconds.

High-frequency treatment or the like may be used in combination with the prebaking treatment. High-frequency treatment may alternatively be used alone.

[Light Exposure Process]

In the light exposure process, the coating film from the colored photosensitive composition as described above is exposed to light through a predetermined mask pattern.

The radiation used in the light exposure is particularly preferably ultraviolet light such as g-line, h-line, i-line, or j-line.

In the case of producing a color filter for a liquid crystal display, light exposure using mainly h-line or i-line is preferably employed by using a proximity light-exposure machine or a mirror projection light-exposure machine.

In the case of producing a color filter for a solid-state image pickup device, light exposure using mainly i-line is preferably performed by using a stepper light exposure machine.

In producing a color filter using a substrate for TFT method liquid crystal driving, the photomask used therefor is provided with a pattern for forming a through hole or a U-shaped depression as well as a pattern for forming pixels (colored pattern).

[Development Process]

In the development process, uncured portions of the coating film after light exposure are dissolved in a developer liquid, thereby leaving only cured portions on the substrate. The development temperature is usually from 20° C. to 30° C., and the development time is usually from 20 to 90 seconds.

The developer liquid may be any developer that dissolves uncured portions of the coating film of the colored photosensitive composition, but does not dissolve cured portions.

Specifically, various combinations of organic solvents, and alkaline aqueous solutions may be used.

Examples of the organic solvents used in the development include the above-described solvents that can be used in the preparation of the colored photosensitive composition of the first embodiment.

Examples of the alkaline aqueous solutions include an alkaline aqueous solution in which an alkaline compound is dissolved at a concentration of from 0.001 mass % to 10 mass %, preferably from 0.01 mass % to 1 mass %, and examples of the alkaline compound include sodium hydroxide, potassium hydroxide, sodium carbonate, sodium hydrogencarbonate, sodium silicate, sodium metasilicate, aqueous ammonia, ethylamine, diethylamine, dimethyl ethanolamine, tetramethyl ammonium hydroxide, tetraethyl ammonium hydroxide, choline, pyrrole, piperidine, and 1,8-diazabicyclo-[5.4.0]-7-undecene.

A water-soluble organic solvent such as methanol or ethanol, a surfactant, or the like may be added in an appropriate amount into the alkaline aqueous solution.

The development method may be any method such as a dip method, a shower method, or a spray method, and a swing method, a spin method, a ultrasonic method or the like may be combined therewith. The face to be developed may be moistened with water or the like before contacting a developer liquid, so as to prevent development unevenness. The development may be conducted while the substrate is inclined.

Puddle development may be employed in the case of producing a color filter for a solid-state imaging device.

After the development treatment, a rinse process whereby excess developer liquid is removed by washing is conducted, and drying is performed, and, thereafter, heating treatment (postbaking) is conducted so as to perfect the curing.

The rinse process is conducted usually with pure water. However, it is permissible to use pure water at final washing but use used pure water at initial stages of washing for saving liquid. It is also permissible to perform washing while the substrate is inclined. Ultrasonic wave irradiation may be employed additionally.

After the rinse process, draining and drying are performed. Thereafter, heating treatment at, usually, from about 200° C. to about 250° C. is performed.

The heating treatment (postbaking) may be conducted on the coating film after development, in a continuous manner or batch manner using a heating means such as a hot plate, a convection oven (hot air circulation dryer) or a high-frequency heating apparatus such that the above conditions are satisfied.

A color filter formed by colored cured films (colored patterns) of plural colors can be produced by sequentially repeating the above operations for each color in accordance with the desired number of hues.

Since the color filter of the first embodiment has high contrast, small color concentration unevenness, and superior color properties, the color filter can be suitably used in solid-state image pickup devices or liquid crystal display devices.

Although an application to a colored pattern of a color filter is mainly described as an application of the colored photosensitive composition of the first embodiment, the colored photosensitive composition is also applicable to formation of a black matrix that separates colored patterns (pixels) of a color filter.

A black matrix can be formed on a substrate by carrying out the processes of coating, light exposure, and development using the colored photosensitive composition containing a processed pigment of a black pigment such as carbon black or titanium black, and thereafter optionally conducting post-baking.

<Liquid Crystal Display Device and Solid-State Image Pickup Device>

The liquid crystal display device and the solid-state image pickup device of the first embodiment have the color filter of the first embodiment. More specifically, a panel that is a liquid crystal display device of the first embodiment is obtained by, for example, forming an orientation film on the inner side of the color filter, arranging the orientation film to face an electrode substrate, filling a liquid crystal into a gap portion, and sealing the resultant. The solid-state image pickup device of the first embodiment is obtained by, for example, forming a color filter on a light receiving device.

Other Components in the Second Embodiment

The photocurable composition of the second embodiment may include various additives as necessary, such as a chain transfer agent, a fluoroorganic compound, a thermal polymerization initiator, a thermally-polymerizable component, a thermal polymerization inhibitor, other fillers, high-molecular compounds other than the alkali-soluble resins, a surfactant, an adhesion promoter, an antioxidant, an ultraviolet absorber, and an aggregation inhibitor.

<Chain Transfer Agent>

Examples of the chain transfer agent that may be added to the photocurable composition of the second embodiment include alkyl esters of N,N-dialkylaminobenzoic acid such as N,N-dimethylaminobenzoic acid ethyl ester, mercapto compounds that contain a heterocycle such as 2-mercaptobenzothiazole, 2-mercaptobenzoxazole, and 2-mercaptobenzimidazole, and aliphatic polyfunctional mercapto compounds.

The chain transfer agents may be used singly, or in combination of two or more thereof.

<Thermally-Polymerizable Component>

It is also effective that the photocurable composition of the second embodiment includes a thermally-polymerizable component. An epoxy compound may be incorporated if necessary, in order to increase the strength of the coating film. Examples of the epoxy compound include a compound having two or more epoxy rings in a molecule thereof, such as a bisphenol-A epoxy compound, a cresol novolac epoxy compound, a biphenyl epoxy compound, and an alicyclic epoxy compound. Examples of the bisphenol-A epoxy compound include EPOTOHTO YD-115, YD-118T, YD-127, YD-128, YD-134, YD-8125, YD-7011R, ZX-1059, YDF-8170, and YDF-170 (manufactured by Tohto Kasei Co., Ltd.), DENACOL EX-1101, EX-1102, and EX-1103 (manufactured by Nagase Kasei Co., Ltd.), and PRAXEL GL-61, GL-62, G101, and G102 (manufactured by Daicel Chemical Industries, Ltd.), and bisphenol-F epoxy compounds and bisphenol-S epoxy compounds which are similar to the above products. Epoxy acrylates such as EBECRYL 3700, EBECRYL 3701, and EBECRYL 600 (manufactured by Daicel UCB Ltd.) are also usable. Examples of the cresol novolac epoxy compound include EPOTOHTO YDPN-638, YDPN-701, YDPN-702, YDPN-703, and YDPN-704 (manufactured by Tohto Kasei Co., Ltd.), DENACOL EM-125 (manufactured by Nagase Kasei Co., Ltd.); and examples of the biphenyl epoxy compound include 3,5,3',5'-tetramethyl-4,4'diglycidyl biphenyl. Examples of the alicyclic epoxy compound include CELLOXIDE 2021, CELLOXIDE 2081, CELLOXIDE 2083, CELLOXIDE 2085, EPOLEAD GT-301, GT-302, GT-401, GT-403, and EHPE-3150 (manufactured by Daicel Chemical Industries, Ltd.), and SUNTOHTO ST-3000, ST-4000, ST-5080, ST-5100 (manufactured by Tohto Kasei Co., Ltd.). Other examples of epoxy compounds that can be used include 1,1,2,2-tetrakis(p-glycidyloxyphenyl)ethane, tris(p-glycidyloxyphenyl)methane, triglycidyl tris(hydroxyethyl)isocyanurate, diglycidyl o-phthalate, diglycidyl terephthalate, as well as EPOTOHTO YH-434 and YH-434L, both of which are amine-type epoxy compounds, and glycidyl esters in which the skeleton of a bisphenol-A epoxy resin is modified with a dimer acid.

<Surfactant>

Various surfactants may be incorporated into the photocurable composition of the second embodiment in order to improve coating properties. Examples of surfactants that can be used include, besides the fluorosurfactants described above, various nonionic surfactants, cationic surfactants, and anionic surfactants. Among these, the fluorosurfactants described above, and nonionic surfactants are preferable.

Particularly preferable examples of nonionic surfactants include polyoxyethylene alkyl ethers, polyoxyethylene alkylaryl ethers, polyoxyethylene alkyl esters, sorbitan alkyl esters, and monoglyceride alkyl esters. Specific examples of nonionic surfactants include: polyoxyethylene alkyl ethers such as polyoxyethylene lauryl ether, polyoxyethylene stearyl ether, and polyoxyethylene oleyl ether; polyoxyethylene aryl ethers such as polyoxyethylene octylphenyl ether, polyoxyethylene polystyrylated ether, polyoxyethylene tribenzyl phenyl ether, polyoxyethylene-propylene polystyryl ether, and polyoxyethylene nonylphenyl ether; polyoxyethylene dialkyl esters such as polyoxyethylene dilaurate and polyoxyethylene distearate, sorbitan fatty acid esters, polyoxyethylene sorbitan fatty acid esters, and ethylene diamine polyoxyethylene-polyoxypropylene condensates. Commercially available products thereof available from, for example, Kao Corporation, NOF Corporation, Takemoto Oil and Fat Co., Ltd., Adeka Corporation, and Sanyo Chemical Industries, Ltd. may be suitably used. Besides these, the dispersants described above are also usable.

Besides those described above, various additives may be added to the photocurable composition. Specific examples of additives include: ultraviolet absorbers such as 2-(3-t-butyl-5-methyl-2-hydroxyphenyl)-5-chlorobenzotriazole and alkoxybenzophenone; aggregation inhibitors such as sodium polyacrylate; fillers such as glass and alumina; alkali-soluble resins such as itaconic acid copolymers, crotonic acid copolymers, maleic acid copolymers, partially esterified maleic acid copolymers, acidic cellulose derivatives, products formed from addition of an acid anhydride to a polymer having a hydroxyl group, alcohol-soluble nylons, and phenoxy resins formed from bisphenol A and epichlorohydrin.

In order to enhance alkali-solubility of uncured portions and further improve the developability of the pigment-dispersed composition, it is preferable to incorporate an organic carboxylic acid, preferably a low-molecular organic carboxylic acid having a molecular weight of 1,000 or less, into the pigment-dispersed composition. Specific examples thereof include those described above as examples of the low-molecular organic carboxylic acid having a molecular weight of 1,000 or less to be added in the first embodiment.

<Thermal Polymerization Inhibitor>

Besides those described above, a thermal polymerization inhibitor is preferably added to the photocurable composition of the second embodiment. Examples of useful thermal polymerization inhibitors include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), and 2-mercaptobenzimidazole.

Exemplary configurations of the second embodiment are described below.

<1> A pigment-dispersed composition including (A) a graft high-molecular polymer in which acrylic acid is copolymerized at a proportion of from 5% by mass to 30% by mass in the main chain thereof, (B) a pigment, and (C) an organic solvent.

<2> A pigment-dispersed composition as described in <1>, wherein the (A) graft high-molecular polymer in which acrylic acid is copolymerized at a proportion of from 5% by mass to 30% by mass in the main chain thereof further includes a heterocyclic structure at a side chain, and has a weight average molecular weight of from 1,000 to 100,000.

<3> A pigment-dispersed composition as described in <1> or <2> wherein the average primary particle diameter of the (B) pigment is in the range of from 10 to 25 nm.

<4> A pigment-dispersed composition as described in any one of <1> to <3> further including (D) a basic graft high-molecular compound.

<5> A pigment-dispersed composition as described in any one of <1> to <4> wherein the value by dividing the total mass of the high-molecular compound contained in the pigment-dispersed composition by the total mass of the (B) pigment and the (E) pigment derivative is 0.55 or smaller.

<6> A photocurable composition including the pigment-dispersed composition as described in any one of <1> to <5>, (F) a polymerizable compound and (G) a photopolymerization initiator.

<7> A photocurable composition as described in <6> wherein the concentration of the pigment is 35% by mass or higher.

<8> A color filter formed from the photocurable composition as described in <6> or <7>.

<9> A liquid crystal display device in which the color filter described in <8> is used.

<10> A solid-state image pickup device in which the color filter described in <8> is used.

Disclosures of Japanese Application Nos. 2008-068337, 2008-219785, and 2008-075656 are incorporated herein by reference in its entirety.

EXAMPLES

The invention is more specifically described below by reference to examples, but the invention is not limited to the following Examples as long as the gist of the invention is retained. Hereinafter, "part(s)" and the "%" are based on mass unless otherwise indicated.

Synthesis Example 1

Synthesis of Monomer (A-5)

160.0 g of ε-caprolactone and 18.3 g of 2-ethyl-1-hexanol were introduced into a 500 mL three-necked flask, and were dissolved by agitating while blowing nitrogen thereinto. 0.1 g of monobutyl tin oxide was added thereto, and the resultant mixture was heated to 100° C. Eight hours later, disappearance of the raw materials was confirmed by gas chromatography, and then the mixture was cooled to 80° C. 0.1 g of 2,6-di-t-butyl-4-methylphenol was added thereto, and then 22.2 g of 2-methacryloyloxyethyl isocyanate was added thereto. Five hours later, disappearance of the raw materials was confirmed by $^1$H-NMR, and, thereafter, the mixture was cooled to room temperature, as a result of which 200 g of monomer (A-5) in the solid state was obtained. It was confirmed that the product was monomer (A-5) by H NMR, IR and mass analysis.

The obtained monomer (A-5) is shown above as a preferable specific example of the monomer represented by Formula (i), (ii), or (i)-2.

In addition, monomers (A-1) to (A-4) and (A-6) to (A-23) were synthesized by methods similar to the above.

Synthesis Example 2

Synthesis of Specific Polymer (P-5)

37.5 g of the monomer (A-5), 5.0 g of the monomer M-11, 7.5 g of methacrylic acid, 1.3 g of dodecyl mercaptan, and 116.7 g of 1-methoxy-2-propanol were introduced into a nitrogen-substituted three-necked flask, and the contents of the flask were agitated with an agitator (Three One Motor, manufactured by Shinto Scientific Co. Ltd.), and heated to 75° C. while blowing nitrogen into the flask. 0.3 g of 2,2-azobis(2,4-dimethylvaleronitrile) ("V-65" manufactured by Wako Pure Chemical Industries, Ltd.) was added thereto, and the resultant mixture was agitated under heating at 75° C. for 2 hours. Two hours later, 0.3 g of V-65 was further added thereto, and the resultant mixture was agitated under heating for 3 hours, as a result of which a 30% solution of specific polymer (P-5) was obtained.

The weight average molecular weight of specific polymer (P-5) obtained was measured by gel permeation chromatography (GPC) using polystyrene as a standard substance, as a result of which the weight average molecular weight was found to be 18,000.

In addition, specific polymers (P-1) to (P-4), (P-6) to (P-30), and comparative polymers (C-1) to (C-4) were synthesized in the same manner, except that the monomers and the addition amounts thereof used in the synthesis of specific polymer (P-5) were changed to the monomers and the addition amounts shown in Table 1 and Table 2 below.

Table 1 and Table 2 below show the monomers and the addition amounts thereof used in the synthesis of specific polymers (P-1) to (P-30) and comparative polymers (C-1) to (C-4), and the weight average molecular weights and acid values of the synthesized polymers.

TABLE 1

| Specific Polymer | Composition of Polymer (Wt %) | | | Weight Average Molecular Weight | Acid Value |
|---|---|---|---|---|---|
| (P-1) | A-1 (75) | M-11 (10) | MAA (15) | 18000 | 100 |
| (P-2) | A-2 (75) | M-11 (10) | MAA (15) | 17000 | 98 |
| (P-3) | A-3 (75) | M-11 (10) | MAA (15) | 19000 | 98 |
| (P-4) | A-4 (75) | M-11 (10) | MAA (15) | 18000 | 97 |
| (P-5) | A-5 (75) | M-11 (10) | MAA (15) | 18000 | 99 |
| (P-6) | A-6 (75) | M-11 (10) | MAA (15) | 20000 | 100 |
| (P-7) | A-7 (75) | M-11 (10) | MAA (15) | 17000 | 98 |
| (P-8) | A-9 (75) | M-11 (10) | MAA (15) | 17000 | 98 |
| (P-9) | A-10 (75) | M-11 (10) | MAA (15) | 19000 | 97 |
| (P-10) | A-11 (75) | M-11 (10) | MAA (15) | 18000 | 97 |
| (P-11) | A-12 (75) | M-11 (10) | MAA (15) | 19000 | 96 |
| (P-12) | A-14 (75) | M-11 (10) | MAA (15) | 19000 | 97 |
| (P-13) | A-16 (75) | M-11 (10) | MAA (15) | 19000 | 98 |
| (P-14) | A-17 (75) | M-11 (10) | MAA (15) | 20000 | 96 |
| (P-15) | A-18 (75) | M-11 (10) | MAA (15) | 20000 | 96 |
| (P-16) | A-19 (75) | M-11 (10) | MAA (15) | 19000 | 98 |
| (P-17) | A-20 (75) | M-11 (10) | MAA (15) | 19000 | 100 |
| (P-18) | A-21 (75) | M-11 (10) | MAA (15) | 18000 | 98 |
| (P-19) | A-5 (75) | BzMA (10) | MAA (15) | 18000 | 97 |
| (P-20) | A-5 (75) | St (10) | MAA (15) | 19000 | 96 |

MAA representing methyl acrylate; BzMA representing benzyl methacrylate; and St representing styrene

TABLE 2

| Specific Polymer, Comparative Polymer | Composition of Polymer (Wt %) | | | | Weight Average Molecular Weight | Acid Value |
|---|---|---|---|---|---|---|
| (P-21) | A-5 (75) | M-11 (10) | MAA (5) | MMA (10) | 18000 | 31 |
| (P-22) | A-5 (50) | M-11 (10) | MAA (40) | — | 18000 | 258 |
| (P-23) | A-5 (20) | M-11 (10) | MAA (15) | MMA (55) | 20000 | 96 |
| (P-24) | A-5 (75) | M-11 (10) | MAA (15) | — | 45000 | 98 |
| (P-25) | A-5 (75) | M-11 (10) | MAA (15) | — | 5000 | 97 |
| (P-26) | A-5 (75) | M-1 (10) | MAA (15) | — | 20000 | 100 |
| (P-27) | A-5 (75) | M-6 (10) | MAA (15) | — | 20000 | 96 |
| (P-28) | A-5 (75) | M-14 (10) | MAA (15) | — | 19000 | 98 |
| (P-29) | A-5 (75) | M-31 (10) | MAA (15) | — | 18000 | 96 |
| (P-30) | A-5 (75) | M-33 (10) | MAA (15) | — | 18000 | 98 |
| (C-1) | BzMA (75) | M-11 (10) | MAA (15) | — | 18000 | 97 |
| (C-2) | B-1 (75) | M-11 (10) | MAA (15) | — | 19000 | 96 |
| (C-3) | B-2 (75) | M-11 (10) | MAA (15) | — | 20000 | 98 |
| (C-4) | B-3 (75) | M-11 (10) | MAA (15) | — | 18000 | 97 |

MAA representing methyl acrylate, BzMA representing benzyl methacrylate, and MMA representing methyl methacrylate Monomers M-11, M-1, M-6, M-14, M-31, and M-33 in Table 1 and Table 2 are shown above as preferable specific examples of the monomer represented by Formula (1), the maleimide, and the maleimide derivative.

Monomers B-1 to B-3 in Table 2 are those shown below.
B1: Polymethyl methacrylate of which terminal is methacryloylated (number average molecular weight: 6000)

B-2:

$$\text{CH}_2=\text{C}(\text{CH}_3)-\text{C}(=O)-O-C_2H_4-(O-C(=O)-C_5H_{10}-O)_{10}-H$$

B-3:

$$\text{CH}_2=\text{C}(\text{CH}_3)-\text{C}(=O)-(O-C_5H_{10}-C(=O))_{10}-OH$$

Examples 1 to 10 and Comparative Examples 1 and 2

Preparation of Pigment-Dispersed Composition

The components of the composition (1) described below were mixed, and further mixed by agitation for 3 hours at a revolution number of 3,000 r.p.m. using a homogenizer, thereby preparing a pigment-containing mixed solution.

[Composition (1)]

| | |
|---|---|
| C. I. Pigment Red 254 (average primary particle diameter: 26 nm): | 90 parts |
| Pigment derivative A having the structure shown below: | 10 parts |
| Specific polymer or comparative polymer indicated in Table 3 below (30% by mass solution): | 150 parts |
| 1-Methoxy-2-propyl acetate | 600 parts |

Pigment Derivative A

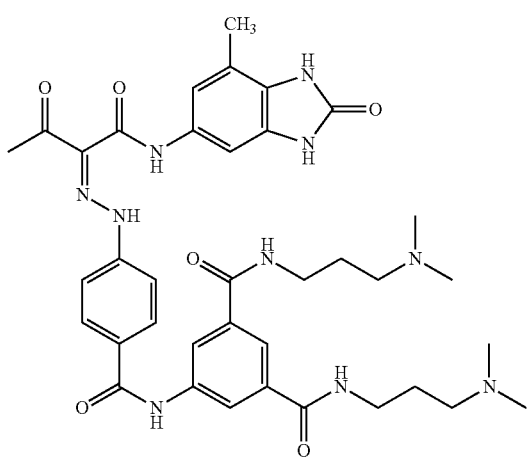

Subsequently, the mixed solution obtained above was subjected to dispersing treatment for 6 hours using a beads dispersing machine (DISPERMAT, manufactured by GETZMANN) in which zirconia beads having a diameter of 0.2 mm were used. Thereafter, the mixed solution was further subjected to dispersing treatment at a pressure of 2,000 kg/cm³ and a flow rate of 500 g/min using a high-pressure dispersing machine equipped with a pressure-reducing mechanism (NANO-3000-10, manufactured by Japan B.E.E Co. Ltd.); this dispersing treatment was repeated ten times, as a result of which a pigment-dispersed composition was obtained.

<Evaluation of Pigment-Dispersed Composition>

Evaluations (1) to (3) described below were conducted on the pigment-dispersed composition obtained. The results are shown in Table 3.

(1) Measurement and Evaluation of Viscosity

The pigment-dispersed composition obtained was measured with respect to a viscosity $_\eta 1$ of the pigment-dispersed composition immediately after dispersing, and a viscosity $_\eta 2$ of the pigment-dispersed composition when the pigment-dispersed composition was left to stand at room temperature for one week since dispersing, using an E-type viscometer, and the degree of viscosity increase was evaluated. Here, a low viscosity indicates that viscosity increase due to the dispersant is suppressed, and dispersibility and dispersion stability of the pigment are favorable.

(2) Measurement and Evaluation of Contrast

The pigment-dispersed composition obtained was coated on a glass substrate such that the coating film thickness after drying became 1 μm, whereby a sample was prepared. This sample was placed between two polarizing plates, and the amount of transmitted light was measured when the polarizing axes were parallel to each other and when the polarizing axes were orthogonal to each other. The ratio therebetween was regarded as contrast (The evaluation method refers to "1990, 7$^{th}$ Color Optics Conference, 512-Color displaying 10.4"-sized color filter for TFT-LCD" by UEKI, KOSEKI, FUKUNAGA, YAMANAKA"). A high contrast indicates that the pigment is uniformly dispersed in the highly-fined state, and thus the transmittance, i.e., a coloring power, is high.

(3) Evaluation of Precipitation Properties

The pigment-dispersed composition obtained was coated on a 100 mm×100 mm glass substrate (tradename: 1737, manufactured by Corning) such that film thickness after drying would be 2.0 μm, and was dried in an oven at 90° C. for 60 seconds.

Thereafter, the coating film was subjected to heat treatment (post-baking) in an oven at 230° C. for 30 minutes, and the presence or the absence of precipitation (pigment) on the colored coating film was confirmed with an optical microscope (manufactured by Olympus Corporation) at magnification of 100-fold. The same post-baking treatment was repeated, and the presence or the absence of precipitation on the colored coating film was confirmed every time.

The evaluation ranks are as follows. A rank having a greater number indicates decreased tendency to precipitate and more favorable transparency of the colored coating film.

—Evaluation Ranks—
4: Precipitation occurred at the fourth post-baking
3: Precipitation occurred at the third post-baking
2: Precipitation occurred at the second post-baking
1: Precipitation occurred at the first post-baking

TABLE 3

| | Specific Polymer or Comparative Polymer | Initial Viscosity (mPa·s) | Viscosity over time (mPa·s) | Contrast | Precipitation properties |
|---|---|---|---|---|---|
| Example 1 | (P-1) | 14 | 19 | 2200 | 3 |
| Example 2 | (P-2) | 12 | 15 | 2400 | 4 |
| Example 3 | (P-3) | 12 | 15 | 2300 | 3 |
| Example 4 | (P-4) | 11 | 13 | 2400 | 3 |
| Example 5 | (P-5) | 10 | 10 | 2600 | 4 |
| Example 6 | (P-6) | 10 | 10 | 2600 | 4 |
| Example 7 | (P-7) | 11 | 13 | 2400 | 4 |
| Example 8 | (P-8) | 15 | 19 | 2100 | 3 |
| Example 9 | (P-9) | 15 | 19 | 2100 | 3 |
| Example 10 | (P-10) | 18 | 20 | 2000 | 3 |
| Comparative Example 1 | (C-1) | 50 | 80 | 1200 | 1 |
| Comparative Example 2 | (C-3) | 25 | 35 | 1500 | 1 |

From the results shown in Table 3, it is understood that the pigment-dispersed composition of Examples, which contained the specific polymer, offered high contrast, suppressed precipitation of pigment when post-baked, and a small increase in viscosity over time, as compared with Comparative Examples.

Examples 11 to 19 and Comparative Examples 3 to 5

Preparation of Pigment-Dispersed Composition

The components of the composition (2) described below were mixed, and further mixed by agitation for 3 hours at a revolution number of 3,000 r.p.m. using a homogenizer, thereby preparing a pigment-containing mixed solution.

[Composition (2)]

| | |
|---|---|
| C. I. Pigment Green 36 (average primary particle diameter: 16 nm): | 100 parts |
| Specific polymer or comparative polymer indicated in Table 4 below (30% by mass solution): | 120 parts |
| 1-Methoxy-2-propyl acetate | 750 parts |

Subsequently, the mixed solution obtained above was subjected to dispersing treatment for 6 hours with a beads dispersing machine (DISPERMAT, manufactured by GETZMANN) in which zirconia beads having a diameter of 0.3 mm were used. Thereafter, the mixed solution was further subjected to dispersing treatment at a pressure of 2,000 kg/cm$^3$ and a flow rate of 500 g/min using a high-pressure dispersing machine equipped with a pressure-reducing mechanism (NANO-3000-10, manufactured by Japan B.E.E Co. Ltd.). This dispersing treatment was repeated ten times, as a result of which a pigment-dispersed composition was obtained.

<Evaluation of Pigment-Dispersed Composition>

The obtained pigment-dispersed composition was evaluated with respect to the above items (1) to (3) in the same manner as Example 1. Results are shown in Table 4.

TABLE 4

| | Specific Polymer or Comparative Polymer | Initial Viscosity (mPa·s) | Viscosity over time (mPa·s) | Contrast | Precipitation properties |
|---|---|---|---|---|---|
| Example 11 | (P-5) | 28 | 30 | 8200 | 4 |
| Example 12 | (P-11) | 35 | 39 | 7800 | 3 |
| Example 13 | (P-12) | 35 | 40 | 7700 | 3 |
| Example 14 | (P-13) | 35 | 40 | 7700 | 4 |
| Example 15 | (P-14) | 32 | 35 | 7800 | 4 |
| Example 16 | (P-15) | 30 | 32 | 8100 | 4 |
| Example 17 | (P-16) | 35 | 40 | 7900 | 3 |
| Example 18 | (P-17) | 35 | 39 | 7800 | 3 |
| Example 19 | (P-18) | 36 | 39 | 7800 | 3 |
| Comparative Example 3 | (C-1) | 100 | 520 | 3000 | 1 |
| Comparative Example 4 | (C-3) | 60 | 260 | 4200 | 2 |
| Comparative Example 5 | (C-4) | 80 | 320 | 4000 | 2 |

From the results shown in Table 4, it is understood that the pigment-dispersed compositions of Examples, which contained the specific polymers, offered high contrast, suppressed precipitation of pigment when post-baked, and a small increase in a viscosity over time, as compared with Comparative Examples.

Examples 20 to 29 and Comparative Examples 6 to 8

Preparation of Pigment-Dispersed Composition

The components of the composition (3) described below were mixed, and further mixed by agitation for 3 hours at a revolution number of 3,000 r.p.m. using a homogenizer, thereby preparing a pigment-containing mixed solution.

[Composition (3)]

| | |
|---|---|
| C. I. Pigment Red 254 (average primary particle diameter: 26 nm): | 110 parts |
| Specific polymer or comparative polymer indicated in Table 5 below (30% by mass solution): | 260 parts |
| 1-Methoxy-2-propyl acetate: | 750 parts |

Subsequently, the mixed solution obtained above was subjected to dispersing treatment for 6 hours with a beads dispersing machine (DISPERMAT, manufactured by GETZMANN) in which zirconia beads having a diameter of 0.3 mm were used. Thereafter, the mixed solution was further subjected to dispersing treatment at a pressure of 2,000 kg/cm$^3$ and a flow rate of 500 g/min using a high-pressure dispersing machine equipped with a pressure-reducing mechanism (NANO-3000-10, manufactured by Japan B.E.E Co. Ltd.). This dispersing treatment was repeated ten times, as a result of which a pigment-dispersed composition was obtained.

<Preparation of Colored Photosensitive Composition>

Using the pigment-dispersed composition thus obtained, the following colored photosensitive composition was prepared.

| | |
|---|---|
| Pigment-dispersed composition: | 2000 parts |
| Dipentaerythritol hexaacrylate (photopolymerizable compound): | 100 parts |
| 4-[o-bromo-p-N,N-di(ethoxycarbonyl)aminopheny1]-2,6-di(trichloromethyl)-S-triazine (photopolymerization initiator): | 30 parts |
| Propyleneglycol monomethyl ether acetate solution (solids content: 30%) of benzyl methacrylate/methacrylic acid (=75/25 [mass ratio]) copolymer (weight average molecular weight: 12,000) (alkali-soluble resin): | 400 parts |
| 1-Methoxy-2-propyl acetate (solvent): | 390 parts |

<Preparation of Color Filter Using Colored Photosensitive Composition>

The colored photosensitive composition (color resist liquid) prepared was coated on a 100 mm×100 mm glass substrate (1737, manufactured by Corning) so that x value as an index of color concentration became 0.650, and this was dried in an oven at 90° C. for 60 seconds (pre-baking). Thereafter, a whole surface of the coating film was exposed to light at 200 mJ/cm$^2$ (illuminance: 20 mW/cm$^2$), and the coating film after light exposure was covered with a 1% aqueous solution of an alkali developer liquid (CDK-1, manufactured by FUJIFILM Electronic Materials Co., Ltd.), and allowed to stand for 60 seconds. After the standing, pure water was sprayed by showering, thereby washing out the developer liquid. Then, the coating film which had been subjected to light exposure and development as described above was subjected to heating treatment in an oven at 220° C. for 1 hour (post-baking), as a result of which a colored pattern (colored region) for a color filter was formed on the glass substrate. In this way, a colored filter substrate (color filter) was produced.

<Evaluation of Colored Photosensitive Composition and Color Filter>

The colored photosensitive composition and colored filter substrate (color filter) produced were evaluated as described below. The results are shown in Table 5 below.

(1) Contrast

A polarizing plate was placed on the colored pattern of the colored filter, and the colored pattern was sandwiched between the polarizing plate and another polarizing plate. The luminance when the polarizing plates were parallel to each other, and the luminance when the polarizing plates were orthogonal to each other were measured using a BM-5 manufactured by TOPCON CORPORATION. The value obtained by dividing the luminance when the polarizing plates were parallel to each other by the luminance when the polarizing plates were orthogonal to each other (=the luminance when the polarizing plates were parallel to each other/the luminance when the polarizing plates were orthogonal to each other) was used as an index for evaluating contrast. A higher value indicates a higher contrast.

(2) Evaluation of Solubility in Alkali Developer Liquid and Matter Suspended in Alkali Developer Liquid 100 g of a 10% aqueous solution of an alkali developer liquid (tradename: CDK-1, manufactured by FUJIFILM Electronic Materials Co., Ltd.) was weighed, and put in a 150 ml beaker.

The colored photosensitive composition was coated on a 100 mm×100 mm glass substrate (tradename: 1737, manufactured by Corning) in a film thickness of 2.5 µm, and dried in an oven at 90° C. for 60 seconds (pre-baked), and the glass was cut into 25 mm×100 nun pieces, and two pieces thereof were stacked with the coated surfaces of each piece facing outside, whereby a sample for measurement was prepared.

Vertical motions of immersing the sample for measurement in the developer liquid prepared above and pulling out the sample from the developer liquid were repeated twenty times. The solubility of the coating film after pre-baking and the presence or absence of a matter suspended in the developer liquid were evaluated visually.

The immersion time in the developer liquid in each cycle was from 1 second to 2 seconds.

The evaluation ranks are as follows. Here, a rank having a greater number indicates more favorable developability of the coating film.

—Evaluation Ranks—

5: The coating film dissolved by from 1 to 10 cycles of the vertical motions, and a matter suspended in the alkali developer liquid was not found.

4: The coating film dissolved by from 11 to 20 cycles of the vertical motions, and a matter suspended in the alkali developer liquid was not found 3: The coating film dissolved by from 1 to 10 cycles of the vertical motions, but a matter suspended in the alkali developer liquid was found.

2: The coating film dissolved by from 11 to 20 cycles of the vertical motions, but a matter suspended in the alkali developer liquid was found.

1: The coating film did not dissolve even by 20 cycles of the vertical motions (3) Evaluation of Precipitation Properties The colored photosensitive composition was coated on a 100 mm×100 mm glass substrate (tradename: 1737, manufactured by Coning) such that film thickness after drying would be 2.0 µm, and this was dried (pre-baked) in an oven at 90° C. for 60 seconds. Thereafter, light exposure at 100 mJ/cm$^2$ (illuminance: 20 mW/cm$^2$) was performed using a mask having a line width of 20 µm, and development was performed at 25° C. using a 1% aqueous solution of an alkali developer liquid (CDK-1, manufactured by FUJIFILM Electronic Materials Co., Ltd.).

As described above, the coating film which had been subjected to light exposure and development treatment was subjected to heating treatment (post-baking) in an oven at 230° C. for 30 minutes, and the presence or the absence of precipitation (pigment) on the colored cured film was confirmed with an optical microscope (manufactured by Olympus Corporation). Thereafter, the same post-baking treatment was repeated three times, and the presence or the absence of precipitation on the colored cured film was confirmed each time.

The evaluation ranks are as follows. A rank having a greater number indicates decreased tendency to precipitate and more favorable transparency of the colored cured film.

—Evaluation Ranks—

4: Precipitation occurred at the fourth post-baking
3: Precipitation occurred at the third post-baking
2: Precipitation occurred at the second post-baking
1: Precipitation occurred at the first post-baking

TABLE 5

|  | Specific Polymer or Comparative Polymer | Contrast | Solubility in Alkali Developer Liquid | Precipitation properties |
|---|---|---|---|---|
| Example 20 | (P-5) | 2600 | 5 | 4 |
| Example 21 | (P-19) | 2000 | 5 | 4 |
| Example 22 | (P-20) | 2000 | 5 | 4 |
| Example 23 | (P-21) | 2400 | 4 | 3 |
| Example 24 | (P-22) | 2400 | 5 | 3 |
| Example 25 | (P-23) | 2300 | 4 | 4 |
| Example 26 | (P-24) | 2400 | 4 | 4 |
| Example 27 | (P-25) | 2300 | 5 | 3 |
| Example 28 | (P-26) | 2500 | 5 | 4 |
| Example 29 | (P-27) | 2600 | 5 | 4 |
| Comparative Example 6 | (C-1) | 1000 | 4 | 1 |
| Comparative Example 7 | (C-2) | 1800 | 2 | 2 |
| Comparative Example 8 | (C-3) | 1500 | 3 | 2 |

From the results shown in Table 5, it is understood that the colored photosensitive compositions of Examples offer favorable solubility of the coating film in an alkali developer liquid, and suppressed precipitation of the pigment after post-baking, as compared with Comparative Examples. It is further understood that the color filters of Examples have higher contrast than Comparative Examples.

Examples 30 to 36 and Comparative Examples 9 and 10

Preparation of Pigment-Dispersed Composition

The components of the composition (4) described below were mixed, and further mixed by agitation for 3 hours at a revolution number of 3,000 r.p.m. using a homogenizer, thereby preparing a pigment-containing mixed solution.

[Composition (4)]

| | |
|---|---|
| C.I. Pigment Red 254 (average primary particle diameter: 26 nm): | 120 parts |
| C.I. Pigment Red 177 (average primary particle diameter: 22 nm): | 20 parts |
| Specific polymer or comparative polymer indicated in Table 6 below (30% by mass solution): | 250 parts |
| Pigment derivative B having the structure shown below: | 25 parts |
| 1-Methoxy-2-propyl acetate: | 750 parts |

-continued

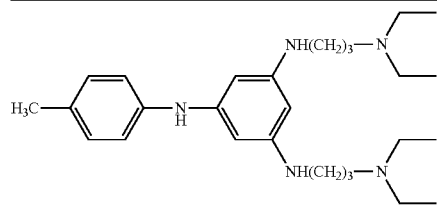

Pigment derivative B

Subsequently, the mixed solution obtained above was subjected to dispersing treatment for 6 hours with a beads dispersing machine (DISPERMAT, manufactured by GETZMANN) using 0.2 mm φ zirconia beads, and then further subjected to dispersing treatment at a pressure of 2,000 kg/cm³ and a flow rate of 500 g/min using a high-pressure dispersing machine equipped with a pressure-reducing mechanism (NANO-3000-10, manufactured by Japan B.E.E Co. Ltd.). This dispersing treatment was repeated ten times, as a result of which a pigment-dispersed composition was obtained.

<Preparation of Colored Photosensitive Composition>

Using the obtained pigment-dispersed composition, the following colored photosensitive composition was prepared.

| | |
|---|---|
| Pigment-dispersed composition: | 2100 parts |
| Dipentaerythritol hexaacrylate (photopolymerizable compound): | 80 parts |
| 4-[o-bromo-p-N,N-di(ethoxycarbonyl)aminophenyl]-2,6-di(trichloromethyl)-S-triazine (photopolymerization initiator): | 50 parts |
| Propyleneglycol monomethyl ether acetate solution (solids content: 30%) of benzyl methacrylate/methacrylic acid (=75/35 [mass ratio]) copolymer (weight average molecular weight: 10,000) (alkali-soluble resin): | 300 parts |
| 1-Methoxy-2-propyl acetate (solvent): | 390 parts |

<Preparation of Color Filter Using Colored Photosensitive Composition>

The colored photosensitive composition (color resist liquid) obtained was coated on a 100 mm×100 mm glass substrate (1737, manufactured by Corning) so that x value as an index of color concentration became 0.650, and this was dried in an oven at 90° C. for 60 seconds (pre-baking). Thereafter, a whole surface of the coating film was exposed to light at 200 mJ/cm² (illuminance: 20 mW/cm²), and the coating film after light exposure was covered with a 1% aqueous solution of an alkali developer liquid (CDK-1, manufactured by FUJIFILM Electronic Materials Co., Ltd.), and allowed to stand for 60 seconds. After the standing, pure water was sprayed by showering to wash out the developer liquid. Then, the coating film which had been subjected to light exposure and development as described above was subjected to heating treatment in an oven at 220° C. for 1 hour (post-baking), as a result of which a colored pattern (colored region) for a color filter was formed on the glass substrate. In this way, a colored filter substrate (color filter) was produced.

<Evaluation of Colored Photosensitive Composition and Color Filter>

The colored photosensitive composition and colored filter substrate (color filter) produced were evaluated with respect to items (1) contrast and (2) solubility in an alkali developer liquid and matter suspended in alkali developer liquid in the same manner as in Example 20. In addition, evaluation with respect to item (4) voltage holding ratio was also conducted as follows. The results are shown in Table 6 below.

(4) Voltage Holding Ratio

The colored photosensitive composition obtained by the above method was coated on a glass substrate equipped with an ITO electrode (tradename: 1737, manufactured by Corning) such that film thickness after drying would be 2.0 μm, and this was dried in an oven at 90° C. for 60 seconds (pre-baking). Thereafter, the coating film was exposed to light at 100 mJ/cm² (illuminance: 20 mW/cm²) without using a mask, and developed at 25° C. using a 1% aqueous solution of an alkali developer liquid (CDK-1, manufactured by FUJIFILM Electronic Materials Co., Ltd.), and this coating film was subjected to heating treatment in an oven at 230° C. for 30 minutes (post-baking), as a result of which a glass substrate on which a colored cured film was formed was obtained.

Then, the resultant glass substrate on which a colored cured film had been formed and a substrate having only an ITO electrode disposed thereon in a predetermined shape, were adhered to each other using a sealing agent that was mixed with 5 μm glass beads, and a liquid crystal (MJ971189, manufactured by Merck) was injected, thereby producing a liquid crystal cell.

Then, the liquid crystal cell was left in a constant-temperature bath at 70° C. for 48 hours, and the voltage holding ratio of the liquid crystal cell was measured with a liquid crystal voltage holding ratio measurement system (VHR-1A-type (tradename), manufactured by Toyo corporation).

The voltage holding ratio is a value of (potential difference of a liquid crystal cell after 16.7 msec)/(voltage applied at 0 msec).

The conditions for measurement of the voltage holding ratio are as follows.

—Measurement Conditions—
Distance between electrodes: 5 μm,
Pulse amplitude of applied voltage: 5 V
Pulse frequency of applied voltage: 60 Hz
Pulse width of applied voltage: 16.67 msec The evaluation ranks are as follows. Here, a rank having a greater number is considered to indicate a higher voltage holding ratio and more improved electronic properties.

—Evaluation Ranks—
5: 90% or higher
4: From 85% to less than 90%
3: From 80% to less than 85%
2: From 75% to less than 80%
1: Less than 75%

TABLE 6

|  | Specific Polymer or Comparative Polymer | Contrast | Solubility in Alkali Developer Liquid | Voltage Holding Ratio |
|---|---|---|---|---|
| Example 30 | (P-1) | 2900 | 4 | 4 |
| Example 31 | (P-2) | 2900 | 4 | 5 |
| Example 32 | (P-5) | 3000 | 5 | 5 |
| Example 33 | (P-11) | 2700 | 4 | 4 |
| Example 34 | (P-20) | 2500 | 5 | 4 |
| Example 35 | (P-29) | 2800 | 5 | 5 |
| Example 36 | (P-30) | 2800 | 5 | 5 |
| Comparative Example 9 | (C-3) | 1800 | 3 | 1 |
| Comparative Example 10 | (C-4) | 1600 | 3 | 1 |

From the results shown in Table 6, it is understood that the colored photosensitive compositions of Examples offer favorable solubility of the coating film in an alkali developer liquid, and high voltage holding ratio of the colored cured film after post-baking, as compared with Comparative Examples. It is further understood that the color filters of Examples have higher contrast than Comparative Examples.

Examples 37 to 42 and Comparative Examples 11 to 13

Preparation of Pigment-Dispersed Composition

The components of the composition (5) described below were mixed, and further mixed by agitation for 3 hours at a revolution number of 3,000 r.p.m. using a homogenizer, thereby preparing a pigment-containing mixed solution.

[Composition (5)]

| | |
|---|---|
| C. I. Pigment Blue 15:6 (average primary particle diameter: 20 nm): | 80 parts |
| C. I. Pigment Violet 23 (average primary particle diameter: 26 nm): | 20 parts |
| Pigment derivative B having the above structure: | 15 parts |
| Specific polymer or comparative polymer indicated in Table 7 below (30% by mass solution): | 260 parts |
| 1-Methoxy-2-propyl acetate: | 750 parts |

Subsequently, the mixed solution obtained above was subjected to dispersing treatment for 6 hours with a beads dispersing machine (DISPERMAT, manufactured by GETZMANN) in which zirconia beads having a diameter of 0.3 mm were used. Thereafter, the mixed solution was further subjected to dispersing treatment at a pressure of 2,000 kg/cm³ and a flow rate of 500 g/min using a high-pressure dispersing machine equipped with a pressure-reducing mechanism (NANO-3000-10, manufactured by Japan B.E.E Co. Ltd.). This dispersing treatment was repeated ten times, as a result of which a pigment-dispersed composition was obtained.

<Preparation of Colored Photosensitive Composition>

Using the obtained pigment-dispersed composition, the following colored photosensitive composition was prepared.

| | |
|---|---|
| Pigment-dispersed composition: | 2000 parts |
| Dipentaerythritol hexaacrylate (photopolymerizable compound): | 100 parts |
| 4-[o-bromo-p-N,N-di(ethoxycarbonyl)aminophenyl]-2,6-di(trichloromethyl)-S-triazine (photopolymerization initiator): | 30 parts |
| Propyleneglycol monomethyl ether acetate solution (solids content: 30%) of benzyl methacrylate/methacrylic acid (=75/25 [mass ratio]) copolymer (weight average molecular weight: 12,000) (alkali-soluble resin): | 400 parts |
| 1-Methoxy-2-propyl acetate (solvent): | 390 parts |

<Preparation of Color Filter Using Colored Photosensitive Composition>

The colored photosensitive composition (color resist liquid) obtained was coated on a 100 mm×100 mm glass substrate (1737, manufactured by Corning) such that x value as an index of color concentration became 0.650, and this was dried in an oven at 90° C. for 60 seconds (pre-baking). Thereafter, a whole surface of the coating film was exposed to light at 200 mJ/cm² (illuminance: 20 mW/cm²), and the coating film after light exposure was covered with a 1% aqueous solution of an alkali developer liquid (CDK-1, manufactured by FUJIFILM Electronic Materials Co., Ltd.), and allowed to stand for 60 seconds. After the standing, pure water was sprayed by showering to wash out the developer liquid. Then, the coating film which had been subjected to light exposure and development as described above was subjected to heating treatment in an oven at 220° C. for 1 hour (post-baking), as a result of which a colored pattern (colored region) for a color filter was formed on the glass substrate and a colored filter substrate (color filter) was produced.

<Evaluation of Colored Photosensitive Composition and Color Filter>

The colored filter substrate (color filter) produced was evaluated with respect to item (1) contrast in the same manner as in Example 20. In addition, evaluation of item (5) coating unevenness of the colored photosensitive composition produced was also conducted in the following manner. The results are shown in Table 7 below.

(5) Evaluation of Slit Coating (Coating Unevenness)

The coating liquid of the colored photosensitive composition was coated on a rectangular glass substrate having a width of 230 mm, a length of 300 mm, and a thickness of 0.7 mm at a coating speed of 50 mm/second, using a slit coating device having a slit head having a slit opening of 50 μm and an effective coating width of 20 mm, wherein the gap between the slit and the substrate was adjusted such that the coating film thickness after drying would be 2 μm. As a result, a coating surface having a coating width of 21 mm and a length of 260 mm was obtained. After coating, pre-baking was performed using a hot plate at a temperature of 90° C. for 60 seconds, and then the number of streaks as unevenness on the coating surface was counted by visual observation.

The evaluation ranks are as follows.

A: Streaks as unevenness on the coating surface was observed
B: From one to five streaks as unevenness on the coating surface were observed
C: Six or more streaks as unevenness on the coating surface were observed

TABLE 7

| | Specific Polymer or Comparative Polymer | Contrast | Coating Unevenness |
|---|---|---|---|
| Example 37 | (P-2) | 3000 | A |
| Example 38 | (P-5) | 3100 | A |
| Example 39 | (P-14) | 2800 | B |
| Example 40 | (P-16) | 2700 | B |
| Example 41 | (P-27) | 3000 | A |
| Example 42 | (P-28) | 3000 | A |

TABLE 7-continued

| | Specific Polymer or Comparative Polymer | Contrast | Coating Unevenness |
|---|---|---|---|
| Comparative Example 11 | (C-1) | 2500 | C |
| Comparative Example 12 | (C-2) | 1900 | C |
| Comparative Example 13 | (C-3) | 1700 | C |

From the results shown in Table 7, it is understood that the colored photosensitive compositions of Examples are capable of forming an improved coating surface that does not have coating unevenness. It is also understood that the color filters of Examples have high contrast, as compared with Comparative Examples.

Examples 43 to 47 and Comparative Examples 14 to 16

Preparation of Pigment-Dispersed Composition

The components of the composition (6) described below were mixed, and further mixed by agitation for 3 hours at a revolution number of 3,000 r.p.m. using a homogenizer, thereby preparing a pigment-containing mixed solution.

[Composition (6)]

| | |
|---|---|
| C. I. Pigment Green 36 (average primary particle diameter: 16 nm): | 55 parts |
| C. I. Pigment Yellow 150 (average primary particle diameter: 26 nm): | 45 parts |
| Specific polymer or comparative polymer indicated in Table 8 below (30% by mass solution): | 280 parts |
| 1-Methoxy-2-propyl acetate: | 750 parts |

Subsequently, the mixed solution obtained above was subjected to dispersing treatment for 6 hours with a beads dispersing machine (DISPERMAT, manufactured by GETZMANN) in which zirconia beads having a diameter of 0.3 mm were used. Thereafter, the mixed solution was further subjected to dispersing treatment at a pressure of 2,000 kg/cm$^3$ and a flow rate of 500 g/min using a high-pressure dispersing machine equipped with a pressure-reducing mechanism (NANO-3000-10, manufactured by Japan B.E.E Co. Ltd.). This dispersing treatment was repeated ten times, as a result of which a pigment-dispersed composition was obtained.

<Preparation of Colored Photosensitive Composition>

Using the pigment-dispersed composition thus obtained, the following colored photosensitive composition was prepared.

| | |
|---|---|
| Pigment-dispersed composition: | 2000 parts |
| Dipentaerythritol hexaacrylate (photopolymerizable compound): | 100 parts |
| 4-[o-bromo-p-N,N-di(ethoxycarbonyl)aminophenyl]-2,6-di(trichloromethyl)-S-triazine (photopolymerization initiator): | 30 parts |
| Propyleneglycol monomethyl ether acetate solution (solids content: 30%) of benzyl methacrylate/methacrylic acid (=75/25 [mass ratio]) copolymer (weight average molecular weight: 12,000) (alkali-soluble resin): | 400 parts |
| 1-Methoxy-2-propyl acetate (solvent): | 390 parts |

<Preparation of Color Filter Using Colored Photosensitive Composition>

The colored photosensitive composition (color resist liquid) obtained was coated on a 100 mm×100 mm glass substrate (1737, manufactured by Corning) such that x value as an index of color concentration became 0.650, and this was dried in an oven at 90° C. for 60 seconds (pre-baking). Thereafter, a whole surface of the coating film was exposed to light at 200 mJ/cm$^2$ (illuminance: 20 mW/cm$^2$), and the coating film after light exposure was covered with a 1% aqueous solution of an alkali developer liquid (CDK-1, manufactured by FUJIFILM Electronic Materials Co., Ltd.), and allowed to stand for 60 seconds. After the standing, pure water was sprayed by showering to wash out the developer liquid. Then, the coating film which had been subjected to light exposure and development as described above was subjected to heating treatment in an oven at 220° C. for 1 hour (post-baking), as a result of which a colored pattern (colored region) for a color filter was formed on the glass substrate. In this way, a colored filter substrate (color filter) was produced.

<Evaluation of Colored Photosensitive Composition and Color Filter>

The colored photosensitive composition and colored filter substrate (color filter) produced were evaluated with respect to items (1) contrast, and (2) solubility in an alkali developer liquid and matter suspended in alkali developer liquid in the same manner as in Example 20. The colored photosensitive composition produced was also evaluated with respect to item (5) coating unevenness in the same manner as in Example 37. The results are shown in Table 8 below.

TABLE 8

|  | Specific Polymer or Comparative Polymer | Contrast | Solubility in Alkali Developer Liquid | Coating Unevenness |
|---|---|---|---|---|
| Example 43 | (P-1) | 8100 | 4 | A |
| Example 44 | (P-6) | 8200 | 5 | A |
| Example 45 | (P-13) | 7700 | 4 | B |
| Example 46 | (P-12) | 7900 | 4 | B |
| Example 47 | (P-27) | 8200 | 5 | A |
| Comparative Example 14 | (C-1) | 6000 | 3 | C |
| Comparative Example 15 | (C-2) | 5100 | 3 | C |
| Comparative Example 16 | (C-4) | 5000 | 3 | C |

From the results shown in Table 8, it is understood that the colored photosensitive compositions of Examples are capable of forming an improved coating surface that does not have coating unevenness, and offer favorable solubility of the coating film in an alkaline developer liquid, as compared with Comparative Examples. In addition, it is understood that the color filters of Examples have high contrast, as compared with Comparative Examples.

Examples 48 to 50 and Comparative Examples 17 and 18

Fining of Pigment 50 g of C. I. Pigment Red 254, 400 g of sodium chloride, 40 g of a solution (30% by mass solution) of the specific polymer or comparative polymer indicated in Table 9 below, and 100 g of diethyleneglycol were added into a stainless 1 gallon kneader (manufactured by INOUE MFG., INC.), and the materials were kneaded for 6 hours. Then, the resultant mixture was poured into about 3 liter of water. The mixture was agitated with a high speed mixer for about 1 hour, and then was filtered and washed with water so as to remove the sodium chloride and the solvent, and was dried, as a result of which a processed pigment covered with the specific polymer or comparative polymer was obtained.

The average primary particle diameter of the processed pigment obtained was 24 nm.

The components of the composition (7) described below were mixed, and further mixed by agitation for 3 hours at a revolution number of 3,000 r.p.m. using a homogenizer, thereby preparing a pigment-containing mixed solution.

[Composition (7)]

| | |
|---|---|
| The above processed pigment: | 100 parts |
| SOLSPERSE 24000 manufactured by The Lubrizol Corporation (30% by mass solution): | 150 parts |
| 1-Methoxy-2-propyl acetate: | 600 parts |

Subsequently, the mixed solution obtained above was subjected to dispersing treatment for 6 hours with a beads dispersing machine (DISPERMAT, manufactured by GETZ-MANN) using 0.2 mm φ zirconia beads, and then further subjected to dispersing treatment at a pressure of 2,000 kg/cm$^3$ and a flow rate of 500 g/min using a high-pressure dispersing machine equipped with a pressure-reducing mechanism (NANO-3000-10, manufactured by Japan B.E.E Co. Ltd.). This dispersing treatment was repeated ten times, as a result of which a pigment-dispersed composition was obtained.

<Evaluation of Pigment-Dispersed Composition>

The obtained pigment-dispersed composition was evaluated with respect to items (1) viscosity, (2) contrast, and (3) precipitation properties in the same manner as Example 1. The results are shown in Table 9.

TABLE 9

|  | Specific Polymer or Comparative Polymer | Initial Viscosity (mPa·s) | Viscosity over time (mPa·s) | Contrast | Precipitation properties |
|---|---|---|---|---|---|
| Example 48 | (P-1) | 12 | 14 | 3000 | 3 |
| Example 49 | (P-5) | 9 | 9 | 3300 | 4 |
| Example 50 | (P-6) | 9 | 10 | 3200 | 4 |
| Comparative Example 17 | (C-1) | 45 | 95 | 1600 | 1 |
| Comparative Example 18 | (C-3) | 35 | 90 | 1700 | 1 |

From the results shown in Table 9, it is understood that the pigment-dispersed compositions of Examples, which contained the specific polymers, offer high contrast, suppressed precipitation of pigment when post-baked, and a small increase in a viscosity over time, as compared with Comparative Examples.

Examples 51 to 53 and Comparative Examples 19 and 20

Using the pigment-dispersed compositions obtained in Examples 48 to 50 and Comparative Examples 17 and 18, the following colored photosensitive compositions were prepared.

| | |
|---|---|
| Pigment-dispersed composition indicated in Table 10 below: | 2000 parts |
| Dipentaerythritol hexaacrylate (photopolymerizable compound): | 100 parts |
| 4-[o-bromo-p-N,N-di(ethoxycarbonyl)aminophenyl]-2,6-di(trichloromethyl)-S-triazine (photopolymerization initiator): | 30 parts |
| Propyleneglycol monomethyl ether acetate solution (solids content: 30%) of benzyl methacrylate/methacrylic acid (=75/25 [mass ratio]) copolymer (weight average molecular weight: 12,000) (alkali-soluble resin) | 400 parts |
| 1-Methoxy-2-propyl acetate (solvent) | 390 parts |

Using the colored photosensitive composition (color resist liquid) obtained, a colored pattern (colored region) for a color filter was formed on the glass substrate in the same manner as in Example 43, thereby producing a colored filter substrate (color filter).

The colored photosensitive composition and colored filter substrate (color filter) produced were evaluated with respect to items (1) contrast, (2) solubility in an alkali developer liquid and matter suspended in alkali developer liquid, and (5) coating unevenness in the same manner as in Example 43. The results are shown in Table 10 below.

TABLE 10

| | Pigment-dispersed Composition | Contrast | Solubility in Alkali Developer Liquid | Coating Unevenness |
|---|---|---|---|---|
| Example 51 | Pigment-dispersed composition obtained in Example 48 | 2900 | 3 | A |
| Example 52 | Pigment-dispersed composition obtained in Example 49 | 3200 | 4 | A |
| Example 53 | Pigment-dispersed composition obtained in Example 50 | 3100 | 3 | A |
| Comparative Example 19 | Pigment-dispersed composition obtained in Comparative Example 17 | 1100 | 2 | B |
| Comparative Example 20 | Pigment-dispersed composition obtained in Comparative Example 18 | 1300 | 2 | B |

From the results shown in Table 10, it is understood that the colored photosensitive compositions of Examples are capable of forming an improved coating surface that does not have coating unevenness, and have improved solubility of the coating film in an alkaline developer liquid, as compared with Comparative Examples. It is also understood that the color filters of Examples have high contrast, as compared with Comparative Examples.

Examples 54 to 56 and Comparative Examples 21 to 23

Preparation of Resist Liquid

The components of the composition described below were mixed to allow dissolution, thereby preparing a resist liquid.

[Composition of Resist Liquid]

| | |
|---|---|
| Propyleneglycol monomethyl ether acetate: | 19.20 parts |
| Ethyl lactate: | 36.67 parts |
| 40% Propyleneglycol monomethyl ether acetate (PGMEA) solution of benzyl methacrylate/methacrylic acid/2-hydroxyethyl methacrylate (molar ratio = 60/22/18) copolymer: | 30.51 parts |
| Dipentaerythritol hexaacrylate: | 12.20 parts |
| Polymerization inhibitor (p-methoxyphenol): | 0.0061 parts |
| Fluorosurfactant (F-475, manufactured by DAINIPPON INK & CHEMICALS INC): | 0.83 parts |
| TAZ-107 (manufactured by Midori Kagaku Co., Ltd.): | 0.586 parts |

<Preparation of Silicon Wafer Having Undercoat Layer>

A 6-inch silicon wafer was subjected to heating treatment in an oven at 200° C. for 30 minutes. Then, the resist liquid was coated on this silicon wafer such that dry film thickness would be 1.5 µm, and this was dried by heating in an oven at 220° C. for 1 hour, thereby forming an undercoat layer. In this way, a silicon wafer substrate having an undercoat layer was obtained.

<Preparation of Pigment-Dispersed Composition>

The components of the composition (8) described below were mixed, and further mixed by agitation for 3 hours at a revolution number of 3,000 r.p.m. using a homogenizer, thereby preparing a pigment-containing mixed solution.

[Composition (8)]

| | |
|---|---|
| Pigment indicated in Table 11 below: | 100 parts |
| Specific polymer or comparative polymer indicated in Table 11 below (30% by mass solution): | 200 parts |
| 1-Methoxy-2-propyl acetate: | 750 parts |

Subsequently, the mixed solution obtained above was subjected to dispersing treatment for 3 hours with a beads dispersing machine (DISPERMAT, manufactured by GETZMANN) in which zirconia beads having a diameter of 0.8 mm were used, and then further subjected to dispersing treatment at a pressure of 2,000 kg/cm$^3$ and a flow rate of 500 g/min using a high-pressure dispersing machine equipped with a pressure-reducing mechanism (NANO-3000-10, manufactured by Japan B.E.E Co. Ltd.). This dispersing treatment was repeated five times, as a result of which a pigment-dispersed composition was obtained.

<Preparation of Colored Photosensitive Composition>

Using the pigment-dispersed composition obtained in the above, components were agitated and mixed so that the following composition was obtained, thereby preparing a solution of a colored photosensitive composition.

| | |
|---|---|
| Pigment-dispersed composition: | 1000 parts |
| CGI-124 (Oxime photopolymerization initiator, manufactured by Ciba Specialty Chemicals): | 20 parts |
| Dipentaerythritol hexaacrylate (photopolymerizable compound): | 20 parts |
| TO-756 (manufactured by Toagose Co. LTd., photopolymerizable compound): | 35 parts |
| Propyleneglycol monomethyl ether acetate: | 20 parts |

<Preparation of Color Filter Using Colored Photosensitive Composition and Evaluation Thereof>

(Evaluation of Sensitivity)

The colored photosensitive composition prepared as described above was coated on the undercoat layer of the silicon wafer having an undercoat layer obtained in the above-described manner, thereby forming a coating film. The resultant was then subjected to heating treatment using a hot plate at 100° C. for 120 seconds such that dry film thickness of the coating film became 0.7 μm (pre-baking).

Then, using an i-line stepper light exposure apparatus (FPA-3000i5+, manufactured by Canon), light exposure was performed at various light exposure amounts of from 50 to 1200 mJ/cm$^2$ at a wavelength of 365 nm through an Island pattern mask having 1.5 μm×1.5 μm patterns.

Thereafter, a silicon wafer substrate having the light-exposed coating film thereon was placed on a horizontal turntable of a spin shower development machine (model DW-30, manufactured by Chemitronics Co., Ltd.), and was subjected to puddle development at 23° C. for 60 seconds using CD-2000 (manufactured by FUJIFILM Electronics Materials Co., Ltd.), thereby forming a colored pattern (colored region) on the silicon wafer.

The silicon wafer having the colored pattern formed thereon was fixed to the horizontal turntable by vacuum chuck. While the silicon wafer was rotated by a rotation device at a rotation number of 50 r.p.m., pure water was supplied, by showering, from an ejection nozzle disposed above the rotation center so as to conduct rinse treatment. Subsequently, the resultant was spray-dried.

The minimum light exposure amount at which the post-development film thickness of a region that had been irradiated with light in the light exposure step was 95% or more of the pre-exposure film thickness (100%), was evaluated as a light exposure sensitivity. A smaller value of light exposure sensitivity indicates higher sensitivity. The evaluation results are shown in Table 11.

(Evaluation of Color Unevenness)

The brightness distribution was analyzed according to the method described below, and color unevenness was evaluated on the basis of the proportion of the pixels of which the deviation of brightness from the average is within ±5% to the total number of pixels. The evaluation criteria are as follows.

First, the colored photosensitive composition prepared as described above was coated on the undercoat layer of the silicon wafer having an undercoat layer obtained in the above-described manner, thereby forming a coating film. Then, the coating film was subjected to heating treatment for 120 seconds using a hot plate at 100° C. (pre-baking) such that dry film thickness of this coating film became 0.7 μm.

The monochromatic colored cured film thus obtained was irradiated with light from a side at which an optical microscope equipped with a digital camera were disposed, and the state of reflected light was observed with the optical microscope at magnification of 1000-fold. The digital camera mounted on the optical microscope had 1,280,000-pixel CCDs, with which the surface of the colored cured film in the reflection state was observed. The captured image was stored as digital-converted 8 bit-bitmap data (digital image). Here, the image-capturing of the surface of the colored cured film was performed on arbitrarily selected 20 regions.

The digital-converted data were stored by digitizing each of the luminances of three primary colors of RGB of the captured image into a 256-step concentration distribution of from 0 to 255.

Then, the stored digital image was divided in a lattice so that one section has a size corresponds to 2 μm square on the actual substrate, and luminance is averaged within each section.

In the present Example, since images were captured at an optical magnification of 1000-fold with a digital camera having 1,280,000 pixels, 2 μm on the actual substrate corresponds to 2 mm on the captured image. Since the image size of the display was 452 mm×352 mm, the total number of sections in one region was 39,776.

For all sections of each region, the luminance of any one section, and the average luminance of all adjacent sections adjacent thereto were measured. Any section of which the difference from the average luminance of adjacent sections was 5 or greater was considered as a significant difference section. The total number of significant difference sections per region averaged over all regions, and the ratio of the total number of significant difference sections per region averaged over all regions relative to the total number of sections (39776) in each region were calculated.

The evaluation criteria are as follows. The evaluation results are shown in Table 11.

—Evaluation Standard—

A: Deviation from the average is less than 2%.
B: Deviation from the average is from 2% to less than 5%.
C: Deviation from the average is 5% or more.

TABLE 11

| | Pigment | Specific Polymer or Comparative Polymer | Sensitivity (mJ/cm$^2$) | Color Unevenness |
|---|---|---|---|---|
| Example 54 | PR-250 | (P-5) | 800 | A |
| Comparative Example 21 | PR-250 | (C-4) | 900 | C |
| Example 55 | PG-36 | (P-27) | 700 | A |
| Comparative Example 22 | PG-36 | (C-4) | 800 | C |
| Example 56 | PB-15:6 | (P-28) | 700 | A |
| Comparative Example 23 | PB-15:6 | (C-4) | 800 | C |

From the results shown in Table 11, it is understood that the colored photosensitive compositions of Examples have high sensitivity, and colored cured films obtained from the colored photosensitive compositions of Examples do not have color unevenness, as compared with Comparative Examples.

Liquid crystal display devices respectively provided with the color filters obtained in Examples 30 to 47 were produced. As a result, it was found that the resultant liquid crystal display devices have excellent contrast without color unevenness, and have improved image display properties.

Further, solid-state image pickup devices respectively provided with the color filters obtained from the colored photosensitive compositions of Examples 54 to 56 were produced. As a result, it was found that the resultant solid-state image pickup devices did not have color unevenness, and had excellent color resolving power.

(Synthesis of Polymer 1)

14.0 g of M-11 (exemplary compound M-11 shown above), 105.0 g of polymethyl methacrylate having a methacryloyl group at a terminal (AA-6: manufactured by Toagose Co. LTd.), 21.0 g of acrylic acid, 5.6 g of n-dodecyl mercaptan, and 327 g of methoxypropyleneglycol were introduced into a nitrogen-substituted three-necked flask, and the contents of the flask were agitated with an agitator (Three One Motor, manufactured by Shinto Scientific Co. Ltd.), and heated to 75° C. while blowing nitrogen into the flask. 1.1 g of 2,2-azobis(dimethyl 2-methylpropionate) (V-601, manufactured by Wako Pure Chemical Industries, Ltd.) was added thereto, and the resultant mixture was agitated under heating at 75° C. for 2 hours. Thereafter, 1.1 g of V-601 was further added, and agitated under heating for 2 hours. Then, the temperature was raised to 90° C., and the contents of the flask were agitated under heating for 2 hours, as a result of which a 30% solution of polymer 1 was obtained.

The weight average molecular weight of the resultant high-molecular compound was measured by gel permeation chromatography (GPC) using polystyrene as a standard substance, as a result of which the weight average molecular weight was found to be 19,000.

The acid value per solid matter as determined by titration using sodium hydroxide was 117 mgKOH/g, and the composition ratio (mass ratio) of the repeating units as calculated from $^1$H-NMR was 20/65/15.

(Synthesis of Polymer 2)

14.0 g of M-11, 105.0 g of a hydroxyethyl methacrylate oligomer added with 5 mol caprolactone (PRAXEL FM5, manufactured by Daicel Chemical Industries, Ltd.), 21.0 g of acrylic acid, 3.3 g of n-dodecyl mercaptan, and 327 g of methoxypropyleneglycol were introduced into a nitrogen-substituted three-necked flask. The contents of the flask were agitated with an agitator (Three One Motor, manufactured by Shinto Scientific Co. Ltd.), and heated to 75° C. while blowing nitrogen into the flask. 1.2 g of 2,2-azobis(dimethyl 2-methylpropionate) (V-601, manufactured by Wako Pure Chemical Industries, Ltd.) was added thereto, and the resultant mixture was agitated under heating at 75° C. for 2 hours. Thereafter, 1.2 g of V-601 was further added, and agitated under heating for 2 hours. Then, the temperature was raised to 90° C., and the contents of the flask were agitated under heating for 2 hours, as a result of which a 30% solution of polymer 2 was obtained.

The weight average molecular weight of the resultant high-molecular compound was measured by gel permeation chromatography (GPC) using polystyrene as a standard substance, as a result of which the weight average molecular weight was found to be 15,000.

The acid value per solid matter as determined by titration using sodium hydroxide was 117 mgKOH/g, and the composition ratio (mass ratio) of the repeating units as calculated from $^1$H-NMR was 20/65/15.

(Synthesis of A-5)

Monomer A-5 was synthesized in the same manner as in Synthesis Example 1.

(Synthesis of Polymer 3)

14.0 g of M-11, 105.0 g of A-5 synthesized in the above, 21.0 g of acrylic acid, 3.1 g of n-dodecyl mercaptan, and 327 g of methoxypropyleneglycol were introduced into a nitrogen-substituted three-necked flask. The contents of the flask were agitated with an agitator (Three One Motor, manufactured by Shinto Scientific Co. Ltd.), and heated to 75° C. while blowing nitrogen into the flask. 1.2 g of 2,2-azobis (dimethyl 2-methylpropionate) (V-601, manufactured by Wako Pure Chemical Industries, Ltd.) was added thereto, and the resultant mixture was agitated under heating at 75° C. for 2 hours. Thereafter, 1.2 g of V-601 was further added, and agitated under heating for 2 hours. Then, the temperature was raised to 90° C., and the contents of the flask were agitated under heating for 2 hours, as a result of which a 30% solution of polymer 3 was obtained.

The weight average molecular weight of the resultant high-molecular compound was measured by gel permeation chromatography (GPC) using polystyrene as a standard substance, as a result of which the weight average molecular weight was found to be 23,000.

The acid value per solid matter as determined by titration using sodium hydroxide was 117 mgKOH/g, and the composition ratio (mass ratio) of the repeating units as calculated from $^1$H-NMR was 20/65/15.

(Synthesis of Polymer 4)

28.0 g of benzyl methacrylate, 91.0 g of A-5 synthesized in the above, 21.0 g of acrylic acid, 4.2 g of n-dodecyl mercaptan, and 327 g of methoxypropyleneglycol were introduced into a nitrogen-substituted three-necked flask, and the contents of the flask were agitated with an agitator (Three One Motor, manufactured by Shinto Scientific Co. Ltd.), and heated to 75° C. while blowing nitrogen into the flask. 1.0 g of 2,2-azobis(dimethyl 2-methylpropionate) (V-601, manufactured by Wako Pure Chemical Industries, Ltd.) was added thereto, and the resultant mixture was agitated under heating at 75° C. for 2 hours. Thereafter, 1.0 g of V-601 was further added, and agitated under heating for 2 hours. Then, the temperature was raised to 90° C., and the contents of the flask were agitated under heating for 2 hours, as a result of which a 30% solution of polymer 4 was obtained.

The weight average molecular weight of the resultant high-molecular compound was measured by gel permeation chromatography (GPC) using polystyrene as a standard substance, as a result of which the weight average molecular weight was found to be 21,000.

The acid value per solid matter as determined by titration using sodium hydroxide was 117 mgKOH/g, and the composition ratio (mass ratio) of the repeating units as calculated from $^1$H-NMR was 20/65/15.

(Synthesis of Polymer 5)

Polymer 5 was synthesized in the same manner as the synthesis of polymer 4, except for changing of the starting materials to 28.0 g of benzyl methacrylate, 105.0 g of A-5 synthesized in the above, 7.0 g of acrylic acid, and 3.8 g of n-dodecyl mercaptan.

The weight average molecular weight of the resultant high-molecular compound was measured by gel permeation chromatography (GPC) using polystyrene as a standard substance, as a result of which the weight average molecular weight was found to be 23,000.

The acid value per solid matter as determined by titration using sodium hydroxide was 39 mgKOH/g, and the composition ratio (mass ratio) of the repeating units as calculated from $^1$H-NMR was 20/65/5.

(Synthesis of Polymer 6)

Polymer 6 was synthesized in the same manner as the synthesis of polymer 4, except for changing the starting materials to 14.0 g of benzyl methacrylate, 84.0 g of A-5 synthesized in the above, 42.0 g of acrylic acid, and 4.5 g of n-dodecyl mercaptan.

The weight average molecular weight of the resultant high-molecular compound was measured by gel permeation chromatography (GPC) using polystyrene as a standard substance, as a result of which the weight average molecular weight was found to be 18,000.

The acid value per solid matter as determined by titration using sodium hydroxide was 234 mgKOH/g, and the composition ratio (mass ratio) of the repeating units as calculated from $^1$H-NMR was 10/60/30.

(Synthesis of Comparative Polymer 1)

14.0 g of M-11, 105.0 g of polymethyl methacrylate having a methacryloyl group at a terminal (AA-6: manufactured by Toagose Co. LTd.), 21.0 g of methacrylic acid, 5.6 g of n-dodecyl mercaptan, and 327 g of methoxypropyleneglycol were introduced into a nitrogen-substituted three-necked flask, and the contents of the flask were agitated with an agitator (Three One Motor, manufactured by Shinto Scientific Co. Ltd.), and heated to 75° C. while blowing nitrogen into the flask. 1.1 g of 2,2-azobis(dimethyl 2-methylpropionate) (V-601, manufactured by Wako Pure Chemical Industries, Ltd.) was added thereto, and the resultant mixture was agitated under heating at 75° C. for 2 hours. Thereafter, 1.1 g of V-601 was further added, and agitated under heating for 2 hours. Then, the temperature was raised to 90° C., and the contents of the flask were agitated under heating for 2 hours, as a result of which a 30% solution of comparative polymer 1 was obtained.

The weight average molecular weight of the resultant high-molecular compound was measured by gel permeation chromatography (GPC) using polystyrene as a standard substance, as a result of which the weight average molecular weight was found to be 22,000.

The acid value per solid matter as determined by titration using sodium hydroxide was 98 mgKOH/g, and the composition ratio (mass ratio) of the repeating units as calculated from $^1$H-NMR was 20/65/15.

Polymers 1 to 6 obtained above are (A) specific graft polymers according to the invention, and each of polymers 1 to 6 is a polymer formed by copolymerization of at least: any one of AA-6, PRAXEL FM5, or A-5, each of which is a macromonomer, and acrylic acid.

<Preparation of Pigment-Dispersed Composition>

The components of the composition indicated in Table 12 below were mixed, and further mixed by agitation for 3 hours at a revolution number of 3,000 r.p.m. using a homogenizer, thereby preparing a pigment-containing mixed solution.

Subsequently, the mixed solution obtained was subjected to dispersing treatment for 6 hours with a beads dispersing machine (DISPERMAT, manufactured by GETZMANN) using 0.2 mm φ zirconia beads, and then further subjected to dispersing treatment at a pressure of 2,000 kg/cm$^3$ and a flow rate of 500 g/min using a high-pressure dispersing machine equipped with a pressure-reducing mechanism (NANO-3000-10, manufactured by Japan B.E.E Co. Ltd.). This dispersing treatment was repeated ten times, as a result of which a pigment-dispersed composition was obtained.

<Evaluation of Pigment-Dispersed Composition>

The evaluations described below were conducted on the obtained pigment-dispersed composition. The results are shown in Table 12.

(1) Measurement and Evaluation of Viscosity

The pigment-dispersed composition obtained was measured with respect to a viscosity $\eta 1$ of the pigment-dispersed composition immediately after dispersing, and a viscosity $\eta 2$ of the pigment-dispersed composition when the pigment-dispersed composition was left to stand at 60° C. for 10 days since dispersing, using an E-type viscometer, and the degree of viscosity increase was evaluated. Here, a low viscosity indicates that viscosity increase due to the dispersant is suppressed, and dispersibility and dispersion stability of the pigment are favorable.

(2) Measurement and Evaluation of Contrast

The pigment-dispersed composition obtained was coated on a glass substrate such that the coating film thickness after drying became 1 μm, whereby a sample was prepared. This sample was placed between two polarizing plates, and luminance when the polarizing axes were parallel to each other and luminance when the polarizing axes were orthogonal to each other were measured using a BM-5 manufactured by TOPCON CORPORATION. The ratio of luminance when the polarizing axes were parallel to each other/luminance when the polarizing axes were orthogonal to each other was regarded as contrast A high contrast indicates that the pigment is uniformly dispersed in the highly-fined state.

TABLE 12

| | | Composition of Pigment dispersion liquid | | | | Evaluation Results | | |
|---|---|---|---|---|---|---|---|---|
| | Pigment | Pigment Derivative | Dispersant 1 (30% solution) | Basic Graft Polymer | Solvent | η1 (mPa·s) | η2 (mPa·s) | Contrast |
| Example 57 | Pigment R1 90 g | Derivative A 10 g | Polymer 1 150 g | — | PGMEA 600 g | 15 | 17 | 1600 |
| Example 58 | Pigment R1 90 g | Derivative A 10 g | Polymer 2 150 g | — | PGMEA 600 g | 15 | 19 | 1600 |
| Example 59 | Pigment R1 90 g | Derivative A 10 g | Polymer 3 150 g | — | PGMEA 600 g | 10 | 11 | 1800 |
| Example 60 | Pigment R1 90 g | Derivative A 10 g | Polymer 4 150 g | — | PGMEA 600 g | 12 | 16 | 1600 |
| Example 61 | Pigment R2 90 g | Derivative A 10 g | Polymer 1 200 g | — | PGMEA 600 g | 15 | 17 | 1800 |
| Example 62 | Pigment R2 90 g | Derivative A 10 g | Polymer 2 200 g | — | PGMEA 600 g | 15 | 19 | 1800 |

TABLE 12-continued

| | Composition of Pigment dispersion liquid | | | | | Evaluation Results | | |
|---|---|---|---|---|---|---|---|---|
| | Pigment | Pigment Derivative | Dispersant 1 (30% solution) | Basic Graft Polymer | Solvent | η1 (mPa·s) | η2 (mPa·s) | Contrast |
| Example 63 | Pigment R2 90 g | Derivative A 10 g | Polymer 3 200 g | — | PGMEA 600 g | 10 | 12 | 2000 |
| Example 64 | Pigment R2 90 g | Derivative A 10 g | Polymer 4 200 g | — | PGMEA 600 g | 12 | 20 | 1700 |
| Example 65 | Pigment R2 90 g | Derivative B 10 g | Polymer 1 100 g | 15 g | PGMEA 600 g | 15 | 18 | 2000 |
| Example 66 | Pigment R2 90 g | Derivative B 10 g | Polymer 2 100 g | 15 g | PGMEA 600 g | 15 | 19 | 2000 |
| Example 67 | Pigment R2 90 g | Derivative B 10 g | Polymer 3 100 g | 15 g | PGMEA 600 g | 10 | 11 | 2200 |
| Example 68 | Pigment R2 90 g | Derivative B 10 g | Polymer 4 100 g | 15 g | PGMEA 600 g | 12 | 18 | 2000 |
| Example 69 | Pigment R1 90 g | Derivative A 10 g | Polymer 5 150 g | — | PGMEA 600 g | 13 | 18 | 1500 |
| Example 70 | Pigment R1 90 g | Derivative A 10 g | Polymer 6 150 g | — | PGMEA 600 g | 13 | 17 | 1500 |
| Comparative Example 24 | Pigment R1 90 g | Derivative A 10 g | Comparative polymer 1 150 g | — | PGMEA 600 g | 15 | 40 | 1500 |
| Comparative Example 25 | Pigment R2 90 g | Derivative A 10 g | Comparative polymer 1 200 g | — | PGMEA 600 g | 15 | 80 | 1500 |

The compounds used in Table 12 are as follows.

Pigment R1: C. I. Pigment Red 254 having an average primary particle diameter of 30 nm Pigment R2: C. I. Pigment Red 254 having an average primary particle diameter of 23 nm Basic graft polymer: Polymer obtained by amidation reaction of polyethylene imine with a polyester obtained by ring-opening polymerization of ε-caprolactone by dodecanoic acid, the basic graft polymer having a weight average molecular weight of 20,000

PGMEA: 1-Methoxy-2-propyl acetate

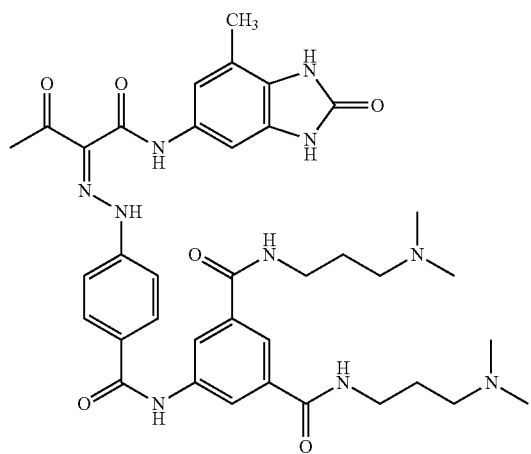

Derivative A

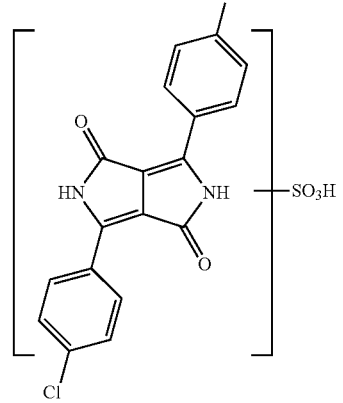

Derivative B

From Table 12, it is understood that Examples 57 to 70, in which the specific graft polymers according to the invention were used, exhibit small increase in viscosity over time, favorable dispersion stability, and high contrast, and provided finely dispersed pigment particles, as compared with Comparative Examples.

<Preparation of Pigment-Dispersed Composition>

The components of each of the composition (11) to (14) described below were mixed, and further mixed by agitation for 3 hours at a revolution number of 3,000 r.p.m. using a homogenizer, thereby preparing a pigment-containing mixed solution.

[Composition (11)]

| | |
|---|---|
| C. I. Pigment Red 254 having an average primary particle diameter of 25 μm: | 110 parts |
| Polymer 1 as a dispersant (30% by mass solution): | 200 parts |
| 1-Methoxy-2-propyl acetate: | 750 parts |

[Composition (12)]

| | |
|---|---|
| C. I. Pigment Red 254 having an average primary particle diameter of 25 μm: | 110 parts |
| Polymer 3 as a dispersant (30% by mass solution): | 200 parts |
| 1-Methoxy-2-propyl acetate: | 750 parts |

[Composition (13)]

| | |
|---|---|
| C. I. Pigment Red 254 having an average primary particle diameter of 25 μm: | 110 parts |
| Polymer 1 as a dispersant (30% by mass solution): | 100 parts |
| Basic graft dispersant (the same as that used in Example 65): | 30 parts |
| 1-Methoxy-2-propyl acetate: | 820 parts |

[Composition (14)]

| | |
|---|---|
| C. I. Pigment Red 254 having an average primary particle diameter of 25 μm: | 110 parts |
| Polymer 3 as a dispersant (30% by mass solution): | 100 parts |
| Basic graft dispersant (the same as that used in Example 65): | 30 parts |
| 1-Methoxy-2-propyl acetate: | 820 parts |

[Composition (15)]

| | |
|---|---|
| C. I. Pigment Red 254 having an average primary particle diameter of 25 μm: | 110 parts |
| Comparative Polymer 1 as a dispersant (30% by mass solution): | 200 parts |
| 1-Methoxy-2-propyl acetate: | 750 parts |

Subsequently, each of the mixed solutions obtained above was subjected to dispersing treatment for 6 hours with a beads dispersing machine (DISPERMAT, manufactured by GETZMANN) in which zirconia beads having a diameter of 0.3 mm were used. Thereafter, the mixed solution was further subjected to dispersing treatment using a high-pressure dispersing machine equipped with a pressure-reducing mechanism (NANO-3000-10, manufactured by Japan B.E.E Co. Ltd.) at a pressure of 2,000 kg/cm$^3$ and a flow rate of 500 g/min. This dispersing treatment was repeated ten times, as a result of which pigment-dispersed compositions (11) to (15) were obtained.

<Preparation of the Photocurable Composition>

Using the obtained pigment-dispersed composition, photocurable compositions having pigment concentrations of 35% by mass and 42% by mass, respectively, were prepared.

<Preparation of Color Filter Using Photocurable Composition>

The resultant photocurable composition (color resist liquid) was coated on a 100 mm×100 mm glass substrate (1737, manufactured by Corning) such that x value as an index of color concentration became 0.650, and this was dried in an oven at 90° C. for 60 seconds (pre-baking). Thereafter, a whole surface of the coating film was exposed to light at 200 mJ/cm$^2$ (illuminance: 20 mW/cm$^2$), and the coating film after light exposure was covered with a 1% aqueous solution of an alkali developer liquid (CDK-1, manufactured by FUJIFILM Electronic Materials Co., Ltd.), and allowed to stand for a predetermined time. After the standing, pure water was sprayed by showering to wash out the developer liquid. Then, the coating film which had been subjected to light exposure and development as described above was subjected to heating treatment in an oven at 220° C. for 1 hour (post-baking), as a result of which a colored pattern (colored resin coating film) for a color filter was formed on the glass substrate. In this way, a colored filter substrate (color filter) was produced.

<Evaluation of Color Filter>

Evaluations described below were conducted on the colored filter substrate (color filter) produced. The results are shown in Table 13.

(1) Contrast

A polarizing plate was placed on the colored resin coating layer of the colored filter substrate, and the colored resin coating layer was sandwiched between the polarizing plate and another polarizing plate. The luminance when the polarizing plates were parallel to each other, and the luminance when the polarizing plates were orthogonal to each other were measured using a BM-5 manufactured by TOPCON CORPORATION. The value obtained by dividing the luminance when the polarizing plates were parallel to each other by the luminance when the polarizing plates were orthogonal to each other (=the luminance when the polarizing plates were parallel to each other/the luminance when the polarizing plates were orthogonal to each other) was used as an index for evaluating contrast. A higher value indicates a higher contrast.

(2) Development Residue

The development time is varied to be 20 seconds, 30 seconds, 50 seconds, and 70 seconds, respectively. The developed substrates were observed with respect to whether portions that had not been exposed to light remained on the glass substrate, using an optical microscope. A higher score is more favorable.

5: Residue was not present at all with a development time of 20 seconds

4: Residue was not present at all with a development time of 30 seconds or more, but a residue was present with a development time of 20 seconds 3: Residue was not present at all with a development time of 50 seconds or more, but residue was present with a development time of 30 seconds 2: Residue was not present at all with a development time of 70 seconds or more, but residue was present with 50 seconds or less of the development time 1: Residue was present in an portion that had not been exposed to light, even with a development time of 70 seconds (3) Evaluation of Redissolvability As an alternative method for evaluating whether or not defects in slit coating caused by unwanted matter occur, the following evaluation of redissolvability was performed.

The photocurable composition of each of Examples and Comparative Examples was coated on a 50 mm×50 mm glass substrate by a spin coating method such that film thickness after drying would be 1 μm, and was air-dried for 60 minutes. Thereafter, 1-methoxy-2-propyl acetate (hereinafter also referred to as PGMEA.), which is used in the photocurable composition, was dripped by 1 μL, droplets. Grade A was assigned to a case in which dissolution was achieved with 6 droplets or less, grade B was assigned to a case in which dissolution was achieved with from 7 to 8 droplets, and grade C was assigned to a case in which redissolution was not achieved even with 9 droplets or more.

In addition, an occurrence rate of defect caused by unwanted matter in slit coating being 0% corresponded to a film that dissolved with 6 PGMEA droplets or less in the redissolvability test.

TABLE 13

| Examples | Composition of Photocurable Composition | | | | | | Evaluation | | |
|---|---|---|---|---|---|---|---|---|---|
| | Pigment dispersion liquid | Polymerizable Compound | Photopolymerization Initiator | Alkali-soluble Resin | Solvent | Pigment Concentration | Contrast | Development Residue | Redissolvability |
| Example 71 | (11) 1000 g | 50 g | 15 g | 200 g | 195 g | 35% | 2000 | 4 | A |
| Example 72 | (12) 1000 g | 50 g | 15 g | 200 g | 195 g | 35% | 2200 | 5 | A |
| Example 73 | (13) 1000 g | 50 g | 15 g | 200 g | 195 g | 35% | 2500 | 4 | A |
| Example 74 | (14) 1000 g | 50 g | 15 g | 200 g | 195 g | 35% | 3000 | 4 | A |
| Comparative Example 26 | (15) 1000 g | 50 g | 15 g | 200 g | 195 g | 35% | 1900 | 3 | B |
| Example 75 | (11) 1000 g | 50 g | 15 g | 50 g | 200 g | 42% | 2000 | 3 | B |
| Example 76 | (12) 1000 g | 50 g | 15 g | 50 g | 200 g | 42% | 2200 | 4 | B |
| Example 77 | (13) 1000 g | 50 g | 15 g | 50 g | 200 g | 42% | 2500 | 3 | B |
| Example 78 | (14) 1000 g | 50 g | 15 g | 50 g | 200 g | 42% | 3000 | 4 | B |
| Comparative Example 27 | (15) 1000 g | 50 g | 15 g | 50 g | 200 g | 42% | 1900 | 1 | C |

The compounds used in Table 13 are as follows.

Polymerizable compound: Dipentaerythritol penta-hexaacrylate

Photopolymerization initiator: 4-[o-bromo-p-N,N-di(ethoxycarbonyl)aminophenyl]-2,6-di(trichloromethyl)-S-triazine Alkali-soluble resin: 1-Methoxy-2-propyl acetate solution (solids content: 30%) of benzyl methacrylate/methacrylic acid (=75/25 [mass ratio]) copolymer (weight average molecular weight: 12,000)

Solvent: 1-Methoxy-2-propyl acetate

From Table 13, it is understood that, when Examples 71 to 74 having a pigment concentration of 35% by mass are compared with Comparative Example 26 having a pigment concentration of 35% by mass and Examples 75 to 78 having a pigment concentration of 42% by mass were compared with Comparative Example 27 having a pigment concentration of 42% by mass, the Examples, in which the pigment dispersion liquids (11) to (14) containing the specific graft polymers according to the invention were used, have high contrast and small development residue, and are excellent in PGMEA redissolvability, as compared with the Comparative Examples.

<Preparation of Pigment-Dispersed Composition>

The components of each of the compositions (16) to (19) described below were mixed, and further mixed by agitation for 3 hours at a revolution number of 3,000 r.p.m. using a homogenizer, thereby preparing a pigment-containing mixed solution.

[Composition (16)]

| | |
|---|---|
| C. I. Pigment Green 36 (average primary particle diameter: 20 nm): | 55 parts |
| C. I. Pigment Yellow 150 (average primary particle diameter: 24 nm): | 45 parts |
| Polymer 1 as a dispersant (30% by mass solution): | 180 parts |
| 1-Methoxy-2-propyl acetate: | 750 parts |

[Composition (17)]

| | |
|---|---|
| C. I. Pigment Green 36 (average primary particle diameter: 20 nm): | 55 parts |
| C. I. Pigment Yellow 150 (average primary particle diameter: 24 nm): | 45 parts |
| Polymer 3 as a dispersant (30% by mass solution): | 180 parts |
| 1-Methoxy-2-propyl acetate: | 750 parts |

[Composition (18)]

| | |
|---|---|
| C. I. Pigment Green 36 (average primary particle diameter: 20 nm): | 55 parts |
| C. I. Pigment Yellow 150 (average primary particle diameter: 24 nm): | 45 parts |
| Polymer 3 as a dispersant (30% by mass solution): | 60 parts |
| Basic graft dispersant (the same as that used in Example 65): | 36 parts |
| 1-Methoxy-2-propyl acetate: | 820 parts |

[Composition (19)]

| | |
|---|---|
| C. I. Pigment Green 36 (average primary particle diameter: 20 nm): | 55 parts |
| C. I. Pigment Yellow 150 (average primary particle diameter: 24 nm): | 45 parts |
| Comparative Polymer 1 as a dispersant (30% by mass solution): | 180 parts |
| 1-Methoxy-2-propyl acetate: | 750 parts |

[Composition (20)]

| | |
|---|---|
| C. I. Pigment Green 36 (average primary particle diameter: 20 nm): | 55 parts |
| C. I. Pigment Yellow 150 (average primary particle diameter: 24 nm): | 45 parts |
| Polymer 3 as a dispersant (30% by mass solution): | 40 parts |
| Basic graft dispersant (the same as that used in Example 65): | 36 parts |
| 1-Methoxy-2-propyl acetate: | 750 parts |

Subsequently, each of the mixed solution obtained above was subjected to dispersing treatment for 6 hours with a beads dispersing machine (DISPERMAT, manufactured by GETZMANN) in which zirconia beads having a diameter of 0.3 mm were used. Thereafter, the mixed solution was further subjected to dispersing treatment using a high-pressure dispersing machine equipped with a pressure-reducing mechanism (NANO-3000-10, manufactured by Japan B.E.E Co. Ltd.) at a pressure of 2,000 kg/cm$^3$ and a flow rate of 500 g/min. This dispersing treatment was repeated ten times, as a result of which pigment-dispersed compositions (16) to (19) were obtained.

<Preparation of Photocurable Composition>

Using the obtained pigment-dispersed composition, photocurable compositions having pigment concentrations of 35% by mass and 42% by mass, respectively, were prepared.

<Preparation of Color Filter Using Photocurable Composition>

The resultant photocurable composition (color resist liquid) was coated on a 100 mm×100 mm glass substrate (1737, manufactured by Corning) such that y value as an index of color concentration became 0.650, and this was dried in an oven at 90° C. for 60 seconds (pre-baking). Thereafter, a whole surface of the coating film was exposed to light at 200 mJ/cm$^2$ (illuminance: 20 mW/cm$^2$), and the coating film after light exposure was covered with a 1% aqueous solution of an alkali developer liquid (CDK-1, manufactured by FUJIFILM Electronic Materials Co., Ltd.), and allowed to stand for a predetermined time. After the standing, pure water was sprayed by showering to wash out the developer liquid. Then, the coating film which had been subjected to light exposure and development as described above was subjected to heating treatment in an oven at 220° C. for 1 hour (post-baking), as a result of which a colored pattern (colored resin coating film) for a color filter was formed on the glass substrate. In this way, a colored filter substrate (color filter) was produced.

<Evaluation of Color Filter>

Evaluations were conducted for the produced colored filter substrate (color filter), in the same manner as in Example 71. The results are shown in Table 14.

The compounds used in Table 14 are as follows:

Polymerizable compound: Dipentaerythritol penta-hexaacrylate

Photopolymerization initiator: 4-[o-bromo-p-N,N-di(ethoxycarbonyl)aminophenyl]-2,6-di(trichloromethyl)-S-triazine Alkali-soluble resin: 1-Methoxy-2-propyl acetate solution (solids content: 30%) of benzyl methacrylate/methacrylic acid (=75/25 [mass ratio]) copolymer (weight average molecular weight: 12,000)

Solvent: 1-Methoxy-2-propyl acetate

From Table 14, it is understood that, when Examples 79 to 81 having a pigment concentration of 35% by mass were compared with Comparative Example 28 having a pigment concentration of 35% by mass and Examples 82 to 84 having a pigment concentration of 42% by mass were compared to Comparative Example 29 having a pigment concentration of 42% by mass, the Examples in which the pigment dispersion liquids (16) to (18) and (20) containing the specific graft polymers according to the invention are used have high contrast, small development residue, and excellent PGMEA redissolvability, as compared with the Comparative Examples.

<Preparation of Resist Liquid>

The components of the composition described below were mixed to allow dissolution, thereby preparing a resist liquid.

TABLE 14

| | Composition of Photocurable Composition | | | | | | Evaluation | | |
|---|---|---|---|---|---|---|---|---|---|
| | Pigment dispersion liquid | Polymerizable Compound | Photopolymerization Initiator | Alkali-soluble Resin | Solvent | Pigment Concentration | Contrast | Development Residue | Redissolvability |
| Example 79 | (16) 1000 g | 50 g | 15 g | 200 g | 195 g | 35% | 7000 | 4 | A |
| Example 80 | (17) 1000 g | 50 g | 15 g | 200 g | 195 g | 35% | 8800 | 5 | A |
| Example 81 | (18) 1000 g | 50 g | 15 g | 200 g | 195 g | 35% | 9000 | 5 | A |
| Comparative Example 28 | (19) 1000 g | 50 g | 15 g | 200 g | 195 g | 35% | 5500 | 3 | B |
| Example 82 | (16) 1000 g | 50 g | 15 g | 50 g | 200 g | 42% | 7000 | 3 | B |
| Example 83 | (17) 1000 g | 50 g | 15 g | 50 g | 200 g | 42% | 8800 | 4 | A |
| Example 84 | (18) 1000 g | 50 g | 15 g | 50 g | 200 g | 42% | 9000 | 4 | A |
| Comparative Example 29 | (19) 1000 g | 50 g | 15 g | 50 g | 200 g | 42% | 5500 | 1 | C |
| Example 85 | (20) 1000 g | 50 g | 15 g | 30 g | 195 g | 45% | 9000 | 4 | A |
| Comparative Example 30 | (19) 1000 g | 50 g | 15 g | 10 g | 200 g | 45% | 5500 | 1 | C |

Composition of Resist Liquid

| | |
|---|---|
| 1-Methoxy-2-propyl acetate: | 19.20 parts |
| Ethyl lactate: | 36.67 parts |
| 40% solution of benzyl methacrylate/methacrylic acid/2-hydroxyethyl methacrylate (molar ratio = 60/22/18) copolymer in 1-Methoxy-2-propyl acetate (PGMEA): | 30.51 parts |
| Dipentaerythritol hexaacrylate: | 12.20 parts |
| Polymerization inhibitor (p-methoxyphenol): | 0.0061 parts |
| Fluorosurfactant (F-475, manufactured by DAINIPPON INK & CHEMICALS INC): | 0.83 parts |
| Photopolymerization initiator (TAZ-107, manufactured by Midori Kagaku Co., Ltd.): | 0.586 parts |

<Preparation of Silicon Wafer Having Undercoat Layer>

A 6-inch silicon wafer was subjected to heating treatment in an oven at 200° C. for 30 minutes. Then, the resist liquid described above was coated on the silicon wafer such that dry film thickness would be 1.5 µm, and this was dried by heating in an oven at 220° C. for 1 hour, thereby forming an undercoat layer. In this way, a silicon wafer substrate having an undercoat layer was obtained.

<Preparation of Pigment-Dispersed Composition>

The components of each of the compositions (21) and (22) described below were mixed, and further mixed by agitation for 3 hours at a revolution number of 3,000 r.p.m. using a homogenizer, thereby preparing a pigment-containing mixed solution.

[Composition 21]

| | |
|---|---|
| Pigment (pigment indicated in Table 15): | 100 parts |
| Polymer 1 as a dispersant (30% by mass solution): | 200 parts |
| 1-Methoxy-2-propyl acetate: | 750 parts |

[Composition 22]

| | |
|---|---|
| Pigment (pigment indicated in Table 15): | 100 parts |
| Comparative Polymer 1 as a dispersant (30% by mass solution): | 200 parts |
| 1-Methoxy-2-propyl acetate: | 750 parts |

Subsequently, each of the mixed solutions obtained above was subjected to dispersing treatment for 3 hours with a beads dispersing machine (DISPERMAT, manufactured by GETZMANN) in which zirconia beads having a diameter of 0.8 mm were used, and then further subjected to dispersing treatment at a pressure of 2,000 kg/cm³ and a flow rate of 500 g/min using a high-pressure dispersing machine equipped with a pressure-reducing mechanism (NANO-3000-10, manufactured by Japan B.E.E Co. Ltd.). This dispersing treatment was repeated five times, as a result of which pigment-dispersed compositions indicated in Table 15 were obtained.

<Preparation of Photocurable Composition (Coating Liquid)>

Using each of the pigment dispersion liquids obtained in the above, components were agitated and mixed such that the following composition was obtained, thereby preparing a photocurable composition.

<Composition>

| | |
|---|---|
| Pigment dispersion liquid described above: | 1000 parts |
| Photopolymerization initiator (CGI-124 manufactured by Ciba Specialty Chemicals): | 20 parts |
| Polymerizable compound: Dipentaerythritol hexaacrylate: | 20 parts |
| Polymerizable compound (TO-756, manufactured by Toagose Co. LTD.): | 35 parts |
| 1-Methoxy-2-propyl acetate: | 20 parts |

<Preparation of Color Filter Using Photocurable Composition and Evaluation Thereof>

The photocurable composition prepared as described above was coated on the undercoat layer of the silicon wafer having an undercoat layer described above, thereby forming a colored layer (coating film). Then, this was subjected to heating treatment using a hot plate at 100° C. for 120 seconds such that dry film thickness of the coating film became 0.7 µm (pre-baking).

Then, using an i-line stepper light exposure apparatus (FPA-3000i5+, manufactured by Canon), light exposure was performed at various light exposure amounts ranging from 50 to 1200 mJ/cm² at a wavelength of 365 nm through an Island pattern mask having 1.5 µm×1.5 µm patterns.

Thereafter, a silicon wafer substrate having the light-exposed coating film thereon was placed on a horizontal rotating table of a spin shower development machine (model DW-30, manufactured by Chemitronics Co., Ltd.), and was subjected to puddle development at 23° C. for 60 seconds using CD-2000 (manufactured by FUJIFILM Electronic Materials Co., Ltd.), thereby forming a colored pattern on the silicon wafer.

The silicon wafer having the colored pattern formed thereon was fixed to the horizontal turntable by vacuum chuck. While the silicon wafer was rotated by a rotation device at a rotation number of 50 r.p.m., pure water was supplied, by showering, from an ejection nozzle disposed above the rotation center so as to conduct rinse treatment. Subsequently, the resultant was spray-dried.

<Evaluation of Color Unevenness>

In the same manner as the preparation of the silicon wafer having an undercoat layer described above, a resist liquid was coated on a glass substrate so as to form a glass substrate having an undercoat layer, and the photocurable composition was coated on the glass substrate having an undercoat layer, thereby forming a colored layer (coating film). Then, this was subjected to heating treatment using a hot plate at 100° C. for 120 seconds such that dry film thickness of the coating film became 0.7 µm (pre-baking). The brightness distribution of this coated glass substrate was analyzed from images that had been captured by a microscope, MX-50 (manufactured by Olympus Corporation).

The brightness distribution was analyzed, and color unevenness was evaluated on the basis of the proportion of the pixels of which the deviation of brightness from the average is within ±5% to the total number of pixels. The evaluation criteria are as follows.

—Evaluation Criteria—

A: the proportion of pixels of which deviation from the average is within ±5% is 99% or more of the total number of pixels B: the proportion of pixels of which deviation from the average is within ±5% is from 95% to less than 99% of the total number of pixels C: the proportion of pixels of which deviation from the average is within ±5% is less than 95% of the total number of pixels

TABLE 15

|  | Processed Pigment | Composition | Color unevenness |
|---|---|---|---|
| Example 86 | PR-254 | 21 | A |
| Comparative example 31 | PR-254 | 22 | C |
| Example 87 | PG-36 | 21 | A |
| Comparative example 32 | PG-36 | 22 | C |
| Example 88 | PB-15:6 | 21 | A |
| Comparative example 33 | PB-15:6 | 22 | C |

From Table 15, it is understood that Examples 86 to 88, in which the dispersion liquids containing the specific graft polymers according to the invention are used, have favorable properties with respect to color unevenness, as compared with Comparative Examples.

All publications, patent applications, and technical standards mentioned in this specification are herein incorporated by reference to the same extent as if such individual publication, patent application, or technical standard was specifically and individually indicated to be incorporated by reference.

The invention claimed is:

1. A pigment-dispersed composition comprising:
  (a) a high-molecular compound comprising at least one kind of repeating unit selected from repeating units each represented by the following Formula (I) or (II);
  (b) a pigment; and
  (c) an organic solvent,

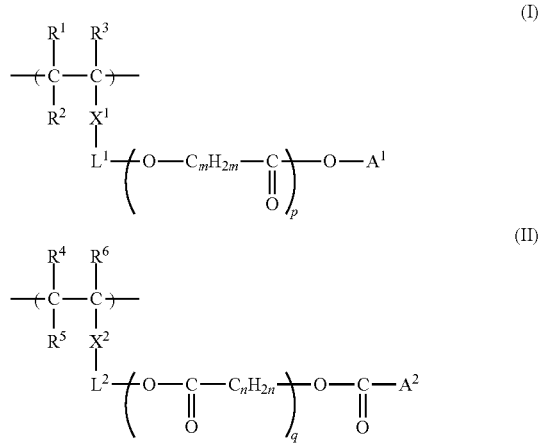

wherein, in Formulae (I) and (II), $R^1$ to $R^6$ each independently represent a hydrogen atom or a monovalent organic group; $X^1$ and $X^2$ each independently represent —CO—, —C(=O)O—, —CONH—, —OC(=O)—, or a phenylene group; $L^1$ and $L^2$ each independently represent a single bond or a divalent organic linking group; $A^1$ represents a substituted or unsubstituted alkyl group, or a substituted or unsubstituted aryl group; $A^2$ represents an unsubstituted alkyl group, or a substituted or unsubstituted aryl group; m and n each independently represent an integer of from 2 to 8; and p and q each independently represent an integer of from 1 to 100.

2. The pigment-dispersed composition according to claim 1, wherein the (a) high-molecular compound has at least one acidic group at a side chain and has an acid value in the range of from 50 mgKOH/g to 200 mgKOH/g.

3. The pigment-dispersed composition according to claim 1, wherein the (a) high-molecular compound has a heterocyclic group at a side chain.

4. A colored photosensitive composition comprising:
  the pigment-dispersed composition of any one of claim 1;
  a photopolymerizable compound; and
  a photopolymerization initiator.

5. A color filter comprising a colored region formed from the colored photosensitive composition of claim 4, on a substrate.

6. A liquid crystal display device comprising the color filter of claim 5.

7. A solid-state image pickup device comprising the color filter of claim 5.

8. The pigment-dispersed composition according to claim 1, wherein the (a) high-molecular compound further comprises one kind of repeating unit selected from the group consisting of repeating units each derived from a monomer represented by the following Formula (I), maleimide, or a maleimide derivative:

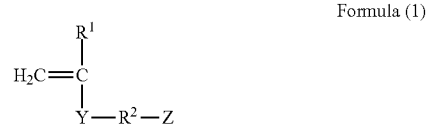

wherein, in Formula (I), $R^1$ represents a hydrogen atom or an alkyl group; $R^2$ represents a single bond or a divalent linking group; Y represents —CO—, —C(=O)O—, —CONH—, —OC(=O)— or a phenylene group; and Z represents a group that has a nitrogen-containing heterocyclic group.

9. The pigment-dispersed composition according to claim 1, wherein the (a) high-molecular compound further comprises one kind of repeating unit derived from a monomer represented by the following Formula (I):

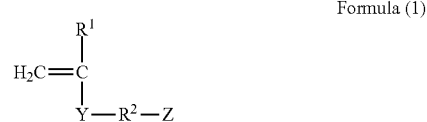

wherein, in Formula (I), $R^1$ represents a hydrogen atom or an alkyl group; $R^2$ represents a single bond or a divalent linking group; Y represents —CO—, —C(=O)O—, —CONH—, —OC(=O)— or a phenylene group; and Z represents a group that has a nitrogen-containing heterocyclic group.

* * * * *